US010242530B2

(12) United States Patent
Arnone et al.

(10) Patent No.: US 10,242,530 B2
(45) Date of Patent: Mar. 26, 2019

(54) DYNAMIC MULTI-CURRENCY INTERLEAVED WAGERING SYSTEM

(71) Applicant: Gamblit Gaming, LLC, Glendale, CA (US)

(72) Inventors: Miles Arnone, Sherborn, MA (US); Frank Cire, Pasadena, CA (US); Clifford Kaylin, Los Angeles, CA (US); Eric Meyerhofer, Pasadena, CA (US); Caitlyn Ross, Watertown, MA (US); Dwight Kim, Los Angeles, CA (US)

(73) Assignee: Gamblit Gaming, LLC, Glendale, CA (US)

( * ) Notice: Subject to any disclaimer, the term of this patent is extended or adjusted under 35 U.S.C. 154(b) by 0 days.

(21) Appl. No.: 15/141,784

(22) Filed: Apr. 28, 2016

(65) Prior Publication Data

US 2016/0247354 A1 Aug. 25, 2016

Related U.S. Application Data

(63) Continuation of application No. PCT/US2014/063438, filed on Oct. 31, 2014.

(Continued)

(51) Int. Cl.

*G06F 17/00* (2006.01)
*G07F 17/32* (2006.01)

(52) U.S. Cl.

CPC ...... *G07F 17/3244* (2013.01); *G07F 17/3288* (2013.01)

(58) Field of Classification Search

None

See application file for complete search history.

(56) References Cited

U.S. PATENT DOCUMENTS 5,413,357 A 5/1995 Schulze et al.
5,718,429 A 2/1998 Keller (Continued)

FOREIGN PATENT DOCUMENTS

WO 2013105400 A1 7/2013

OTHER PUBLICATIONS

U.S. Appl. No. 14/185,847 Arnone, et al., filed Feb. 20, 2014.

(Continued)

*Primary Examiner* — Ronald Laneau

(74) *Attorney, Agent, or Firm* — Caitlyn Ross; Frank Cire

(57) ABSTRACT

A dynamic multi-currency interleaved wagering system is disclosed. The system includes an interactive controller operatively connected to an application controller, the interactive controller constructed to: receive identification of valid currency types; present the valid currency types; receive identification of a chosen currency type chosen; communicate the chosen currency type and application telemetry; and receive an application resource. The system also includes a wager controller operatively connected to the application controller, the wager controller constructed to: generate and communicate a wager outcome. The system also includes the application controller operatively connecting the wager controller to the interactive controller by a network, the application controller constructed to: determine the identification of the valid currency types using currency rules; communicate the identification of the valid currency types; determine a wager request; communicate the chosen currency type and the wager request; receive the wager outcome; determine the application resource; and communicate the application resource.

33 Claims, 18 Drawing Sheets

Related U.S. Application Data

(60) Provisional application No. 61/916,179, filed on Dec. 14, 2013, provisional application No. 61/898,076, filed on Oct. 31, 2013.

(56) References Cited

U.S. PATENT DOCUMENTS

| | | | |
|---|---|---|---|
| 5,785,592 | A | 7/1998 | Jacobsen |
| 5,853,324 | A | 12/1998 | Kami et al. |
| 5,963,745 | A | 10/1999 | Collins et al. |
| 6,050,895 | A | 4/2000 | Luciano |
| 6,165,071 | A | 12/2000 | Weiss |
| 6,227,974 | B1 | 5/2001 | Eilat |
| 6,267,669 | B1 | 7/2001 | Luciano |
| 6,302,791 | B1 | 10/2001 | Frohm et al. |
| 6,685,563 | B1 | 2/2004 | Meekins et al. |
| 6,712,693 | B1 | 3/2004 | Hettinger |
| 6,761,632 | B2 | 7/2004 | Bansemer et al. |
| 6,761,633 | B2 | 7/2004 | Riendeau |
| 6,764,397 | B1 | 7/2004 | Robb |
| 6,811,482 | B2 | 11/2004 | Letovsky |
| 7,118,105 | B2 | 10/2006 | Benevento |
| 7,294,058 | B1 | 11/2007 | Slomiany |
| 7,326,115 | B2 | 2/2008 | Baerlocher |
| 7,361,091 | B2 | 4/2008 | Letovsky |
| 7,517,282 | B1 | 4/2009 | Pryor |
| 7,575,517 | B2 | 8/2009 | Parham et al. |
| 7,682,239 | B2 | 3/2010 | Friedman et al. |
| 7,720,733 | B2 | 5/2010 | Jung |
| 7,753,770 | B2 | 7/2010 | Walker et al. |
| 7,753,790 | B2 | 7/2010 | Nguyen |
| 7,766,742 | B2 | 8/2010 | Bennett et al. |
| 7,775,885 | B2 | 8/2010 | Van Luchene |
| 7,798,896 | B2 | 9/2010 | Katz |
| 7,828,657 | B2 | 11/2010 | Booth |
| 7,917,371 | B2 | 3/2011 | Jung et al. |
| 7,931,531 | B2 | 4/2011 | Oberberger |
| 7,938,727 | B1 | 5/2011 | Konkle |
| 7,950,993 | B2 | 5/2011 | Oberberger |
| 7,967,674 | B2 | 6/2011 | Baerlocher |
| 7,980,948 | B2 | 7/2011 | Rowe |
| 7,996,264 | B2 | 8/2011 | Kusumoto et al. |
| 8,012,023 | B2 | 9/2011 | Gates |
| 8,047,908 | B2 | 11/2011 | Walker |
| 8,047,915 | B2 | 11/2011 | Lyle |
| 8,060,829 | B2 | 11/2011 | Jung et al. |
| 8,075,383 | B2 | 12/2011 | Friedman et al. |
| 8,087,999 | B2 | 1/2012 | Oberberger |
| 8,113,938 | B2 | 2/2012 | Friedman et al. |
| 8,118,654 | B1 | 2/2012 | Nicolas |
| 8,123,618 | B2 * | 2/2012 | Karmarkar ............. G07F 17/32 463/10 |
| 8,128,487 | B2 | 3/2012 | Hamilton et al. |
| 8,135,648 | B2 | 3/2012 | Oram |
| 8,137,193 | B1 | 3/2012 | Kelly et al. |
| 8,142,272 | B2 | 3/2012 | Walker |
| 8,157,653 | B2 | 4/2012 | Buhr |
| 8,167,695 | B2 | 5/2012 | Rowe |
| 8,167,699 | B2 | 5/2012 | Inamura |
| 8,177,628 | B2 | 5/2012 | Manning |
| 8,182,338 | B2 | 5/2012 | Thomas |
| 8,182,339 | B2 | 5/2012 | Anderson |
| 8,187,068 | B2 | 5/2012 | Slomiany |
| 8,206,210 | B2 | 6/2012 | Walker |
| 8,210,934 | B2 | 7/2012 | Ocko et al. |
| 8,255,297 | B2 | 8/2012 | Morgenstern |
| 8,308,544 | B2 | 11/2012 | Friedman |
| 8,430,735 | B2 | 4/2013 | Oberberger |
| 8,475,266 | B2 | 7/2013 | Amone |
| 8,480,470 | B2 | 7/2013 | Napolitano et al. |
| 8,485,893 | B2 | 7/2013 | Rowe |
| 8,622,809 | B1 | 1/2014 | Arora et al. |
| 8,864,564 | B2 | 10/2014 | Oberberger |
| 8,998,694 | B2 | 4/2015 | Rowe |
| 9,070,257 | B1 | 6/2015 | Scalise |
| 9,092,946 | B2 | 7/2015 | Rowe |
| 9,111,412 | B2 | 8/2015 | Rowe |
| 9,454,873 | B2 | 9/2016 | Rowe |
| 2001/0004609 | A1 | 6/2001 | Walker et al. |
| 2001/0019965 | A1 | 9/2001 | Ochi |
| 2002/0022509 | A1 | 2/2002 | Nicastro et al. |
| 2002/0090990 | A1 | 7/2002 | Joshi et al. |
| 2002/0175471 | A1 | 11/2002 | Faith |
| 2003/0060286 | A1 | 3/2003 | Walker et al. |
| 2003/0119576 | A1 | 6/2003 | McClintic et al. |
| 2003/0139214 | A1 | 7/2003 | Wolf et al. |
| 2003/0171149 | A1 | 9/2003 | Rothschild |
| 2003/0204565 | A1 | 10/2003 | Guo et al. |
| 2003/0211879 | A1 | 11/2003 | Englman |
| 2004/0092313 | A1 | 5/2004 | Saito et al. |
| 2004/0097610 | A1 | 5/2004 | Saito |
| 2004/0102238 | A1 | 5/2004 | Taylor |
| 2004/0121839 | A1 | 6/2004 | Webb |
| 2004/0225387 | A1 | 11/2004 | Smith |
| 2005/0003878 | A1 | 1/2005 | Updike |
| 2005/0096124 | A1 | 5/2005 | Stronach |
| 2005/0116411 | A1 | 6/2005 | Herrmann et al. |
| 2005/0192087 | A1 | 9/2005 | Friedman et al. |
| 2005/0233791 | A1 | 10/2005 | Kane |
| 2005/0233806 | A1 | 10/2005 | Kane et al. |
| 2005/0239538 | A1 | 10/2005 | Dixon |
| 2005/0269778 | A1 | 12/2005 | Samberg |
| 2005/0288101 | A1 | 12/2005 | Lockton et al. |
| 2006/0003823 | A1 | 1/2006 | Zhang |
| 2006/0003830 | A1 | 1/2006 | Walker et al. |
| 2006/0035696 | A1 | 2/2006 | Walker |
| 2006/0040735 | A1 | 2/2006 | Baerlocher |
| 2006/0068913 | A1 | 3/2006 | Walker et al. |
| 2006/0084499 | A1 | 4/2006 | Moshal |
| 2006/0084505 | A1 | 4/2006 | Yoseloff |
| 2006/0135250 | A1 | 6/2006 | Rossides |
| 2006/0154710 | A1 | 7/2006 | Serafat |
| 2006/0166729 | A1 | 7/2006 | Saffari et al. |
| 2006/0189371 | A1 | 8/2006 | Walker et al. |
| 2006/0223611 | A1 | 10/2006 | Baerlocher |
| 2006/0234791 | A1 | 10/2006 | Nguyen et al. |
| 2006/0240890 | A1 | 10/2006 | Walker |
| 2006/0246403 | A1 | 11/2006 | Monpouet et al. |
| 2006/0258433 | A1 | 11/2006 | Finocchio et al. |
| 2007/0026924 | A1 | 2/2007 | Taylor |
| 2007/0035548 | A1 | 2/2007 | Jung et al. |
| 2007/0038559 | A1 | 2/2007 | Jung et al. |
| 2007/0064074 | A1 | 3/2007 | Silverbrook et al. |
| 2007/0087799 | A1 | 4/2007 | Van Luchene |
| 2007/0093299 | A1 | 4/2007 | Bergeron |
| 2007/0099696 | A1 | 5/2007 | Nguyen et al. |
| 2007/0117641 | A1 | 5/2007 | Walker et al. |
| 2007/0129149 | A1 | 6/2007 | Walker |
| 2007/0142108 | A1 | 6/2007 | Linard |
| 2007/0156509 | A1 | 7/2007 | Jung et al. |
| 2007/0167212 | A1 | 7/2007 | Nguyen |
| 2007/0167239 | A1 | 7/2007 | O'Rourke |
| 2007/0173311 | A1 | 7/2007 | Morrow et al. |
| 2007/0191104 | A1 | 8/2007 | Van Luchene |
| 2007/0202941 | A1 | 8/2007 | Miltenberger |
| 2007/0203828 | A1 | 8/2007 | Jung et al. |
| 2007/0207847 | A1 | 9/2007 | Thomas |
| 2007/0259717 | A1 | 11/2007 | Mattice |
| 2007/0293306 | A1 | 12/2007 | Nee et al. |
| 2008/0004107 | A1 | 1/2008 | Nguyen et al. |
| 2008/0014835 | A1 | 1/2008 | Weston et al. |
| 2008/0015004 | A1 | 1/2008 | Gatto et al. |
| 2008/0064488 | A1 | 3/2008 | Oh |
| 2008/0070659 | A1 | 3/2008 | Naicker |
| 2008/0070690 | A1 | 3/2008 | Van Luchene |
| 2008/0070702 | A1 | 3/2008 | Kaminkow |
| 2008/0096665 | A1 | 4/2008 | Cohen |
| 2008/0108406 | A1 | 5/2008 | Oberberger |
| 2008/0108425 | A1 | 5/2008 | Oberberger |
| 2008/0113704 | A1 | 5/2008 | Jackson |
| 2008/0119283 | A1 | 5/2008 | Baerlocher |
| 2008/0139319 | A1 | 6/2008 | Okada |
| 2008/0146308 | A1 | 6/2008 | Okada |
| 2008/0161081 | A1 | 7/2008 | Berman |

(56) References Cited

U.S. PATENT DOCUMENTS

2008/0176619 A1 7/2008 Kelly
2008/0191418 A1 8/2008 Lutnick et al.
2008/0195481 A1 8/2008 Lutnick
2008/0248850 A1 10/2008 Schugar
2008/0254893 A1 10/2008 Patel
2008/0274796 A1 11/2008 Lube
2008/0274798 A1 11/2008 Walker et al.
2008/0311980 A1 12/2008 Cannon
2008/0318668 A1 12/2008 Ching
2009/0011827 A1 1/2009 Englman
2009/0023489 A1 1/2009 Toneguzzo
2009/0023492 A1 1/2009 Erfanian
2009/0061974 A1 3/2009 Lutnick et al.
2009/0061975 A1 3/2009 Ditchev
2009/0061991 A1 3/2009 Popovich
2009/0061997 A1 3/2009 Popovich
2009/0061998 A1 3/2009 Popovich
2009/0061999 A1 3/2009 Popovich
2009/0082093 A1 3/2009 Okada
2009/0088239 A1 4/2009 Iddings
2009/0098934 A1 4/2009 Amour
2009/0118006 A1 5/2009 Kelly et al.
2009/0124344 A1 5/2009 Mitchell et al.
2009/0131158 A1 5/2009 Brunet De Courssou et al.
2009/0131175 A1 5/2009 Kelly et al.
2009/0143141 A1 6/2009 Wells
2009/0149233 A1 6/2009 Strause et al.
2009/0156297 A1 6/2009 Andersson et al.
2009/0176560 A1 7/2009 Herrmann et al.
2009/0176566 A1 7/2009 Kelly
2009/0181777 A1 7/2009 Christiani
2009/0221355 A1 9/2009 Dunaevsky et al.
2009/0239610 A1 9/2009 Olive
2009/0247272 A1 10/2009 Abe
2009/0270164 A1 10/2009 Seelig
2009/0275393 A1 11/2009 Kisenwether
2009/0291755 A1 11/2009 Walker et al.
2009/0309305 A1 12/2009 May
2009/0312093 A1 12/2009 Walker et al.
2009/0325686 A1 12/2009 Davis
2010/0004058 A1 1/2010 Acres
2010/0016056 A1 1/2010 Thomas et al.
2010/0029373 A1 2/2010 Graham et al.
2010/0035674 A1 2/2010 Slomiany
2010/0056247 A1 3/2010 Nicely
2010/0056260 A1 3/2010 Fujimoto
2010/0062836 A1 3/2010 Young
2010/0081509 A1 4/2010 Burke et al.
2010/0093420 A1 4/2010 Wright
2010/0093444 A1 4/2010 Biggar et al.
2010/0105454 A1 4/2010 Weber
2010/0120525 A1 5/2010 Baerlocher et al.
2010/0124983 A1 5/2010 Gowin et al.
2010/0137047 A1 6/2010 Englman et al.
2010/0174593 A1 7/2010 Cao
2010/0184509 A1 7/2010 Sylla et al.
2010/0203940 A1 8/2010 Alderucci et al.
2010/0210344 A1 8/2010 Edidin et al.
2010/0227672 A1 9/2010 Amour
2010/0227688 A1 9/2010 Lee
2010/0240436 A1 9/2010 Wilson et al.
2010/0285869 A1 11/2010 Walker
2010/0304825 A1 12/2010 Davis
2010/0304839 A1 12/2010 Johnson
2010/0304842 A1 12/2010 Friedman et al.
2011/0009177 A1 1/2011 Katz
2011/0009178 A1 1/2011 Gerson
2011/0045896 A1 2/2011 Sak et al.
2011/0070945 A1 3/2011 Walker
2011/0077087 A1 3/2011 Walker et al.
2011/0082571 A1 4/2011 Murdock et al.
2011/0105206 A1 5/2011 Rowe et al.
2011/0107239 A1 5/2011 Adoni
2011/0109454 A1 5/2011 McSheffrey
2011/0111820 A1 5/2011 Filipour
2011/0111837 A1 5/2011 Gagner
2011/0111841 A1 5/2011 Tessmer
2011/0118011 A1 5/2011 Filipour et al.
2011/0201413 A1 8/2011 Oberberger
2011/0207523 A1 8/2011 Filipour et al.
2011/0212766 A1 9/2011 Bowers
2011/0212767 A1 9/2011 Barclay
2011/0218028 A1 9/2011 Acres
2011/0218035 A1 9/2011 Thomas
2011/0230258 A1 9/2011 Van Luchene
2011/0230260 A1 9/2011 Morrow et al.
2011/0230267 A1 9/2011 Van Luchene
2011/0244944 A1 10/2011 Baerlocher
2011/0263312 A1 10/2011 De Waal
2011/0269522 A1 11/2011 Nicely et al.
2011/0275440 A1 11/2011 Faktor
2011/0287828 A1 11/2011 Anderson et al.
2011/0287841 A1 11/2011 Watanabe
2011/0312408 A1 12/2011 Okuaki
2011/0319169 A1 12/2011 Lam
2012/0004747 A1 1/2012 Kelly
2012/0028718 A1 2/2012 Barclay et al.
2012/0058814 A1 3/2012 Lutnick
2012/0077569 A1 3/2012 Watkins
2012/0108323 A1 5/2012 Kelly
2012/0135793 A1 5/2012 Antonopoulos
2012/0190437 A1 7/2012 Agarwal
2012/0202587 A1 8/2012 Allen
2012/0302311 A1 11/2012 Luciano
2012/0322545 A1 12/2012 Arnone et al.
2013/0029760 A1 1/2013 Wicket
2013/0035157 A1 2/2013 Weber et al.
2013/0131848 A1 5/2013 Arnone et al.
2013/0190074 A1 7/2013 Arnone et al.
2013/0225273 A1 8/2013 Gagner et al.
2013/0244767 A1 9/2013 Barclay et al.
2013/0260869 A1 10/2013 Leandro et al.
2014/0087801 A1 3/2014 Nicely et al.
2014/0087808 A1 3/2014 Leandro et al.
2014/0087809 A1 3/2014 Leupp et al.
2014/0357350 A1 12/2014 Weingardt et al.
2015/0087406 A1* 3/2015 Denham ............. G07F 17/3262 463/25
2017/0148271 A1 5/2017 Graboyes et al.

OTHER PUBLICATIONS

U.S. Appl. No. 14/203,459 Arnone, et al., filed Mar. 10, 2014.
U.S. Appl. No. 14/205,272 Arnone, et al., filed Mar. 11, 2014.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.

(56) References Cited

OTHER PUBLICATIONS

U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986 Arnone, et al., filed Feb. 7, 2014.
U.S. Appl. No. 14/176,014 Arnone, et al., filed Feb. 7, 2014.
U.S. Appl. No. 14/179,487 Arnone, et al., filed Feb. 12, 2014.
U.S. Appl. No. 14/179,492 Arnone, et al., filed Feb. 12, 2014.
U.S. Appl. No. 14/181,190 Arnone, et al., filed Feb. 14, 2014.
U.S. Appl. No. 14/186,393 Arnone, et al., filed Feb. 21, 2014.
U.S. Appl. No. 14/188,587 Arnone, et al., filed Feb. 24, 2014.
U.S. Appl. No. 14/586,645 Arnone, et al. filed Dec. 30, 2014.
U.S. Appl. No. 14/598,151 Arnone, et al. filed Jan. 15, 2015.
U.S. Appl. No. 14/601,063 Arnone, et al. filed Jan. 20, 2015.
U.S. Appl. No. 14/601,108 Arnone, et al. filed Jan. 20, 2015.
U.S. Appl. No. 14/608,000 Arnone, et al. filed Jan. 28, 2015.
U.S. Appl. No. 14/608,087 Arnone, et al. filed Jan. 28, 2015.
U.S. Appl. No. 14/608,093 Arnone, et al. filed Jan. 28, 2015.
U.S. Appl. No. 14/610,897 Arnone, et al. filed Jan. 30, 2015.
U.S. Appl. No. 14/611,077 Arnone, et al. filed Jan. 30, 2015.
U.S. Appl. No. 14/604,629 Arnone, et al. filed Jan. 23, 2015.
U.S. Appl. No. 14/625,475 Arnone, et al. filed Feb. 18, 2015.
U.S. Appl. No. 14/617,852 Arnone, et al. filed Feb. 9, 2015.
U.S. Appl. No. 14/627,428 Arnone, et al. filed Feb. 20, 2015.
U.S. Appl. No. 14/642,427 Arnone, et al. filed Mar. 9, 2015.
U.S. Appl. No. 14/665,991 Arnone, et al. filed Mar. 23, 2015.
U.S. Appl. No. 14/666,010 Arnone, et al. filed Mar. 23, 2015.
U.S. Appl. No. 14/666,022 Arnone, et al. filed Mar. 23, 2015.
U.S. Appl. No. 14/642,623 Arnone, et al. filed Mar. 9, 2015.
U.S. Appl. No. 14/663,337 Arnone, et al. filed Mar. 19, 2015
U.S. Appl. No. 14/666,284 Arnone, et al. filed Mar. 23, 2015.
U.S. Appl. No. 14/679,885 Arnone, et al. filed Apr. 6, 2015.
U.S. Appl. No. 14/685,378 Arnone, et al. filed Apr. 13, 2015.
U.S. Appl. No. 14/686,675 Arnone, et al. filed Apr. 14, 2015.
U.S. Appl. No. 14/686,678 Arnone, et al. filed Apr. 14, 2015.
U.S. Appl. No. 14/701,430 Arnone, et al. filed Apr. 30, 2015.
U.S. Appl. No. 14/703,721 Arnone, et al. filed May 4, 2015.
U.S. Appl. No. 14/708,138 Arnone, et al. filed May 8, 2015.
U.S. Appl. No. 14/708,141 Arnone, et al. filed May 8, 2015.
U.S. Appl. No. 14/708,160 Arnone, et al. filed May 8, 2015.
U.S. Appl. No. 14/708,161 Arnone, et al. filed May 8, 2015.
U.S. Appl. No. 14/708,162 Arnone, et al. filed May 8, 2015.
U.S. Appl. No. 14/710,483 Arnone, et al. filed May 12, 2015.
U.S. Appl. No. 14/714,084 Arnone, et al. filed May 15, 2015.
U.S. Appl. No. 14/715,463 Arnone, et al. filed May 18, 2015.
U.S. Appl. No. 14/720,620 Arnone, et al. filed May 22, 2015.
U.S. Appl. No. 14/720,624 Arnone, et al. filed May 22, 2015.
U.S. Appl. No. 14/720,626 Arnone, et al. filed May 22, 2015.
U.S. Appl. No. 14/727,726 Arnone, et al. filed Jun. 1, 2015.
U.S. Appl. No. 14/730,183 Arnone, et al. filed Jun. 3, 2015.
U.S. Appl. No. 14/731,321 Arnone, et al. filed Jun. 4, 2015.
U.S. Appl. No. 14/740,078 Arnone, et al. filed Jun. 15, 2015.
U.S. Appl. No. 14/742,517 Arnone, et al. filed Jun. 17, 2015.
U.S. Appl. No. 14/743,708 Arnone, et al. filed Jun. 18, 2015.
U.S. Appl. No. 14/746,731 Arnone, et al. filed Jun. 22, 2015.
U.S. Appl. No. 14/748,122 Arnone, et al. filed Jun. 23, 2015.
U.S. Appl. No. 14/788,581 Arnone, et al. filed Jun. 30, 2015.
U.S. Appl. No. 14/793,685 Arnone, et al. filed Jul. 7, 2015.
U.S. Appl. No. 14/793,704 Arnone, et al. filed Jul. 7, 2015.
U.S. Appl. No. 14/797,016 Arnone, et al. filed Jul. 10, 2015.
U.S. Appl. No. 14/799,481 Arnone, et al. filed Jul. 14, 2015.
U.S. Appl. No. 14/205,303 Arnone, et al., filed Mar. 11, 2014.
U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14/222,520 Arnone, et al., filed Mar. 21, 2014.
U.S. Appl. No. 14/253,813 Arnone, et al., filed Apr. 15, 2014.
U.S. Appl. No. 14/255,253 Arnone, et al., filed Apr. 17, 2014.
U.S. Appl. No. 14/255,919 Arnone, et al. filed Apr. 17, 2014.
U.S. Appl. No. 14/263,988 Arnone, et al. filed Apr. 28, 2014.
U.S. Appl. No. 14/270,335 Arnone, et al. filed May 5, 2014.
U.S. Appl. No. 14/271,360 Arnone, et al. filed May 6, 2014.
U.S. Appl. No. 13/961,849 Arnone, et al. filed Aug. 7, 2013.
U.S. Appl. No. 13/746,850 Arnone, et al. filed Jan. 22, 2013.
U.S. Appl. No. 14/288,169 Arnone, et al. filed May 27, 2014.
U.S. Appl. No. 14/304,027 Arnone, et al. filed Jun. 13, 2014.
U.S. Appl. No. 14/306,187 Arnone, et al. filed Jun. 16, 2014.
U.S. Appl. No. 14/312,623 Arnone, et al. filed Jun. 23, 2014.
U.S. Appl. No. 14/330,249 Arnone, et al. filed Jul. 14, 2014.
U.S. Appl. No. 14/339,142 Arnone, et al. filed Jul. 23, 2014.
U.S. Appl. No. 14/458,206 Arnone, et al. filed Aug. 12, 2014.
U.S. Appl. No. 14/461,344 Arnone, et al. filed Aug. 15, 2014.
U.S. Appl. No. 14/462,516 Arnone, et al. filed Aug. 18, 2014.
U.S. Appl. No. 14/467,646 Meyerhofer, et al. filed Aug. 25, 2014.
U.S. Appl. No. 14/474,023 Arnone, et al. filed Aug. 29, 2014.
U.S. Appl. No. 14/486,895 Arnone, et al. filed Sep. 15, 2014.
U.S. Appl. No. 14/507,206 Arnone, et al. filed Oct. 6, 2014.
U.S. Appl. No. 14/521,338 Arnone, et al. filed Oct. 22, 2014.
U.S. Appl. No. 14/535,808 Arnone, et al. filed Nov. 7, 2014.
U.S. Appl. No. 14/535,816 Arnone, et al. filed Nov. 7, 2014.
U.S. Appl. No. 14/536,231 Arnone, et al. filed Nov. 7, 2014.
U.S. Appl. No. 14/536,280 Arnone, et al. filed Nov. 7, 2014.
U.S. Appl. No. 14/549,137 Arnone, et al. filed Nov. 20, 2014.
U.S. Appl. No. 14/550,802 Arnone, et al. filed Nov. 21, 2014.
U.S. Appl. No. 14/555,401 Arnone, et al. filed Nov. 26, 2014.
U.S. Appl. No. 14/559,840 Arnone, et al. filed Dec. 3, 2014.
U.S. Appl. No. 14/564,834 Arnone, et al. filed Dec. 9, 2014.
U.S. Appl. No. 14/570,746 Arnone, et al. filed Dec. 15, 2014.
U.S. Appl. No. 14/570,857 Arnone, et al. filed Dec. 15, 2014.
U.S. Appl. No. 14/586,626 Arnone, et al. filed Dec. 30, 2014.
U.S. Appl. No. 14/586,639 Arnone, et al. filed Dec. 30, 2014.
U.S. Appl. No. 14/815,764 Arnone, et al. filed Jul. 31, 2015.
U.S. Appl. No. 14/815,774 Arnone, et al. filed Jul. 31, 2015.
U.S. Appl. No. 14/817,032 Arnone, et al. filed Aug. 3, 2015.
U.S. Appl. No. 14/822,890 Arnone, et al. filed Aug. 10, 2015.
U.S. Appl. No. 14/823,951 Arnone, et al. filed Aug. 11, 2015.
U.S. Appl. No. 14/823,987 Arnone, et al. filed Aug. 11, 2015.
U.S. Appl. No. 14/825,056 Arnone, et al. filed Aug. 12, 2015.
U.S. Appl. No. 14/835,590 Arnone, et al. filed Aug. 25, 2015.
U.S. Appl. No. 14/836,902 Arnone, et al. filed Aug. 26, 2015.
U.S. Appl. No. 14/839,647 Arnone, et al. filed Aug. 28, 2015.
U.S. Appl. No. 14/842,684 Arnone, et al. filed Sep. 1, 2015.
U.S. Appl. No. 14/842,785 Arnone, et al. filed Sep. 1, 2015.
U.S. Appl. No. 14/854,021 Arnone, et al. filed Sep. 14, 2015.
U.S. Appl. No. 14/855,322 Arnone, et al. filed Sep. 15, 2015.
U.S. Appl. No. 14/859,065 Arnone, et al. filed Sep. 18, 2015.
U.S. Appl. No. 14/865,422 Arnone, et al. filed Sep. 25, 2015.
U.S. Appl. No. 14/867,809 Arnone, et al. filed Sep. 28, 2015.
U.S. Appl. No. 14/868,287 Arnone, et al. filed Sep. 28, 2015.
U.S. Appl. No. 14/868,364 Arnone, et al. filed Sep. 28, 2015.
U.S. Appl. No. 14/869,809 Arnone, et al. filed Sep. 29, 2015.
U.S. Appl. No. 14/869,819 Arnone, et al. filed Sep. 29, 2015.
U.S. Appl. No. 14/885,894 Arnone, et al. filed Oct. 16, 2015.
U.S. Appl. No. 14/919,665 Arnone, et al. filed Oct. 21, 2015.
U.S. Appl. No. 14/942,844 Arnone, et al. filed Nov. 16, 2015.
U.S. Appl. No. 14/942,883 Arnone, et al. filed Nov. 16, 2015.
U.S. Appl. No. 14/949,759 Arnone, et al. filed Nov. 23, 2015.
U.S. Appl. No. 14/952,758 Arnone, et al. filed Nov. 25, 2015.
U.S. Appl. No. 14/952,769 Arnone, et al. filed Nov. 25, 2015.
U.S. Appl. No. 14/954,922 Arnone, et al. filed Nov. 30, 2015.
U.S. Appl. No. 14/954,931 Arnone, et al. filed Nov. 30, 2015.
U.S. Appl. No. 14/955,000 Arnone, et al. filed Nov. 30, 2015.
U.S. Appl. No. 14/956,301 Arnone, et al. filed Dec. 1, 2015.
U.S. Appl. No. 14/965,231 Arnone, et al. filed Dec. 10, 2015.
U.S. Appl. No. 14/965,846 Arnone, et al. filed Dec. 10, 2015.
U.S. Appl. No. 14/981,640 Arnone, et al. filed Dec. 28, 2015.

(56) References Cited

OTHER PUBLICATIONS

U.S. Appl. No. 14/981,775 Arnone, et al. filed Dec. 28, 2015.
U.S. Appl. No. 14/984,943 Arnone, et al. filed Dec. 30, 2015.
U.S. Appl. No. 14/984,965 Arnone, et al. filed Dec. 30, 2015.
U.S. Appl. No. 14/984,978 Arnone, et al. filed Dec. 30, 2015.
U.S. Appl. No. 14/985,107 Arnone, et al. filed Dec. 30, 2015.
U.S. Appl. No. 14/995,151 Arnone, et al. filed Jan. 13, 2016.
U.S. Appl. No. 14/974,432 Arnone, et al. filed Dec. 18, 2015.
U.S. Appl. No. 14/997,413 Arnone, et al. filed Jan. 15, 2016.
U.S. Appl. No. 15/002,233 Arnone, et al. filed Jan. 20, 2016.
U.S. Appl. No. 15/005,944 Arnone, et al. filed Jan. 25, 2016.
U.S. Appl. No. 15/011,322 Arnone, et al. filed Jan. 29, 2016.
U.S. Appl. No. 15/051,535 Arnone, et al. filed Feb. 23, 2016.
U.S. Appl. No. 15/053,236 Arnone, et al. filed Feb. 25, 2016.
U.S. Appl. No. 15/057,095 Arnone, et al. filed Feb. 29, 2016.
U.S. Appl. No. 15/060,502 Arnone, et al. filed Mar. 3, 2016.
U.S. Appl. No. 15/063,365 Arnone, et al. filed Mar. 7, 2016.
U.S. Appl. No. 15/063,496 Arnone, et al. filed Mar. 7, 2016.
U.S. Appl. No. 15/073,602 Arnone, et al. filed Mar. 17, 2016.
U.S. Appl. No. 15/074,999 Arnone, et al. filed Mar. 18, 2016.
U.S. Appl. No. 15/077,574 Arnone, et al. filed Mar. 22, 2016.
U.S. Appl. No. 15/083,284 Arnone, et al. filed Mar. 28, 2016.
U.S. Appl. No. 15/091,395 Arnone, et al. filed Apr. 5, 2016.
U.S. Appl. No. 15/093,685 Arnone, et al. filed Apr. 7, 2016.
U.S. Appl. No. 15/098,287 Arnone, et al. filed Apr. 13, 2016.
U.S. Appl. No. 15/098,313 Arnone, et al. filed Apr. 13, 2016.
U.S. Appl. No. 15/130,101 Arnone, et al. filed Apr. 15, 2016.
U.S. Appl. No. 15/133,624 Arnone, et al. filed Apr. 20, 2016.
U.S. Appl. No. 15/139,148 Arnone, et al. filed Apr. 26, 2016.
International Search Report and Written Opinion, PCT/US2014/063438, dated Mar. 13, 2015.

* cited by examiner

DYNAMIC MULTI-CURRENCY INTERLEAVED WAGERING SYSTEM

CROSS REFERENCE TO RELATED APPLICATIONS

The current application is a continuation of Patent Cooperation Treaty Application No. PCT/US14/63438, filed Oct. 31, 2014, which claims the benefit of U.S. Provisional Patent Application No. 61/898,076, filed Oct. 31, 2013, the disclosure of which is incorporated by reference herein in its entirety, and this application also claims the benefit of U.S. Provisional Patent Application No. 61/916,179, filed Dec. 14, 2013, the disclosure of which is incorporated by reference herein in its entirety.

This application references Patent Cooperation Treaty Application No. PCT/US11/26768, filed Mar. 1, 2011, now U.S. Pat. No. 8,632,395, issued Jan. 21, 2014, Patent Cooperation Treaty Application No. PCT/US11/63587, filed Dec. 6, 2011, published as US Patent Application Publication No. 2013/0296021 A1, and Patent Cooperation Treaty Application No. PCT/US12/58156, filed Sep. 29, 2012, now U.S. Pat. No. 8,790,170, issued Jul. 29, 2014, the contents of each of which are hereby incorporated by reference.

FIELD OF THE INVENTION

Embodiments of the present invention are generally related to communications within data processing systems. More particularly, the present invention relates to the communication and processing of wagering data.

BACKGROUND

The gaming industry has traditionally developed electronic gaming machines that present simple wagering games to a user. The communication and processing needs for these simple wagering games are easily met using conventional processing systems. However, more complicated wagering games need communication and processing systems that are better suited for implementing these more complicated wagering games. Various aspects of embodiments of the present invention meet such a need.

SUMMARY OF THE INVENTION

Systems and methods in accordance with embodiments of the invention provide a communication and data processing system constructed for a dynamic multi-currency interleaved wagering system.

One embodiment includes a dynamic multi-currency interleaved skill wagering gaming system, including: a player's gaming device operatively connected to an application controller, the player's gaming device constructed to: receive, from the application controller, identification of one or more valid currency types, where a valid currency type is a currency type available for wagering by a user of the player's gaming device; present the one or more valid currency types to the user; receive from the user, an identification of a chosen currency type chosen by the user, the chosen currency type being one of the one or more valid currency types; communicate to the application controller, the chosen currency type and application telemetry; and receive from the application controller, an application resource based on the application telemetry; a real credit controller operatively connected to the application controller, the real credit controller constructed to: generate a wager outcome based on a wager request and the chosen currency type, the wager request and the chosen currency type being received from the application controller; and communicate, to the application controller, the wager outcome; and the application controller operatively connecting the real credit controller to the player's gaming device by a network, the application controller constructed to: determine the identification of the one or more valid currency types using one or more currency rules; communicate to the player's gaming device, the identification of the one or more valid currency types; receive from the player's gaming device, the chosen currency type and the application telemetry; determine the wager request based on the application telemetry; communicate to the real credit controller, the chosen currency type and the wager request; receive from the real credit controller, the wager outcome; determine the application resource based on the wager outcome; and communicate to the player's gaming device, the application resource.

In many embodiments, the real credit controller and the application controller are constructed from a same device, and the application controller is operatively connected to the player's gaming device by the network.

In numerous embodiments, the player's gaming device and the application controller are constructed from a same device, and the application controller is operatively connected to the real credit controller by the network.

In various embodiments, the application controller is operatively connected by the network to the real credit controller and the player's gaming device.

In many embodiments, further comprising a session/user management controller operatively connected to the application controller, the session/user management controller constructed to: receive from the application controller, a request for the identification of the one or more valid currency types; and determine the identification of the one or more valid currency types using the one or more currency rules; and communicate to the application controller, the identification of the one or more valid currency types, where the application controller is further constructed to: communicate to the session/user management server, the request for the identification of the one or more valid currency types; and receive from the session/user management server, the identification of the one or more valid currency types.

In numerous embodiments, the application controller is further constructed to receive the one or more currency rules from the user or a third party source.

In various embodiments, the one or more currency rules comprise prohibiting virtual currency wagering when a score associated with the user or a time elapsed associated with the user exceeds a threshold value.

In many embodiments, the one or more currency rules comprise prohibiting real world currency wagering when an amount of real world currency wagered by the user exceeds a threshold value.

In numerous embodiments, the one or more currency rules comprise prohibiting real world currency wagering when an amount of real world currency wagered by the user exceeds a threshold value.

In various embodiments, the player's gaming device is further constructed to communicate location data to the application controller, and where the application controller is further constructed to: receive from the player's gaming device the location data; and determine the identification of the one or more valid currency types using the location data and the one or more currency rules.

In many embodiments, the identification of the one or more valid currency types includes selecting between a plurality of currency types, and where the plurality of currency types includes at least one real world currency type and at least one virtual currency type.

DETAILED DESCRIPTION

Figure 1:
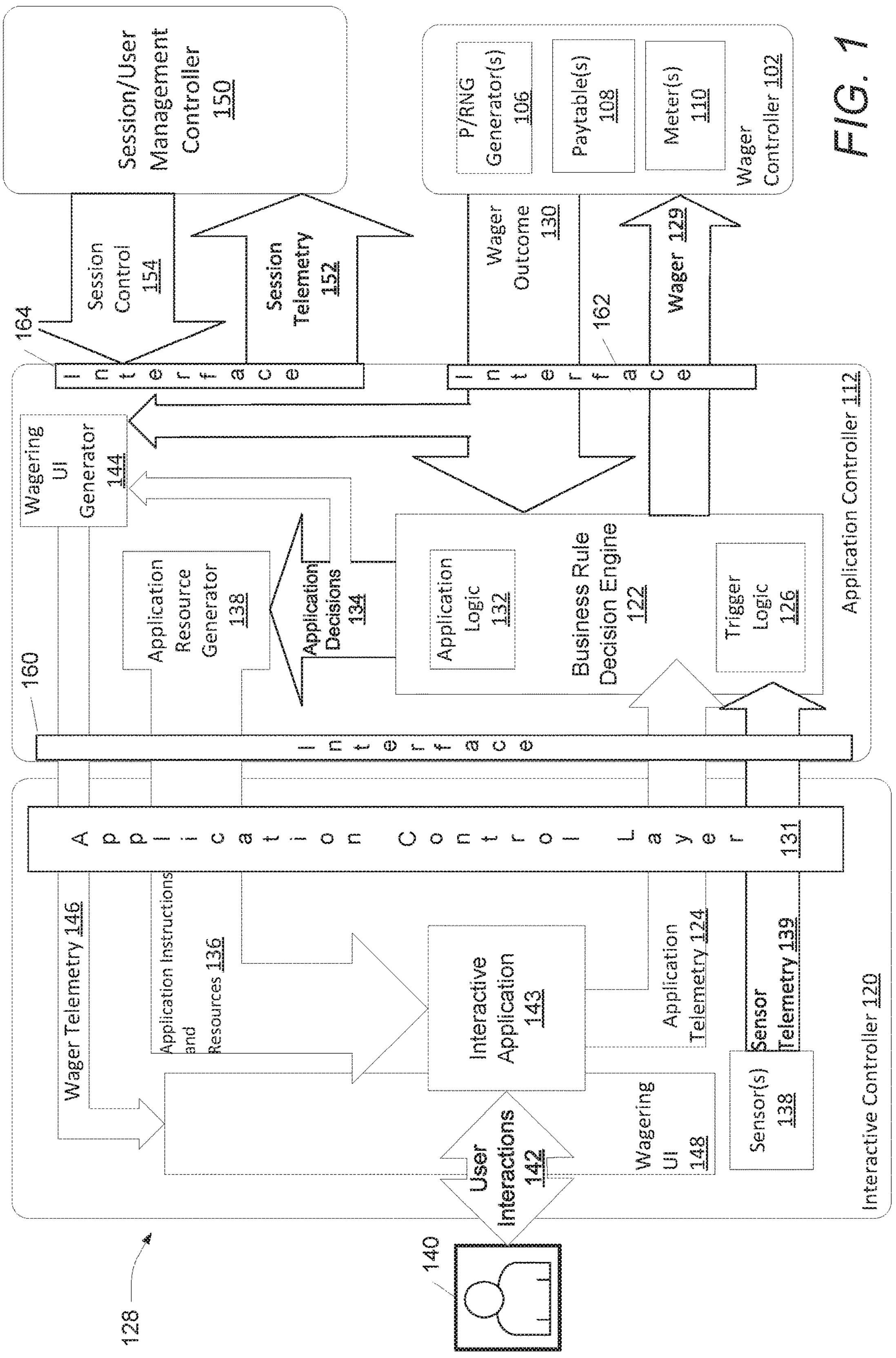
FIG. 1 is a diagram of a structure of a dynamic multi-currency interleaved wagering system in accordance with various embodiments of the invention.

A dynamic multi-currency interleaved wagering system interleaves wagering with non-wagering activities. In some embodiments of a dynamic multi-currency interleaved wagering system an interactive application executed by an interactive controller provides non-wagering components of the dynamic multi-currency interleaved wagering system. The interactive controller is operatively connected to an application controller that manages and configures the interactive application of the interactive controller and determines when wagers should be interleaved with the operations of the interactive application. The application controller is further operatively connected to a wager controller that provides one or more wagering propositions for one or more wagers.

In some embodiments, the interactive controller also includes a wagering user interface that is used to display data about a wagering process, including but not limited a wager outcome of a wager made in accordance with a wagering proposition. The content of the wagering user interface is controlled by the application controller and includes content provided by the wager controller.

In several embodiments, a user or user interactions are represented in a dynamic multi-currency interleaved wagering system by the electronic representation of interactions between the user and the interactive application, typically received via a user interface of the interactive application, and a user profile of the dynamic multi-currency interleaved wagering system associated with the user.

Many different types of interactive applications may be utilized with the dynamic multi-currency interleaved wagering system. In some embodiments, the interactive application reacts to the physical activity of the user. In these embodiments, the user interacts with the interactive application through one or more sensors that monitor the user's physical activities. Such sensors may include, but are not limited to, physiological sensors that monitor the physiology of the user, environmental sensors that monitor the physical environment of the user, accelerometers that monitor changes in motion of the user, and location sensors that monitor the location of the user such as global positioning sensors.

In some embodiments, the interactive application is a skill-based interactive game that is played by the user.

In some embodiments, the interactive application is a tool used by the user to achieve some useful goal.

In operation, a user interacts with the interactive application using various types of elements of the interactive application in an interactive application environment. Elements are interactive application resources utilized by the user within the interactive application environment to provide an interactive experience for the user. Wagers of credits are made in accordance with a wagering proposition as triggered by the user's use of one or more of the elements of the interactive application. Wager outcomes of wagers of credits made in accordance with the wagering proposition can cause consumption, loss or accrual of credits.

In accordance with some embodiments, wager outcomes of wagering events can influence elements in the interactive application such as, but not limited to, providing one or more new elements, restoring one or more consumed elements, causing the loss of one or more elements, and restoration or placement of one or more fixed elements.

In various embodiments, the wagers may be made using one or more credits (Cr). In some embodiments, Cr can be one or more credits that are purchased using, and redeemed in, a real world currency (RC) having a real world value. Credits in a real world currency may be used for wagering in real money gaming. In some governmentally defined gaming jurisdictions, real money gaming is legal. In some governmentally defined gaming jurisdictions, real money gaming is illegal.

In many embodiments, Cr can be one or more credits in a virtual currency. The virtual currency may be an alternate currency that can be acquired, purchased or transferred by or to a user, but does not necessarily directly correlate to a real world currency. In many such embodiments, Cr in a virtual currency are allowed to be purchased using a real world currency but are prevented from being redeemed in a real world currency having a real world value. In certain gaming jurisdictions, credits in a virtual currency may be used for wagering in virtual currency gaming. In some gaming jurisdictions, virtual currency gaming is legal whereas real money gaming may not be legal in the same gaming jurisdiction.

In several embodiments, during interaction with the interactive application using the elements, a user can optionally consume and/or accrue application environment credit (AC) within the interactive application as a result of the user's use of the interactive application. AC can be in the form of, but is not limited to, application environment credits, experience points, and points generally.

In various embodiments, when the interactive application is a skill-based interactive game, AC is awarded to a player of the skill-based interactive game on the basis of the player's skillful play of the skill-based interactive game. In such embodiments, AC may be analogous to the score in a typical video game. The skill-based interactive game can have one or more scoring criteria, embedded within an application controller and/or an interactive controller that provides the skill-based interactive game, that reflect user performance against one or more goals of the skill-based interactive game.

In many embodiments, AC can be used to purchase in-application items, including but not limited to, application elements that have particular properties, power ups for existing items, and other item enhancements.

In some embodiments, AC may be used to earn entrance into a sweepstakes drawing, to earn entrance in a tournament with prizes, to score in the tournament, and/or to participate and/or score in any other game event.

In several embodiments, AC can be stored on a user-tracking card or in a network-based user tracking system where the AC is attributed to a specific user.

In many embodiments, a wagering proposition includes a wager of AC for a wager outcome of a randomly generated payout of interactive application AC, elements, and/or objects in accordance with a wagering proposition.

In a number of embodiments, a wager of an amount of Cr results in a wager outcome of a payout of AC, elements, and/or objects that have an Cr value if cashed out.

In some embodiments, in a case that an interactive application is a skill-based interactive game, interactive application objects include in-application objects that may be used by a player of the skill-based interactive game to enhance the player's gameplay of the skill-based interactive game. Such objects include, but are not limited to, power-ups, enhanced in-application items, and the like. In some embodiments, the interactive application objects include objects that are detrimental to the player's play of the skill-based interactive game such as, but not limited to, obstructions in the game space, a temporary player handicap, an enhanced opponent, and the like.

In some embodiments, elements in an interactive application include, but are not limited to, enabling elements (EE) that are interactive application environment resources utilized during the user's use of the interactive application and whose utilization by the user while using the interactive application triggers execution of a wager in accordance with a wagering proposition. In another embodiment, elements in an interactive application include, but are not limited to, a reserve enabling element (REE), that is an element that converts into one or more enabling elements upon occurrence of a release event during an interactive user session. In yet another embodiment, elements in an interactive application include, but are not limited to, an actionable element (AE) that is an element that is acted upon during use of the interactive application to trigger a wager in accordance with a wagering proposition and may or may not be restorable during normal play of the interactive application. In yet another embodiment, elements in an interactive application include, but are not limited to, a common enabling element (CEE) that is an element that may be shared by two or more users and causes a wagering event and associated wager to be triggered in accordance with the wagering proposition when used by one of the users during use of the interactive application. In some embodiments, in progressing through interactive application use, a user can utilize elements during interactions with a controlled entity (CE). A CE is a character, entity, inanimate object, device or other object under control of a user.

In accordance with some embodiments of a dynamic multi-currency interleaved wagering system, the triggering of the wagering event and/or wager can be dependent upon an interactive application environment variable such as, but not limited to, a required object (RO), a required environmental condition (REC), or a controlled entity characteristic (CEC). A RO is a specific interactive application object in an interactive application acted upon for an AE to be completed. A non-limiting example of an RO is a specific key needed to open a door. An REC is an interactive application state present within an interactive application for an AE to be completed. A non-limiting example of an REC is daylight whose presence enables a character to walk through woods. A CEC is a status of the CE within an interactive application for an AE to be completed. A non-limiting example of a CEC is requirement that a CE have full health points before entering battle. Although various interactive application resources such as, but not limited to, the types of interactive application elements as discussed herein may be used to trigger a wager in accordance with a wagering proposition, one skilled in the art will recognize that any interactive application resource can be utilized in a dynamic multi-currency interleaved wagering system to trigger of a wager as appropriate to the specification of a specific application in accordance with various embodiments of the invention.

In several embodiments, a dynamic multi-currency interleaved wagering system can utilize an application controller to monitor use of the interactive application executed by an interactive controller for detecting a trigger of a wagering event. The trigger for the wagering event can be detected by the application controller from the utilization of the interactive application in accordance with at least one wagering event occurrence rule. The trigger of the wagering event can be communicated to a wager controller. In response to notification of the trigger, the wager controller executes a wager in accordance with a wagering proposition. In addition, use of an interactive application in a dynamic multi-currency interleaved wagering system can be modified by the application controller based upon the wager outcome.

In several embodiments, a wagering event occurrence can be determined from one or more application environment variables within an interactive application that are used to trigger a wager and/or associated wager in accordance with a wagering proposition. Application environment variables can include, but are not limited to, passage of a period of time during dynamic multi-currency interleaved wagering system interactive application use, a result from a dynamic multi-currency interleaved wagering system interactive application user session (such as, but not limited to, achieving a goal or a particular score), a user action that is a consumption of an element, or a user action that achieves a combination of elements to be associated with a user profile.

In numerous embodiments, an interactive application instruction is an instruction to an interactive controller and/or an interactive application to modify an interactive application state or modify one or more interactive application resources. In some embodiments, the interactive application instructions may be based upon one or more of a wager outcome and application environment variables. An interactive application instruction can modify any aspect of an interactive application, such as, but not limited to, an addition of a period of time available for a current interactive application user session for the interactive application of dynamic multi-currency interleaved wagering system, an addition of a period of time available for a future dynamic multi-currency interleaved wagering system interactive application user session or any other modification to the interactive application elements that can be utilized during interactive application use. In some embodiments, an interactive application instruction can modify a type of element whose consumption triggers a wagering event occurrence. In many embodiments, an interactive application instruction can modify a type of element whose consumption is not required in a wagering event occurrence.

In a number of embodiments, a user interface can be utilized that depicts a status of the interactive application in the dynamic multi-currency interleaved wagering system. A user interface can depict any aspect of an interactive application including, but not limited to, an illustration of dynamic multi-currency interleaved wagering system interactive application use advancement as a user uses the dynamic multi-currency interleaved wagering system.

In some embodiments, a dynamic multi-currency interleaved wagering system including an application controller operatively connected to a wager controller and operatively connected to an interactive controller may provide for interleaving entertainment content from an interactive application. The dynamic multi-currency interleaved wagering system provides for random wager outcomes in accordance with the wagering proposition that are independent of user skill while providing an interactive experience to the user that may be shaped by the user's skill.

In several embodiments, an application controller of a dynamic multi-currency interleaved wagering system may provide for a communications interface for asynchronous communications between a wager controller and an interactive application provided by an interactive controller, by operatively connecting the interactive controller, and thus the interactive controller's interactive application, with the wager controller. In some embodiments, asynchronous communications provided for by a dynamic multi-currency interleaved wagering system may reduce an amount of idle waiting time by an interactive controller of the dynamic multi-currency interleaved wagering system, thus increasing an amount of processing resources that the interactive controller may provide to an interactive application or other processes of the interactive controller. In many embodiments, asynchronous communications provided for by a dynamic multi-currency interleaved wagering system reduces an amount of idle waiting time by a wager controller, thus increasing an amount of processing resources that the wager controller may provide to execution of wagers to determine wager outcomes, and other processes provided by the wager controller. In some embodiments, a wager controller of a dynamic multi-currency interleaved wagering system may be operatively connected to a plurality of interactive controllers through one or more application controllers and the asynchronous communications provided for by the one or more application controllers allows the wager controller to operate more efficiently and provide wager outcomes to a larger number of interactive controllers than would be achievable without the one or more application controllers of the dynamic multi-currency interleaved wagering system.

In some embodiments, a dynamic multi-currency interleaved wagering system including an application controller operatively connected to a wager controller and operatively connected to an interactive controller may provide for simplified communication protocols for communications of the interactive controller as the interactive controller may communicate user interactions with an interactive application provided by the interactive controller to the application controller without regard to a nature of a wagering proposition to be interleaved with processes of the interactive application.

In various embodiments, a dynamic multi-currency interleaved wagering system including an application controller operatively connected to a wager controller and operatively connected to an interactive controller may provide for simplified communication protocols for communications of the wager controller as the wager controller may receive wager requests and communicate wager outcomes without regard to a nature of an interactive application provided by the interactive controller.

Various types interleaved wagering systems are discussed in Patent Cooperation Treaty Application No. PCT/US11/26768, filed Mar. 1, 2011, now U.S. Pat. No. 8,632,395, issued Jan. 21, 2014, Patent Cooperation Treaty Application No. PCT/US11/63587, filed Dec. 6, 2011, and Patent Cooperation Treaty Application No. PCT/US12/58156, filed Sep. 29, 2012, now U.S. Pat. No. 8,790,170, issued Jul. 29, 2014, the contents of each of which are hereby incorporated by reference in their entirety.

Wagering Interleaved Systems

FIG. 1 is a diagram of a structure of a dynamic multi-currency interleaved wagering system in accordance with various embodiments of the invention. The dynamic multi-currency interleaved wagering system 128 includes an interactive controller 120, an application controller 112, and a wager controller 102. The interactive controller 120 is operatively connected to, and communicates with, the application controller 112. The application controller 112 is also operatively connected to, and communicates with, the wager controller 102.

In several embodiments, the wager controller 102 is a controller for providing one or more wagering propositions provided by the dynamic multi-currency interleaved wagering system 128 and executes wagers in accordance with the wagering propositions. Types of value of a wager can be one or more of several different types. Types of value of a wager can include, but are not limited to, a wager of an amount of Cr corresponding to a real currency or a virtual currency, a wager of an amount of AC earned by the player through use of an interactive application, a wager of an amount of elements of an interactive application, and a wager of an amount of objects used in an interactive application. A wager outcome determined for a wager in accordance with a wagering proposition can increase or decrease an amount of the type of value used in the wager, such as, but not limited to, increasing an amount of Cr for a wager of Cr. In various embodiments, a wager outcome determined for a wager in accordance with a wagering proposition can increase or decrease an amount of a type of value that is different than a type of value of the wager, such as, but not limited to, increasing an amount of an object of an interactive application for a wager of Cr.

In many embodiments, the wager controller 120 includes one or more pseudo random or random number generators (P/RNG) 106 for generating random results, one or more paytables 108 for determining a wager outcome from the random results, and one or more credit or value meters 110 for storing amounts of wagered and won credits.

The one or more P/RNG generators 106 execute processes that can generate random or pseudo random results. The one or more paytables 108 are tables that can be used in conjunction with the random or pseudo random results to determine a wager outcome including an amount of Cr, AC, elements or objects won as a function of dynamic multi-currency interleaved wagering system use. There can be one or more paytables 108 in the wager controller 102. The paytables 108 are used to implement one or more wagering propositions in conjunction with a random output of the random or pseudo random results.

In some embodiments, selection of a paytable to use to execute a wager can be based on factors including, but not limited to, interactive application progress a user has achieved through use of the interactive application, user identification, and eligibility of the user for bonus rounds.

In various embodiments, the interactive controller 120 provides an interactive application 143 and provides human input devices (HIDs) and output devices for interacting with the user 140. The interactive controller 120 provides for user interactions 142 with the interactive application 143 by receiving input from a user through the HIDs and providing outputs such as video, audio and/or other sensory output to the user using the output devices.

The interactive controller 120 is operatively connected to, and communicates with, the application controller 112. The interactive controller communicates application telemetry data 124 to the application controller 112 and receives application instructions and resources 136 from the application controller 112. Via the communication of application instructions and resources 136, the application controller 112 can communicate certain interactive application resources including control parameters to the interactive application 143 to affect the interactive application's execution by the interactive controller 120. In various embodiments, these interactive application control parameters can be based on a wager outcome of a wager that was triggered by an element in the interactive application being utilized or acted upon by the user.

In some embodiments, execution of the interactive application by the interactive controller 120 communicates user interactions with the interactive application to the application controller 112. The application telemetry data 124 includes, but is not limited to, the user's utilization of the elements in the interactive application.

In some embodiments, the interactive application 143 is a skill-based interactive game. In such embodiments, execution of the skill-based interactive game by the interactive controller 120 is based on the user's skillful play of the skill-based interactive game. The interactive controller 120 can also communicate user choices made in the skill-based interactive game to the application controller 112 included in the application telemetry data 124 such as, but not limited to, the user's utilization of the elements of the skill-based interactive game during the user's skillful play of the skill-based interactive game. In such an embodiment, the application controller is interfaced to the interactive controller 120 in order to allow the coupling of the skill-based interactive game to wagers made in accordance with a wagering proposition.

In some embodiments, the interactive controller 120 includes one or more sensors 138 that sense various aspects of the physical environment of the interactive controller 120. Examples of sensors include, but are not limited to: global positioning sensors (GPSs) for sensing communications from a GPS system to determine a position or location of the interactive controller; temperature sensors; accelerometers; pressure sensors; and the like. Sensor telemetry data 128 is communicated by the interactive controller to the application controller 112. The application controller 112 receives the sensor telemetry data 128 and uses the sensory telemetry data to make wager decisions.

In many embodiments, the interactive controller includes a wagering user interface 148 used to display wagering data to the user.

In various embodiments, an application control layer 131 resident in the interactive controller 120 provides an interface between the interactive controller 120 and the application controller 112.

In many embodiments, application controller 112 provides an interface between the interactive application 143 provided by the interactive controller 120 and a wagering proposition provided by the wager controller 102.

In some embodiments, the application controller 112 includes an interactive controller interface 160 to an interactive controller. The interactive controller interface 160 provides for the communication of data between the interactive controller and the application controller, including but not limited to wager telemetry data 146, application instructions and resources 136, application telemetry data 124, and sensor telemetry data 128.

In various embodiments, the application controller 112 includes a wager controller interface 162 to a wager controller. The wager controller interface 162 provides for communication of data between the application controller 112 and the wager controller, including but not limited to wager outcome data 130 and wager data 129.

In some embodiments, the application controller 112 includes a user management and session controller interface 164 to a user management and session controller. The user management and session controller interface 164 provides for communication of data between the application controller 112 and the user management and session controller, including but not limited to user session control data 154 and user session telemetry data 152.

The application controller 112 includes a business rule decision engine 122 that receives telemetry data, such as application telemetry data 124 and sensor telemetry data 128, from the interactive controller 120. The business rule decision engine 122 uses the telemetry data, along with trigger logic 126 to generate wager data 129 used to trigger a wager in the wager controller 102.

In some embodiments, the application telemetry data 124 includes, but is not limited to, application environment variables that indicate the state of the interactive application 143 being used by a user 140, interactive controller data indicating the state of the interactive controller, and user actions and interactions 142 between the user and the interactive application 143 provided by the interactive controller 120. The wagering and/or wager data 129 may include, but is not limited to, an amount and type of the wager, a trigger of the wager, and a selection of a paytable 108 to be used when executing the wager.

In some embodiments, the business rule decision engine 122 also receives wager outcome data 130 from the wager controller 102. The decision engine 122 uses the wager outcome data 130, in conjunction with the telemetry data and application logic 132 to generate application decisions 134 communicated to an application resource generator 138. The application resource generator 138 receives the application decisions and uses the application decisions to generate application instructions and application resources 136 to be communicated to the interactive application 143.

In many embodiments, the application controller 112 includes a pseudo random or random result generator used to generate random results that are communicated to the application resource generator 138. The application resource generator 138 uses the random results to generate application instructions and application resources 136 to be communicated to the interactive application 143.

In various embodiments, the business rule decision engine 122 also determines an amount of AC to award to the user 140 based at least in part on the user's use of the interactive application of the dynamic multi-currency interleaved wagering system as determined from the application telemetry data 124. In some embodiments, wager outcome data 130 may also be used to determine the amount of AC that should be awarded to the user.

In numerous embodiments, the interactive application is a skill-based interactive game and the AC is awarded to the user for the user's skillful play of the skill-based interactive game.

In some embodiments, the application decisions 134 and wager outcome data 130 are communicated to a wagering user interface generator 144. The wagering user interface generator 144 receives the application decisions 134 and wager outcome data 130 and generates wager telemetry data 146 describing the state of wagering and credit accumulation and loss for the dynamic multi-currency interleaved wagering system. In some embodiments, the wager telemetry data 146 may include, but is not limited to, amounts of AC and elements earned, lost or accumulated by the user through use of the interactive application as determined from the application decisions, and Cr amounts won, lost or accumulated as determined from the wager outcome data 130 and the one or more meters 110.

In some embodiments, the wager outcome data 130 also includes data about one or more game states of a gambling game executed in accordance with a wagering proposition by the wager controller 102. In various such embodiments, the wagering user interface generator 144 generates a gambling game process display and/or gambling game state display using the one or more game states of the gambling game. The gambling game process display and/or gambling game state display is included in the wager telemetry data 146 that is communicated to the interactive controller 120. The gambling game process display and/or a gambling game state display is displayed by the wagering user interface 148 to the user 140. In other such embodiments, the one or more game states of the gambling game are communicated to the interactive controller 120 and the wagering user interface 148 generates the gambling game process display and/or gambling game state display using the one or more game states of the gambling game for display to the user 140.

The application controller 112 can further operatively connect to the wager controller 102 to determine an amount of credit or elements available and other wagering metrics of a wagering proposition. Thus, the application controller 112 may potentially affect an amount of Cr in play for participation in the wagering events of a wagering game provided by the wager controller 102 in some embodiments. The application controller 112 may additionally include various audit logs and activity meters. In some embodiments, the application controller 112 can also couple to a centralized server for exchanging various data related to the user and the activities of the user during game play of a dynamic multi-currency interleaved wagering system.

In many embodiments, one or more users can be engaged in using the interactive application executed by the interactive controller 120. In various embodiments, a dynamic multi-currency interleaved wagering system can include an interactive application that provides a skill-based interactive game that includes head-to-head play between a single user and a computing device, between two or more users against one another, or multiple users playing against a computer device and/or each other. In some embodiments, the interactive application can be a skill-based interactive game where the user is not skillfully playing against the computer or any other user such as skill-based interactive games where the user is effectively skillfully playing against himself or herself.

In some embodiments, the operation of the application controller 112 does not affect the provision of a wagering proposition by the wager controller 102 except for user choice parameters that are allowable in accordance with the wagering proposition. Examples of user choice parameters include, but are not limited to: wager terms such as but not limited to a wager amount; speed of game play (for example, by pressing a button or pulling a handle of a slot machine); and/or agreement to wager into a bonus round.

In various embodiments, wager outcome data 130 communicated from the wager controller 102 can also be used to convey a status operation of the wager controller 102.

In a number of embodiments, communication of the wager data 129 between the wager controller 102 and the application controller 112 can further be used to communicate various wagering control factors that the wager controller 102 uses as input. Examples of wagering control factors include, but are not limited to, an amount of Cr, AC, elements, or objects consumed per wagering event, and/or the user's election to enter a jackpot round.

In some embodiments, the application controller 112 utilizes the wagering user interface 148 to communicate certain interactive application data to the user, including but not limited to, club points, user status, control of the selection of choices, and messages which a user can find useful in order to adjust the interactive application experience or understand the wagering status of the user in accordance with the wagering proposition in the wager controller 102.

In some embodiments, the application controller 112 utilizes the wagering user interface 148 to communicate aspects of a wagering proposition to the user including, but not limited to, odds of certain wager outcomes, amount of Cr, AC, elements, or objects in play, and amounts of Cr, AC, elements, or objects available.

In a number of embodiments, the wager controller 102 can accept wager proposition factors including, but not limited to, modifications in the amount of Cr, AC, elements, or objects wagered on each individual wagering event, a number of wagering events per minute the wager controller 102 can resolve, entrance into a bonus round, and other factors. An example of a varying wager amount that the user can choose can include, but is not limited to, using a more difficult interactive application level associated with an amount of a wager. These factors can increase or decrease an amount wagered per individual wagering proposition in the same manner that a standard slot machine player can decide to wager more or less credits for each pull of the handle. In several embodiments, the wager controller 102 can communicate a number of factors back and forth to the application controller 112, via an interface, such that an increase/decrease in a wagered amount can be related to the change in user profile of the user in the interactive application. In this manner, a user can control a wager amount per wagering event in accordance with the wagering proposition with the change mapping to a parameter or component that is applicable to the interactive application experience.

In some embodiments, a user management and session controller 150 is used to authorize a dynamic multi-currency interleaved wagering system user session. The user management and session controller receives game user session data 152, that may include, but is not limited to, user, interactive controller, application controller and wager controller data from the application controller 112. The user management and session controller 150 uses the user, interactive controller, application controller and wager controller data to regulate a dynamic multi-currency interleaved wagering system user session. In some embodiments, the user management and session controller may also assert control of a dynamic multi-currency interleaved wagering system game user session 154. Such control may include, but is not limited to, ending a dynamic multi-currency interleaved wagering system game user session, initiating wagering in a dynamic multi-currency interleaved wagering system game user session, ending wagering in a dynamic multi-currency interleaved wagering system game user session but not ending a user's play of the interactive application portion of the dynamic multi-currency interleaved wagering system game, and changing from real credit wagering in a dynamic multi-currency interleaved wagering system to virtual credit wagering, or vice versa.

Dynamic Multi-Currency Interleaved Wagering System Controllers

Figure 2A:
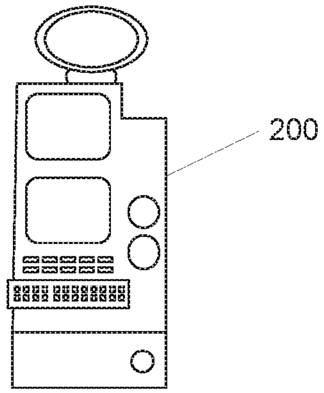
FIGS. 2A, 2B, 2C, and 2D are illustrations of interactive controllers of a dynamic multi-currency interleaved wagering system in accordance with various embodiments of the invention.
Figure 2B:
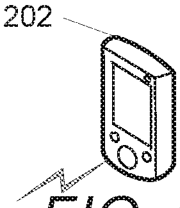
Figure 2C:
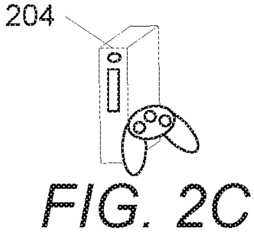
Figure 2D:
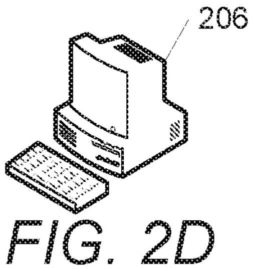

FIGS. 2A, 2B, 2C, and 2D are illustrations of interactive controllers of a dynamic multi-currency interleaved wagering system in accordance with various embodiments of the invention. An interactive controller, such as interactive controller 120 of FIG. 1, may be constructed from or configured using one or more processing devices configured to perform the operations of the interactive controller. An interactive controller may be constructed from or configured using an electronic gaming machine 200 as shown in FIG. 2A. The electronic gaming machine 200 may be physically located in various types of gaming establishments. An interactive controller may be constructed from or configured using a portable device 202 as shown in FIG. 2B. The portable device 202 is a device that may wirelessly connect to a network. Examples of portable devices include, but are not limited to, a tablet computer, a personal digital assistant, and a smartphone. An interactive controller may be constructed from or configured using a gaming console 204 as shown in FIG. 2C. An interactive controller may be constructed from or configured using a personal computer 206 as shown in FIG. 2D. Indeed, an interactive controller in a dynamic multi-currency interleaved wagering system may be constructed from or configured using any processing device including sufficient processing and communication capabilities that may be configured to perform the processes of an interactive controller in accordance with various embodiments of the invention.

Some dynamic multi-currency interleaved wagering systems in accordance with many embodiments of the invention can operate with their components being network connected or can communicate with other dynamic multi-currency interleaved wagering systems. In many embodiments, operations associated with components of a dynamic multi-currency interleaved wagering system can be performed on a single device or across multiple devices. These multiple devices can be constructed from or configured using a single server or a plurality of servers such that a dynamic multi-currency interleaved wagering system is executed as a system in a virtualized space such as, but not limited to, where a wager controller and an application controller are large scale centralized servers in the cloud operatively connected to widely distributed interactive controllers via a wide area network such as the Internet or a local area network. In such embodiments, the components of a dynamic multi-currency interleaved wagering system may communicate using a networking protocol or other type of device-to-device communications protocol.

In many embodiments, a centralized wager controller is operatively connected to, and communicates with, one or more application controllers via a network. The centralized wager controller can generate wager outcomes for wagers in accordance with one or more wagering propositions. The centralized wager controller can execute a number of simultaneous or pseudo-simultaneous wagers in order to generate wager outcomes for a variety of wagering propositions that one or more networked dynamic multi-currency interleaved wagering systems can use.

In several embodiments, a centralized application controller is operatively connected to one or more interactive controllers and one or more wager controllers via a network. The centralized application controller can perform the functionality of an application controller across various dynamic multi-currency interleaved wagering systems.

In a variety of embodiments, management of user profile data can be performed by a user management and session controller operatively connected to, and communicating with, one or more application controllers, wager controllers and interactive controllers via a network. A user management and session controller can manage data related to a user profile. The managed data in the user profile may include, but is not limited to, data concerning controlled entities (characters) in interactive application use, user performance metrics for a type or class of interactive application, interactive application elements acquired by a user; Cr and AC associated with a particular user, and tournament reservations.

Although a user management and session controller is discussed as being separate from an application controller server, a centralized application controller server may also perform the functions of a user management and session controller in some embodiments.

In a number of embodiments, an application controller of a dynamic multi-currency interleaved wagering system can communicate data to a user management and session controller. The data communicated by the application controller to the user management and session controller may include, but is not limited to, AC and Cr used in an interactive application; user profile data; user interaction activity; profile data for users; synchronization data between a wager controller and an interactive application; and data about other aspects of a dynamic multi-currency interleaved wagering system. In several embodiments, a user management and session controller can communicate user data to an application controller of a dynamic multi-currency interleaved wagering system. The user data may include, but is not limited to, interactive application title and type; tournament data; special offers; character or profile setup and synchronization data between a wagering game and an interactive application; and data about any other aspect of a dynamic multi-currency interleaved wagering system.

In numerous embodiments, an interactive application server provides a host for managing head-to-head play operating over a network of interactive controllers connected to the interactive application server via a network. The interactive application server provides an environment where users can compete directly with one another and interact with other users.

Processing devices connected via a network to construct dynamic multi-currency interleaved wagering systems in accordance with many embodiments of the invention can communicate with each other to provide services utilized by a dynamic multi-currency interleaved wagering system. In several embodiments, a wager controller can communicate with an application controller over a network. In some embodiments, the wager controller can communicate with an application controller to communicate any type of data as appropriate for a specific application. Examples of the data that may be communicated include, but are not limited to, data used to configure the various simultaneous or pseudo simultaneous wager controllers executing in parallel within the wager controller to accomplish dynamic multi-currency interleaved wagering system functionalities; data used to determine metrics of wager controller performance such as wagers run and/or wager outcomes for tracking system performance; data used to perform audits and/or provide operator reports; and data used to request the results of a wager outcome for use in one or more function(s) operating within the application controller such as, but not limited to, automatic drawings for prizes that are a function of interactive controller performance.

In several embodiments, an application controller can communicate with an interactive application server via a network when the interactive application server is also communicating with one or more interactive controllers over a network. An application controller can communicate with an interactive application server to communicate any type of data as appropriate for a specific application. The data that may be communicated between an application controller and an interactive application server includes, but is not limited to, the data for management of an interactive application server by an application controller server during a dynamic multi-currency interleaved wagering system tournament. In an example embodiment, an application controller may not be aware of the relationship of the application controller to the rest of a tournament since the actual tournament play may be managed by the interactive application server. Therefore, management of a dynamic multi-currency interleaved wagering system can include, but is not limited to tasks including, but not limited to, conducting tournaments according to system programming that can be coordinated by an operator of the dynamic multi-currency interleaved wagering system; allowing entry of a particular user into a tournament; communicating the number of users in a tournament; and the status of the tournament (such as, but not limited to the amount of surviving users, the status of each surviving user within the game, and time remaining on the tournament); communicating the performance of users within the tournament; communicating the scores of the various users in the tournament; and providing a synchronizing link to connect the application controllers in a tournament with their respective interactive controllers.

In several embodiments, an application controller can communicate with a user management and session controller via a network. An application controller can communicate with a user management and session controller to communicate any type of data as appropriate for a specific application. Examples of data communicated between an application controller and a user management and session controller include, but are not limited to, data for configuring tournaments according to system programming conducted by an operator of a dynamic multi-currency interleaved wagering system; data for exchange of data used to link a user's user profile to an ability to participate in various forms of dynamic multi-currency interleaved wagering system use (such as but not limited to the difficulty of play set by the application controller server for an interactive application that is a skill-based interactive game); data for determining a user's ability to participate in a tournament as a function of a user's characteristics (such as but not limited to a user's prowess or other metrics used for tournament screening); data for configuring application controller and interactive controller performance to suit preferences of a user on a particular dynamic multi-currency interleaved wagering system; and data for determining a user's use and wagering performance for the purposes of marketing intelligence; and data for logging secondary drawing awards, tournament prizes, Cr and/or AC into the user profile.

In many embodiments, the actual location of where various process are executed can be located either on a single device (wager controller, application controller, interactive controller), on servers (wager controller, application controller, or interactive application server), or a combination of both devices and servers. In a number of embodiments, certain functions of a wager controller, application controller, user management and session controller and/or interactive application server can operate on a local wager controller, application controller and/or interactive controller used to construct a dynamic multi-currency interleaved wagering system being provided locally on a device. In some embodiments, a controller or server can be part of a server system including multiple servers, where applications can be run on one or more physical devices. Similarly, in particular embodiments, multiple servers can be combined on a single physical device.

Figure 3A:
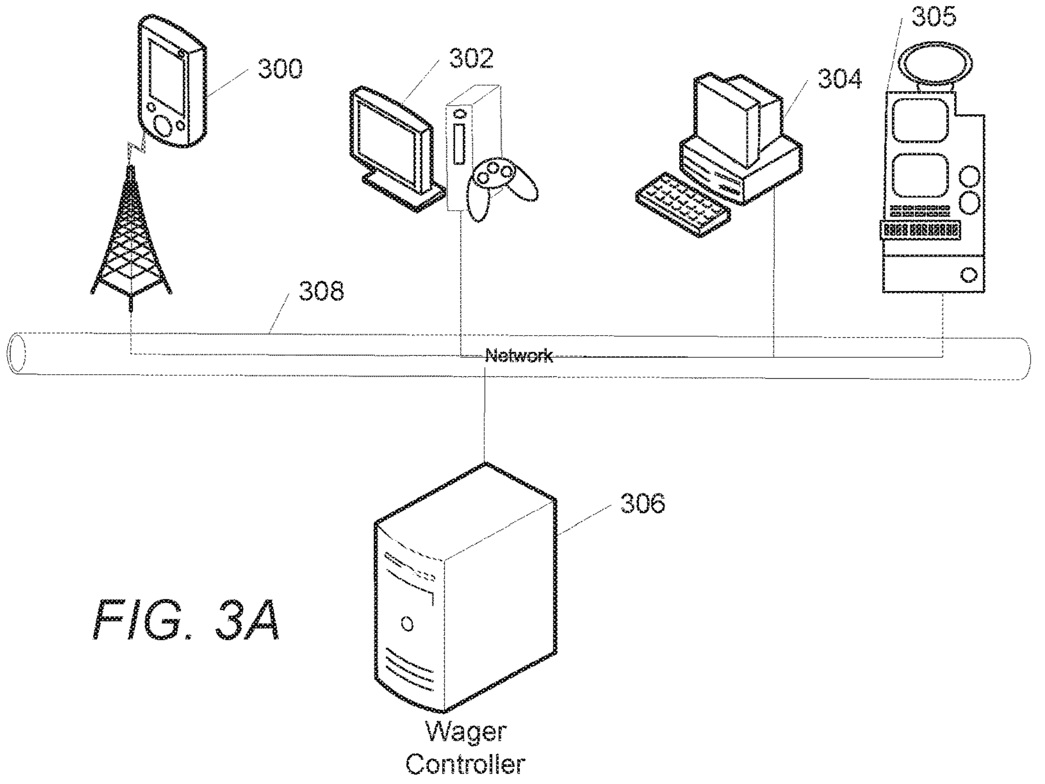
FIGS. 3A, 3B and 3C are network diagrams of distributed dynamic multi-currency interleaved wagering systems in accordance with various embodiments of the invention.
Figure 3B:
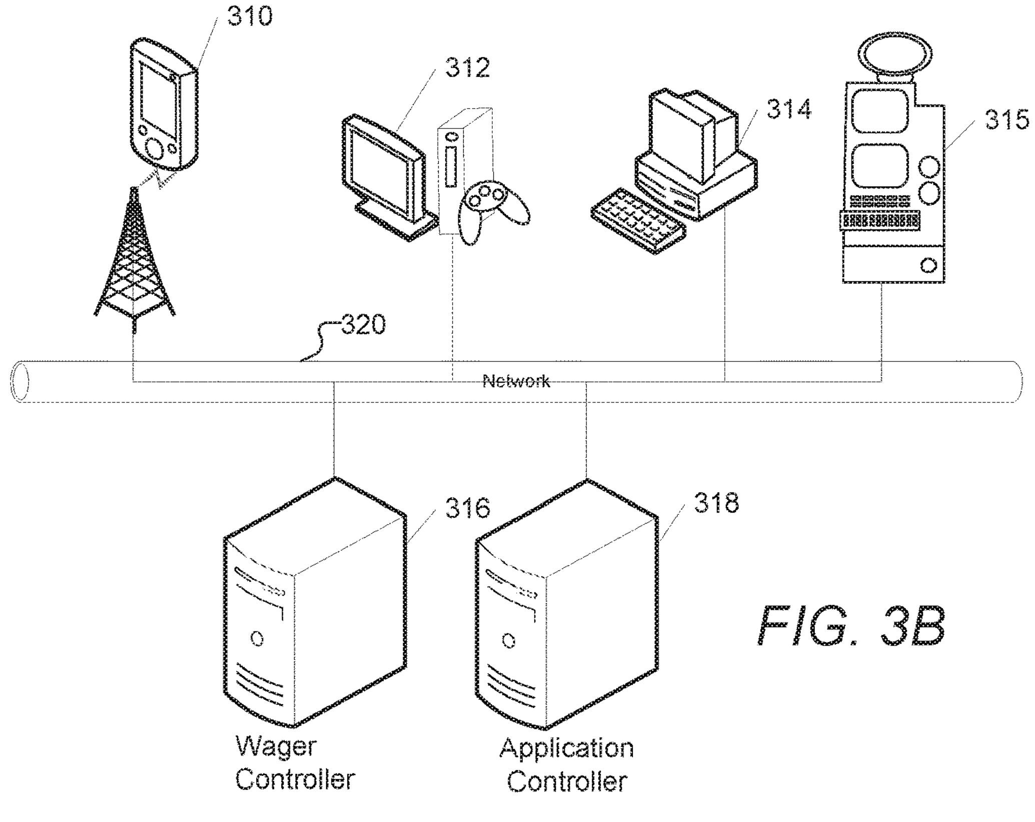
Figure 3C:
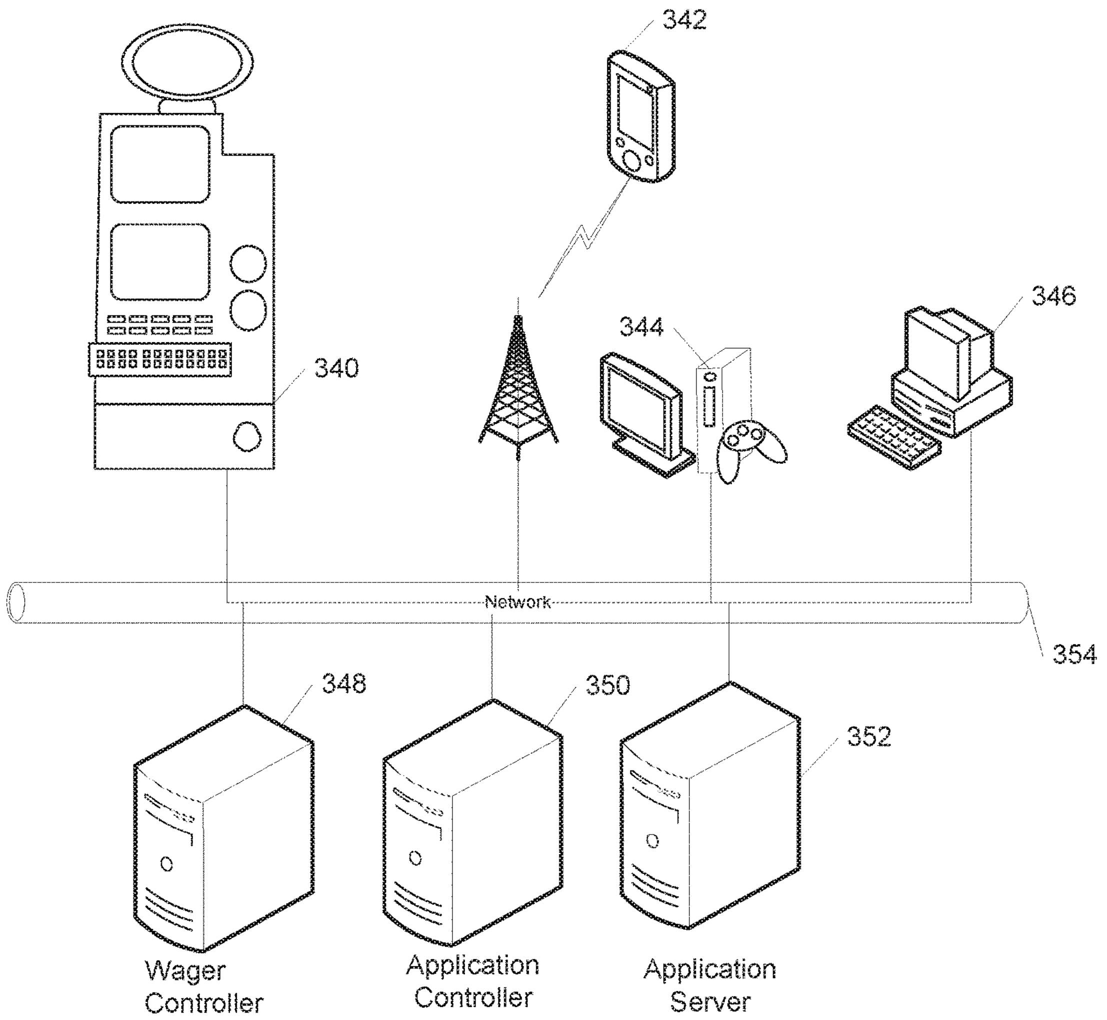

Some dynamic multi-currency interleaved wagering systems in accordance with many embodiments of the invention can be distributed across a network in various configurations. FIGS. 3A, 3B and 3C are network diagrams of networked dynamic multi-currency interleaved wagering systems in accordance with various embodiments of the invention. Turning now to FIG. 3A, one or more interactive controllers of a networked dynamic multi-currency interleaved wagering system, such as but not limited to, a mobile or wireless device 300, a gaming console 302, a personal computer 304, and an electronic gaming machine 305, are operatively connected with a wager controller 306 of a networked dynamic multi-currency interleaved wagering system over a network 308. Network 308 is communications network that allows processing systems communicate with each other and to share data. Examples of the network 308 can include, but are not limited to, a Local Area Network (LAN) and a Wide Area Network (WAN). In some embodiments, one or more processes of an interactive controller and an application controller as described herein are executed on the individual interactive controllers 300, 302, 304 and 305 while one or more processes of a wager controller as described herein can be executed by the wager controller 306.

A networked dynamic multi-currency interleaved wagering system in accordance with another embodiment of the invention is illustrated in FIG. 3B. As illustrated, one or more interactive controllers of a networked dynamic multi-currency interleaved wagering system, such as but not limited to, a mobile or wireless device 310, a gaming console 312, a personal computer 314, and an electronic gaming machine 315, are operatively connected with a wager controller server 316 and an application controller 318 over a network 320. Network 320 is a communications network that allows processing systems to communicate and share data. Examples of the network 320 can include, but are not limited to, a Local Area Network (LAN) and a Wide Area Network (WAN). In some embodiments, the processes of an interactive controller as described herein are executed on the individual interactive controllers 310, 312, 314 and 315. One or more processes of a wager controller as described herein are executed by the wager controller 316, and one or more processes of an application controller as described herein are executed by the application controller 318.

A networked dynamic multi-currency interleaved wagering systems in accordance with still another embodiment of the invention is illustrated in FIG. 3C. As illustrated, one or more interactive controllers of a networked dynamic multi-currency interleaved wagering system, such as but not limited to, a mobile device 342, a gaming console 344, a personal computer 346, and an electronic gaming machine 340 are operatively connected with a wager controller 348 and an application controller 350, and an interactive application server 352 over a network 354. Network 354 is a communications network that allows processing systems communicate and to share data. Examples of the network 354 can include, but are not limited to, a Local Area Network (LAN) and a Wide Area Network (WAN). In some embodiments, one or more processes of a display and user interface of an interactive controller as described herein are executed on the individual interactive controllers 340, 342, 344 and 346. One or more processes of a wager controller as described herein can be executed by the wager controller server 348. One or more processes of an application controller as described herein can be executed by the application controller server 350 and one or more processes of an interactive controller excluding the display and user interfaces can be executed by the interactive application server 352.

In various embodiments, a user management and session controller may be operatively connected to components of a dynamic multi-currency interleaved wagering system via a network. In other embodiments, a number of other peripheral systems, such as a user management system, a gaming establishment management system, a regulatory system, and/or hosting servers are also operatively connected with the dynamic multi-currency interleaved wagering systems over a network. Also, other servers can reside outside the bounds of a network within a firewall of the operator to provide additional services for network connected dynamic multi-currency interleaved wagering systems.

Although various networked dynamic multi-currency interleaved wagering systems are described herein, dynamic multi-currency interleaved wagering systems can be networked in any configuration as appropriate to the specification of a specific application in accordance with embodiments of the invention. In some embodiments, components of a networked dynamic multi-currency interleaved wagering system, such as an application controller, wager controller, interactive controller, or other servers that perform services for an application controller, wager controller and/or interactive controller, can be networked in different configurations for a specific networked dynamic multi-currency interleaved wagering system application.

Figure 4A:
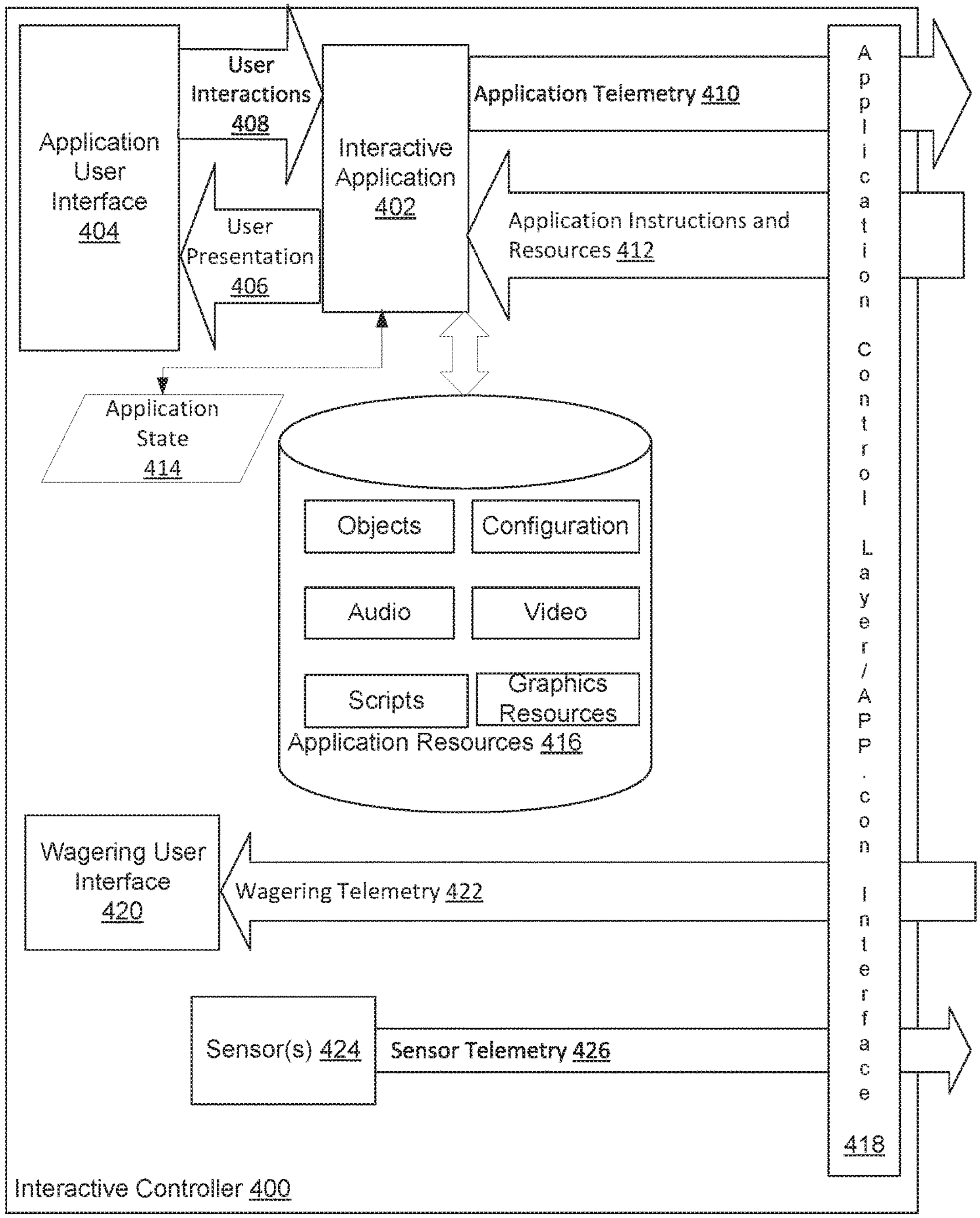
FIGS. 4A and 4B are diagrams of a structure of an interactive controller of a dynamic multi-currency interleaved wagering system in accordance with various embodiments of the invention.
Figure 4B:
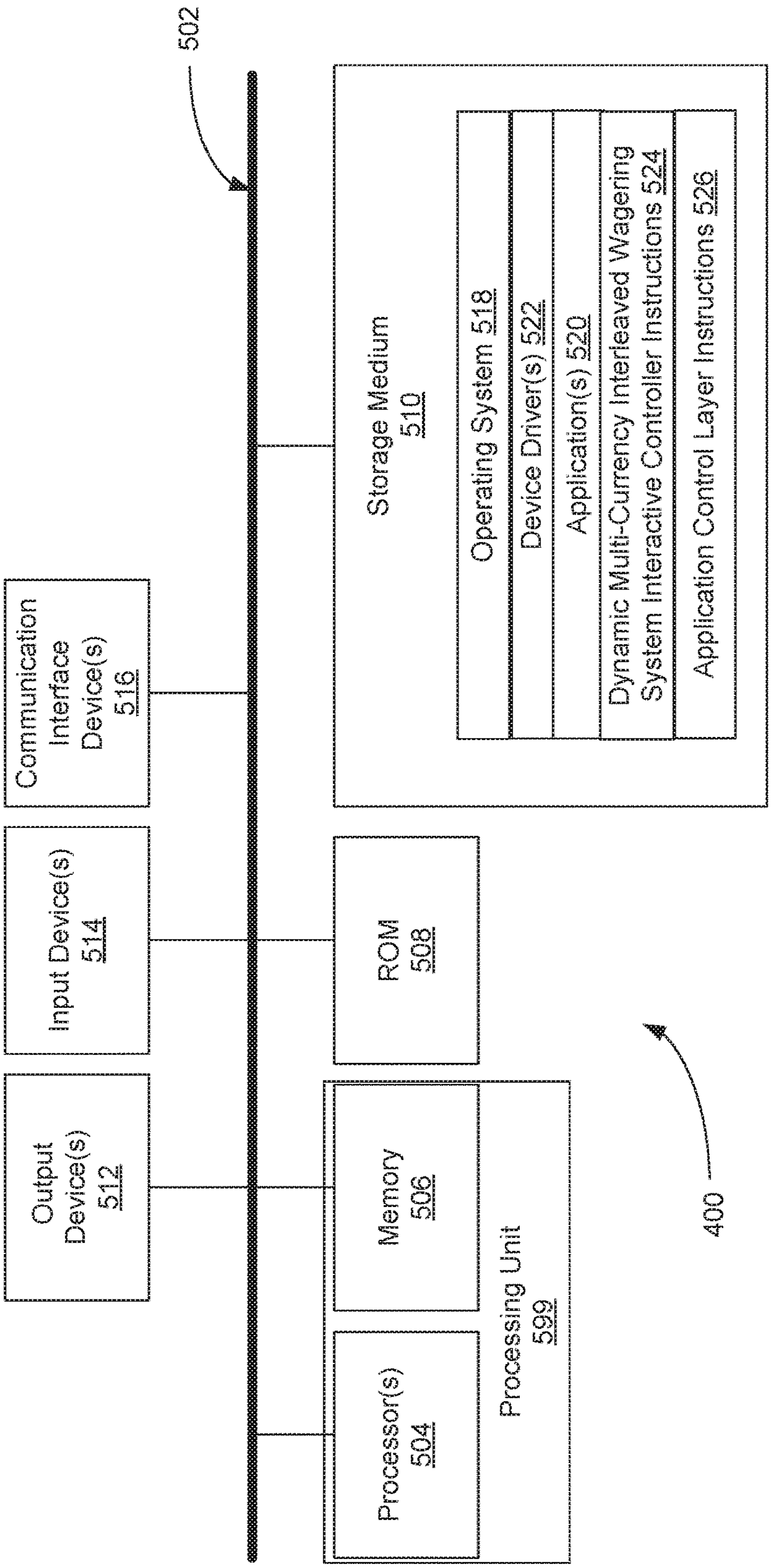

FIGS. 4A and 4B are diagrams of a structure of an interactive controller of a dynamic multi-currency interleaved wagering system in accordance with various embodiments of the invention. An interactive controller may be constructed from or configured using one or more processing devices configured to perform the operations of the interactive controller. In many embodiments, an interactive controller can be constructed from or configured using various types of processing devices including, but not limited to, a mobile device such as a smartphone or the like, a personal digital assistant, a wireless device such as a tablet computer or the like, an electronic gaming machine, a personal computer, a gaming console, a set-top box, a computing device, a controller, or the like.

Referring now to FIG. 4A, an interactive controller 400, suitable for use as interactive controller 120 of FIG. 1, provides an execution environment for an interactive application 402 of a dynamic multi-currency interleaved wagering system. In several embodiments, an interactive controller 400 of a dynamic multi-currency interleaved wagering system provides an interactive application 402 that generates an application user interface 404 for interaction with by a user. The interactive application 402 generates a user presentation 406 that is presented to the user through the application user interface 404. The user presentation 406 may include audio features, visual features or tactile features, or any combination of these features. The application user interface 404 further includes one or more human input devices (HIDs) interfaces that communicate with one or more HIDs (e.g., the input devices 514 of FIG. 4*b*) that the user can use to interact with the dynamic multi-currency interleaved wagering system. The user's interactions 408 are included by the interactive application 402 in application telemetry data 410 that is communicated by interactive controller 400 to various other components of a dynamic multi-currency interleaved wagering system as described herein. The interactive application 402 receives application instructions and resources 412 communicated from various other components of a dynamic multi-currency interleaved wagering system as described herein.

In some embodiments, various components of the interactive application 402 can read data from an application state 414 in order to provide one or more features of the interactive application. In various embodiments, components of the interactive application 402 can include, but are not limited to, a physics engine, a rules engine, and/or a graphics engine. The physics engine is used to simulate physical interactions between virtual objects in the interactive application 402. The rules engine implements the rules of the interactive application and a P/RNG that may be used for influencing or determining certain variables and/or outcomes to provide a randomizing influence on the operations of the interactive application. The graphics engine is used to generate a visual representation of the interactive application state to the user. Furthermore, the components may also include an audio engine to generate audio outputs for the user interface.

During operation, the interactive application reads and writes application resources 416 stored on a data store of the interactive controller host. The application resources 416 may include objects having graphics and/or control logic used to provide application environment objects of the interactive application. In various embodiments, the resources may also include, but are not limited to, video files that are used to generate a portion of the user presentation 406; audio files used to generate music, sound effects, etc. within the interactive application; configuration files used to configure the features of the interactive application; scripts or other types of control code used to provide various features of the interactive application; and graphics resources such as textures, objects, etc. that are used by a graphics engine to render objects displayed in an interactive application.

In operation, components of the interactive application 402 read portions of the application state 414 and generate the user presentation 406 for the user that is presented to the user using the user interface 404. The user perceives the user presentation and provides user interactions 408 using the HIDs. The corresponding user interactions are received as user actions or inputs by various components of the interactive application 402. The interactive application 402 translates the user actions into interactions with the virtual objects of the application environment stored in the application state 414. Components of the interactive application use the user interactions with the virtual objects of the interactive application and the interactive application state 414 to update the application state 414 and update the user presentation 406 presented to the user. The process loops continuously while the user interacts with the interactive application of the dynamic multi-currency interleaved wagering system.

The interactive controller 400 provides one or more interfaces 418 between the interactive controller 400 and other components of a dynamic multi-currency interleaved wagering system, such as, but not limited to, an application controller. The interactive controller 400 and the other dynamic multi-currency interleaved wagering system components communicate with each other using the interfaces. The interface may be used to pass various types of data, and to communicate and receive messages, status data, commands and the like. In certain embodiments, the interactive controller 400 and an application controller communicate application instructions and environment resources 412 and application telemetry data 410. In some embodiments, the communications include requests by the application controller that the interactive controller 400 update the application state 414 using data provided by the application controller.

In many embodiments, a communication by an application controller includes a request that the interactive controller 400 update one or more resources 416 using data provided by the application controller. In a number of embodiments, the interactive controller 400 provides all or a portion of the application state to the application controller. In some embodiments, the interactive controller 400 may also provide data about one or more of the application resources 416 to the application controller. In some embodiments, the communication includes user interactions that the interactive controller 400 communicates to the application controller. The user interactions may be low level user interactions with the user interface 404, such as manipulation of a HID, or may be high level interactions with game objects as determined by the interactive application. The user interactions may also include resultant actions such as modifications to the application state 414 or game resources 416 resulting from the user's interactions taken in the dynamic multi-currency interleaved wagering system interactive application. In some embodiments, user interactions include, but are not limited to, actions taken by entities such as non-player characters (NPC) of the interactive application that act on behalf of or under the control of the user.

In some embodiments, the interactive controller 400 includes a wagering user interface 420 used to communicate dynamic multi-currency interleaved wagering system telemetry data 422 to and from the user. The dynamic multi-currency interleaved wagering system telemetry data 422 from the dynamic multi-currency interleaved wagering system include, but are not limited to, data used by the user to configure Cr, AC and element wagers, and data about the wagering game Cr, AC and element wagers such as, but not limited to, Cr, AC and element balances and Cr, AC and element amounts wagered.

In some embodiments, the interactive controller includes one or more sensors 424. Such sensors may include, but are not limited to, physiological sensors that monitor the physiology of the user, environmental sensors that monitor the physical environment of the interactive controller, accelerometers that monitor changes in motion of the interactive controller, and location sensors that monitor the location of the interactive controller such as global positioning sensors (GPSs). The interactive controller 400 communicates sensor telemetry data 426 to one or more components of the dynamic multi-currency interleaved wagering system.

Referring now to FIG. 4B, interactive controller 400 includes a bus 502 that provides an interface for one or more processors 504, random access memory (RAM) 506, read only memory (ROM) 508, machine-readable storage medium 510, one or more user output devices 512, one or more user input devices 514, and one or more communication interface devices 516.

The one or more processors 504 may take many forms, such as, but not limited to: a central processing unit (CPU); a multi-processor unit (MPU); an ARM processor; a controller; a programmable logic device; or the like.

In the example embodiment, the one or more processors 504 and the random access memory (RAM) 506 form an interactive controller processing unit 599. In some embodiments, the interactive controller processing unit includes one or more processors operatively connected to one or more of a RAM, ROM, and machine-readable storage medium; the one or more processors of the interactive controller processing unit receive instructions stored by the one or more of a RAM, ROM, and machine-readable storage medium via a bus; and the one or more processors execute the received instructions. In some embodiments, the interactive controller processing unit is an ASIC (Application-Specific Integrated Circuit). In some embodiments, the interactive controller processing unit is a SoC (System-on-Chip).

Examples of output devices 512 include, but are not limited to, display screens; light panels; and/or lighted displays. In accordance with particular embodiments, the one or more processors 504 are operatively connected to audio output devices such as, but not limited to: speakers; and/or sound amplifiers. In accordance with many of these embodiments, the one or more processors 504 are operatively connected to tactile output devices like vibrators, and/or manipulators.

Examples of user input devices 514 include, but are not limited to: tactile devices including but not limited to, keyboards, keypads, foot pads, touch screens, and/or trackballs; non-contact devices such as audio input devices; motion sensors and motion capture devices that the interactive controller can use to receive inputs from a user when the user interacts with the interactive controller; physiological sensors that monitor the physiology of the user; environmental sensors that monitor the physical environment of the interactive controller; accelerometers that monitor changes in motion of the interactive controller; and location sensors that monitor the location of the interactive controller such as global positioning sensors.

The one or more communication interface devices 516 provide one or more wired or wireless interfaces for communicating data and commands between the interactive controller 400 and other devices that may be included in a dynamic multi-currency interleaved wagering system. Such wired and wireless interfaces include, but are not limited to: a Universal Serial Bus (USB) interface; a Bluetooth interface; a Wi-Fi interface; an Ethernet interface; a Near Field Communication (NFC) interface; a plain old telephone system (POTS) interface, a cellular or satellite telephone network interface; and the like.

The machine-readable storage medium 510 stores machine-executable instructions for various components of the interactive controller, such as but not limited to: an operating system 518; one or more device drivers 522; one or more application programs 520 including but not limited to an interactive application; and dynamic multi-currency interleaved wagering system interactive controller instructions 524 for use by the one or more processors 504 to provide the features of an interactive controller as described herein. In some embodiments, the machine-executable instructions further include application control layer/application control interface instructions 526 for use by the one or more processors 504 to provide the features of an application control layer/application control interface as described herein.

In various embodiments, the machine-readable storage medium 510 is one of a (or a combination of two or more of) a hard drive, a flash drive, a DVD, a CD, a flash storage, a solid state drive, a ROM, an EEPROM, and the like.

In operation, the machine-executable instructions are loaded into memory 506 from the machine-readable storage medium 510, the ROM 508 or any other storage location. The respective machine-executable instructions are accessed by the one or more processors 504 via the bus 502, and then executed by the one or more processors 504. Data used by the one or more processors 504 are also stored in memory 506, and the one or more processors 504 access such data during execution of the machine-executable instructions. Execution of the machine-executable instructions causes the one or more processors 504 to control the interactive controller 400 to provide the features of a dynamic multi-currency interleaved wagering system interactive controller as described herein Although the interactive controller is described herein as being constructed from or configured using one or more processors and instructions stored and executed by hardware components, the interactive controller can be constructed from or configured using only hardware components in accordance with other embodiments. In addition, although the storage medium 510 is described as being operatively connected to the one or more processors through a bus, those skilled in the art of interactive controllers will understand that the storage medium can include removable media such as, but not limited to, a USB memory device, an optical CD ROM, magnetic media such as tape and disks. In some embodiments, the storage medium 510 can be accessed by the one or more processors 504 through one of the communication interface devices 516 or over a network. Furthermore, any of the user input devices or user output devices can be operatively connected to the one or more processors 504 via one of the communication interface devices 516 or over a network.

In some embodiments, the interactive controller 400 can be distributed across a plurality of different devices. In many such embodiments, an interactive controller of a dynamic multi-currency interleaved wagering system includes an interactive application server operatively connected to an interactive client over a network. The interactive application server and interactive application client cooperate to provide the features of an interactive controller as described herein.

In various embodiments, the interactive controller 400 may be used to construct other components of a dynamic multi-currency interleaved wagering system as described herein.

In some embodiments, components of an interactive controller and an application controller of an wagering interleaved system may be constructed from or configured using a single device using processes that communicate using an interprocess communication protocol. In other such embodiments, the components of an interactive controller and an application controller of an wagering interleaved system may communicate by passing messages, parameters or the like.

In some embodiments, components of an interactive controller, an application controller and a wager controller of an wagering interleaved system may be constructed from or configured using a single device using processes that communicate using an interprocess communication protocol. In other such embodiments, the components of an interactive controller, an application controller and a wager controller of an wagering interleaved system may communicate by passing messages, parameters or the like.

Figure 5A:
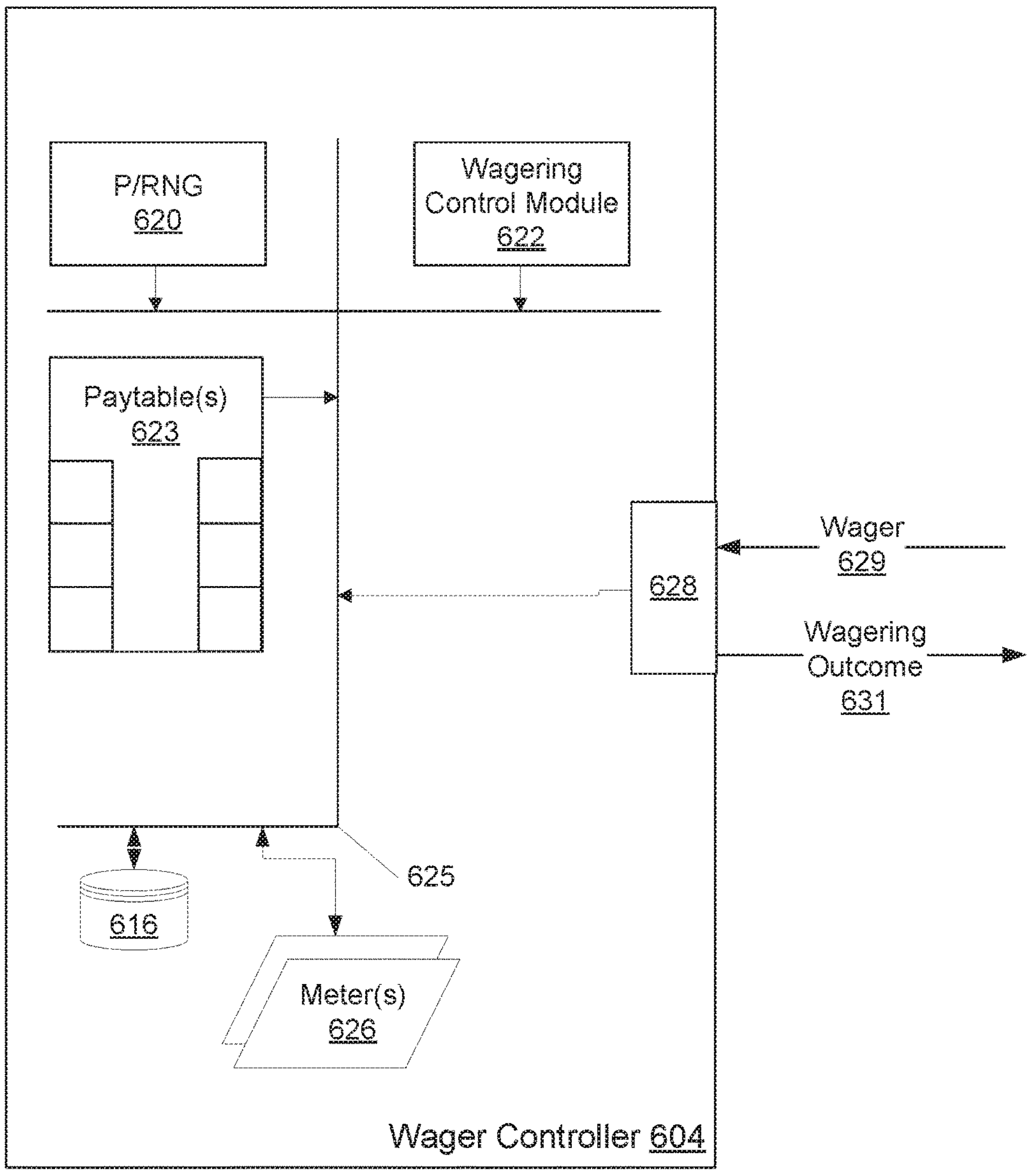
FIGS. 5A and 5B are diagrams of a structure of a wager controller of a dynamic multi-currency interleaved wagering system in accordance with various embodiments of the invention.
Figure 5B:
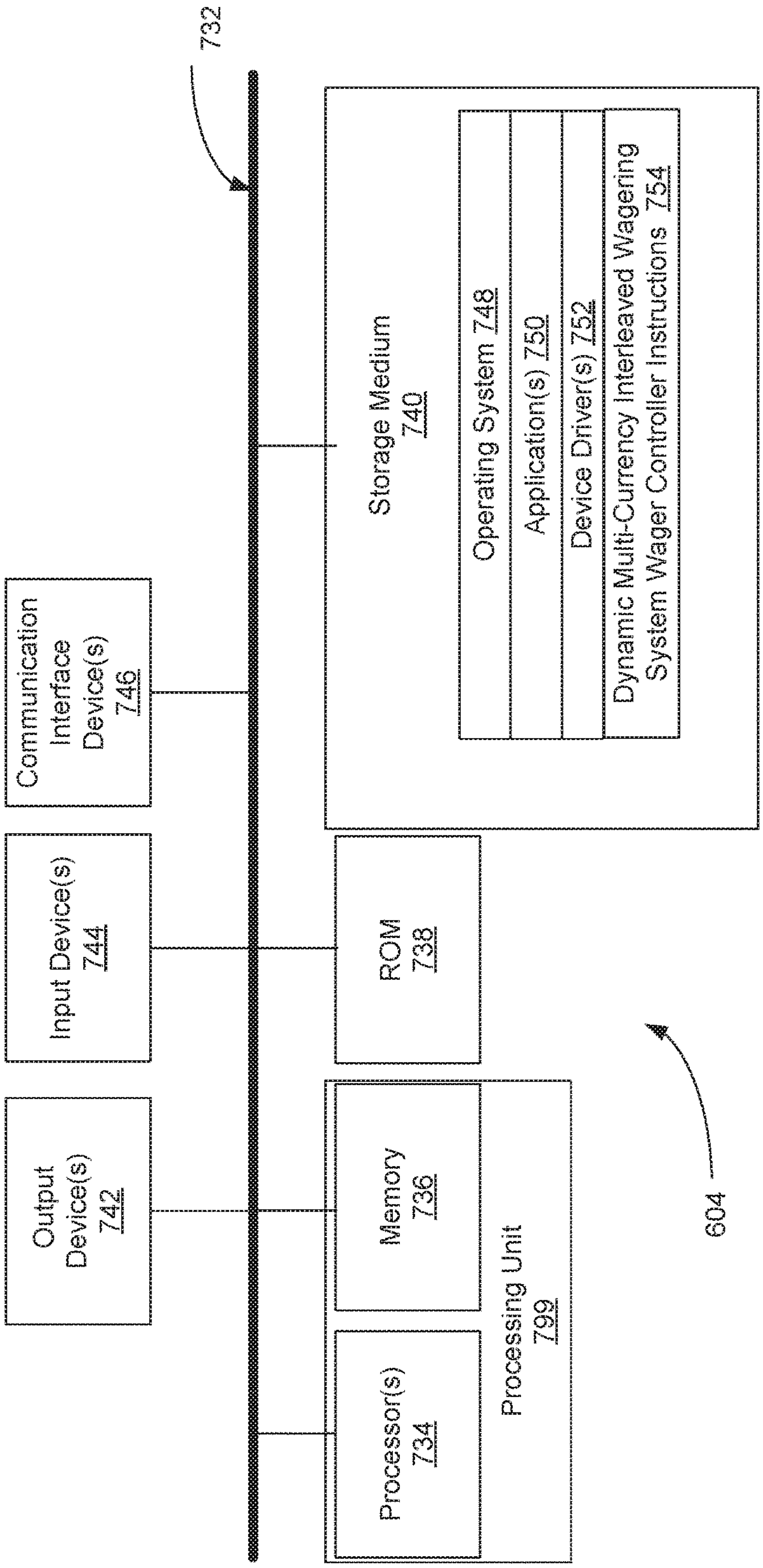

FIGS. 5A and 5B are diagrams of a structure of a wager controller of a dynamic multi-currency interleaved wagering system in accordance with various embodiments of the invention. A wager controller may be constructed from or configured using one or more processing devices configured to perform the operations of the wager controller. In many embodiments, a wager controller can be constructed from or configured using various types of processing devices including, but not limited to, a mobile device such as a smartphone or the like, a personal digital assistant, a wireless device such as a tablet computer or the like, an electronic gaming machine, a personal computer, a gaming console, a set-top box, a computing device, a controller, or the like.

Referring now to FIG. 5A, in various embodiments, a wager controller 604, suitable for use as wager controller 102 of FIG. 1, includes a pseudorandom or random number generator (P/RNG) 620 to produce random results or pseudo random results; one or more paytables 623 which includes a plurality of factors indexed by the random result to be multiplied with an amount of Cr, AC, elements, or objects committed in a wager; and a wagering control module 622 whose processes may include, but are not limited to, generating random results, looking up factors in the paytables, multiplying the factors by an amount of Cr, AC, elements, or objects wagered, and administering one or more Cr, AC, element, or object meters 626. The various wager controller components can interface with each other via an internal bus 625 and/or other appropriate communication mechanism.

An interface 628 allows the wager controller 604 to operatively connect to an external device, such as one or more application controllers as described herein. The interface 628 provides for receiving of wager data 629 from the external device that is used to specify wager parameters and/or trigger execution of a wager by the wager controller 604. The interface 628 may also provide for communicating wager outcome data 631 to an external device. In numerous embodiments, the interface between the wager controller 604 and other systems/devices may be a wide area network (WAN) such as the Internet. However, other methods of communication may be used including, but not limited to, a local area network (LAN), a universal serial bus (USB) interface, and/or some other method by which two electronic devices could communicate with each other.

In various embodiments, a wager controller 604 may use a P/RNG provided by an external system. The external system may be connected to the wager controller 604 by a suitable communication network such as a local area network (LAN) or a wide area network (WAN). In some embodiments, the external P/RNG is a central deterministic system that provides random or pseudo random results to one or more connected wager controllers.

During operation of the wager controller, the external system communicates wager data 629 to the wager controller 604. The wager controller 604 receives the wager data and uses the wager data to trigger execution of a wager in accordance with a wagering proposition. The wager controller 604 executes the wager and determines a wager outcome for the wager. The wager controller communicates wager outcome data 631 of the wager outcome to the external system.

In some embodiments, the wager controller uses the wager data to select a paytable 628 to use and/or an amount of Cr, AC, elements, or objects to wager.

In some embodiments, the wager outcome data may include, but is not limited to, an amount of Cr, AC, elements, or objects won in the wager.

In various embodiments, the wager outcome data may include, but is not limited to, an amount of Cr, AC, elements, or objects in the one or more meters 626.

In some embodiments, the wager outcome data includes state data for the wagering proposition of the executed wager. The state data may correspond to one or more game states of a gambling game that is associated with the wagering proposition. Examples of state data include, but are not limited to, reel strips in an operation state or a final state for a reel-based gambling game, one or more dice positions for a dice-based gambling game, positions of a roulette wheel and roulette ball, position of a wheel of fortune, or the like.

In various embodiments, the wagering control module 622 determines an amount of a wager and a paytable to use from the one or more paytables 623. In such embodiments, in response to the wager data triggering execution of the wager, the wager control module 622 executes the wager by requesting a P/RNG result from the P/RNG 620; retrieving a paytable from the one or more paytables 623; adjusting the one or more credit meters 626 for an amount of the wager; applying the P/RNG result to the retrieved paytable; multiplying the resultant factor from the paytable by an amount wagered to determine a wager outcome; updating the one or more meters 626 based on the wager outcome; and communicating the wager outcome to the external device.

In various embodiments, an external system communicates a request for a P/RNG result from the wager controller 604. In response, the wager controller 604 returns a P/RNG result as a function of an internal P/RNG or a P/RNG external to the external system to which the wager controller 604 is operatively connected.

In some embodiments, a communication exchange between the wager controller 604 and an external system relate to the external system support for coupling a P/RNG result to a particular paytable contained in the wager controller 604. In such an exchange, the external system communicates to the wager controller 604 as to which of the one or more paytables 623 to use, and requests a result whereby the P/RNG result would be associated with the requested paytable 623. The result of the coupling is returned to the external system. In such an exchange, no actual Cr, AC, element, or object wager is conducted, but might be useful in coupling certain non-value wagering interactive application behaviors and propositions to the same final resultant wagering return which is understood for the dynamic multi-currency interleaved wagering system to conduct wagering.

In some embodiments, the wager controller 604 may also include storage for statuses, wagers, wager outcomes, meters and other historical events in a storage device 616.

In some embodiments, an authorization access module provides a process to permit access and command exchange with the wager controller 604 and access to the one or more credit meters 626 for the amount of Cr, AC, elements, or objects being wagered by the user in the dynamic multi-currency interleaved wagering system.

In numerous embodiments, communication occurs between various types of a wager controller and an external system 630, such as application controller. In some of these embodiments, the purpose of the wager controller is to allocate wagers to pools, detect occurrences of one or more events upon which the wagers were made, and determine the wager outcomes for each individual wager based on the number of winning wagers and the amount paid into the pool.

In some embodiments, the wager controller manages accounts for individual users wherein the users make deposits into the accounts, amounts are deducted from the accounts, and amounts are credited to the users' accounts based on the wager outcomes.

In some embodiments a wager controller is a pari-mutuel wagering system such as used for wagering on an events such as horse races, greyhound races, sporting events and the like. In a pari-mutuel wagering system, user's wagers on the outcome of an event are allocated to a pool. When the event occurs, wager outcomes are calculated by sharing the pool among all winning wagers.

In various embodiments, a wager controller is a central determination system, such as but not limited to a central determination system for a Class II wagering system or a wagering system in support of a "scratch off" style lottery. In such a wagering system, a player plays against other players and competes for a common prize. In a given set of wager outcomes, there are a certain number of wins and losses. Once a certain wager outcome has been determined, the same wager outcome cannot occur again until a new set of wager outcomes is generated.

In numerous embodiments, communication occurs between various components of a wager controller 604 and an external system, such as an application controller. In some of these embodiments, the purpose of the wager controller 604 is to manage wagering on wagering events and to provide random (or pseudo random) results from a P/RNG.

Referring now to FIG. 5B, wager controller 604 includes a bus 732 that provides an interface for one or more processors 734, random access memory (RAM) 736, read only memory (ROM) 738, machine-readable storage medium 740, one or more user output devices 742, one or more user input devices 744, and one or more communication interface and/or network interface devices 746.

The one or more processors 734 may take many forms, such as, but not limited to, a central processing unit (CPU), a multi-processor unit (MPU), an ARM processor, a controller, a programmable logic device, or the like.

In the example embodiment, the one or more processors 734 and the random access memory (RAM) 736 form a wager controller processing unit 799. In some embodiments, the wager controller processing unit includes one or more processors operatively connected to one or more of a RAM, ROM, and machine-readable storage medium; the one or more processors of the wager controller processing unit receive instructions stored by the one or more of a RAM, ROM, and machine-readable storage medium via a bus; and the one or more processors execute the received instructions. In some embodiments, the wager controller processing unit is an ASIC (Application-Specific Integrated Circuit). In some embodiments, the wager controller processing unit is a SoC (System-on-Chip).

Examples of output devices 742 include, but are not limited to, display screens, light panels, and/or lighted displays. In accordance with particular embodiments, the one or more processors 734 are operatively connected to audio output devices such as, but not limited to speakers, and/or sound amplifiers. In accordance with many of these embodiments, the one or more processors 734 are operatively connected to tactile output devices like vibrators, and/or manipulators.

Examples of user input devices 734 include, but are not limited to, tactile devices including but not limited to, keyboards, keypads, touch screens, and/or trackballs; non-contact devices such as audio input devices; motion sensors and motion capture devices that the wager controller can use to receive inputs from a user when the user interacts with the wager controller 604.

The one or more communication interface and/or network interface devices 746 provide one or more wired or wireless interfaces for exchanging data and commands between the wager controller 604 and other devices that may be included in a dynamic multi-currency interleaved wagering system. Such wired and wireless interfaces include, but are not limited to: a Universal Serial Bus (USB) interface; a Bluetooth interface; a Wi-Fi interface; an Ethernet interface; a Near Field Communication (NFC) interface; a plain old telephone system (POTS) interface; a cellular or satellite telephone network interface; and the like.

The machine-readable storage medium 740 stores machine-executable instructions for various components of a wager controller, such as but not limited to: an operating system 748; one or more application programs 750; one or more device drivers 752; and dynamic multi-currency interleaved wagering system wager controller instructions 754 for use by the one or more processors 734 to provide the features of a dynamic multi-currency interleaved wagering system wager controller as described herein.

In various embodiments, the machine-readable storage medium 740 is one of a (or a combination of two or more of) a hard drive, a flash drive, a DVD, a CD, a flash storage, a solid state drive, a ROM, an EEPROM, and the like.

In operation, the machine-executable instructions are loaded into memory 736 from the machine-readable storage medium 740, the ROM 738 or any other storage location. The respective machine-executable instructions are accessed by the one or more processors 734 via the bus 732, and then executed by the one or more processors 734. Data used by the one or more processors 734 are also stored in memory 736, and the one or more processors 734 access such data during execution of the machine-executable instructions. Execution of the machine-executable instructions causes the one or more processors 734 to control the wager controller 604 to provide the features of a dynamic multi-currency interleaved wagering system wager controller as described herein Although the wager controller 604 is described herein as being constructed from or configured using one or more processors and machine-executable instructions stored and executed by hardware components, the wager controller can be composed of only hardware components in accordance with other embodiments. In addition, although the storage medium 740 is described as being operatively connected to the one or more processors through a bus, those skilled in the art of processing devices will understand that the storage medium can include removable media such as, but not limited to, a USB memory device, an optical CD ROM, magnetic media such as tape and disks. In some embodiments, the storage medium 740 can be accessed by the one or more processors 734 through one of the interfaces or over a network. Furthermore, any of the user input devices or user output devices can be operatively connected to the one or more processors 734 via one of the interfaces or over a network.

In various embodiments, the wager controller 604 may be used to construct other components of a dynamic multi-currency interleaved wagering system as described herein.

In some embodiments, components of a wager controller and an application controller of an wagering interleaved system may be constructed from or configured using a single device using processes that communicate using an interprocess communication protocol. In other such embodiments, the components of a wager controller and an application controller of an wagering interleaved system may communicate by passing messages, parameters or the like.

It should be understood that there may be many embodiments of a wager controller 604 which could be possible, including forms where many modules and components of the wager controller are located in various servers and locations, so the foregoing is not meant to be exhaustive or all inclusive, but rather provide data on various embodiments of a wager controller 604.

Figure 6A:
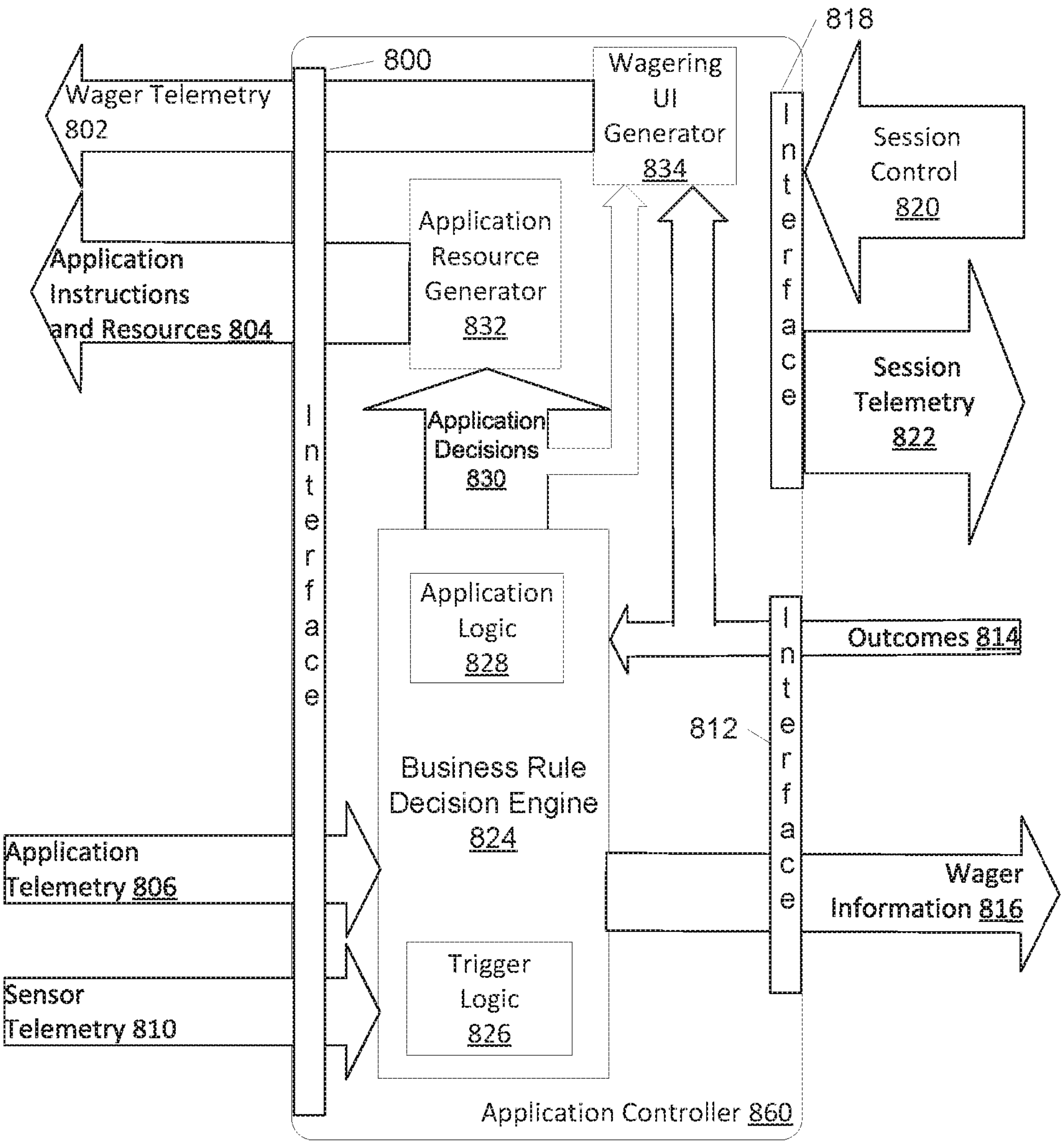
FIGS. 6A and 6B are diagrams of a structure of an application controller of a dynamic multi-currency interleaved wagering system in accordance with various embodiments of the invention.
Figure 6B:
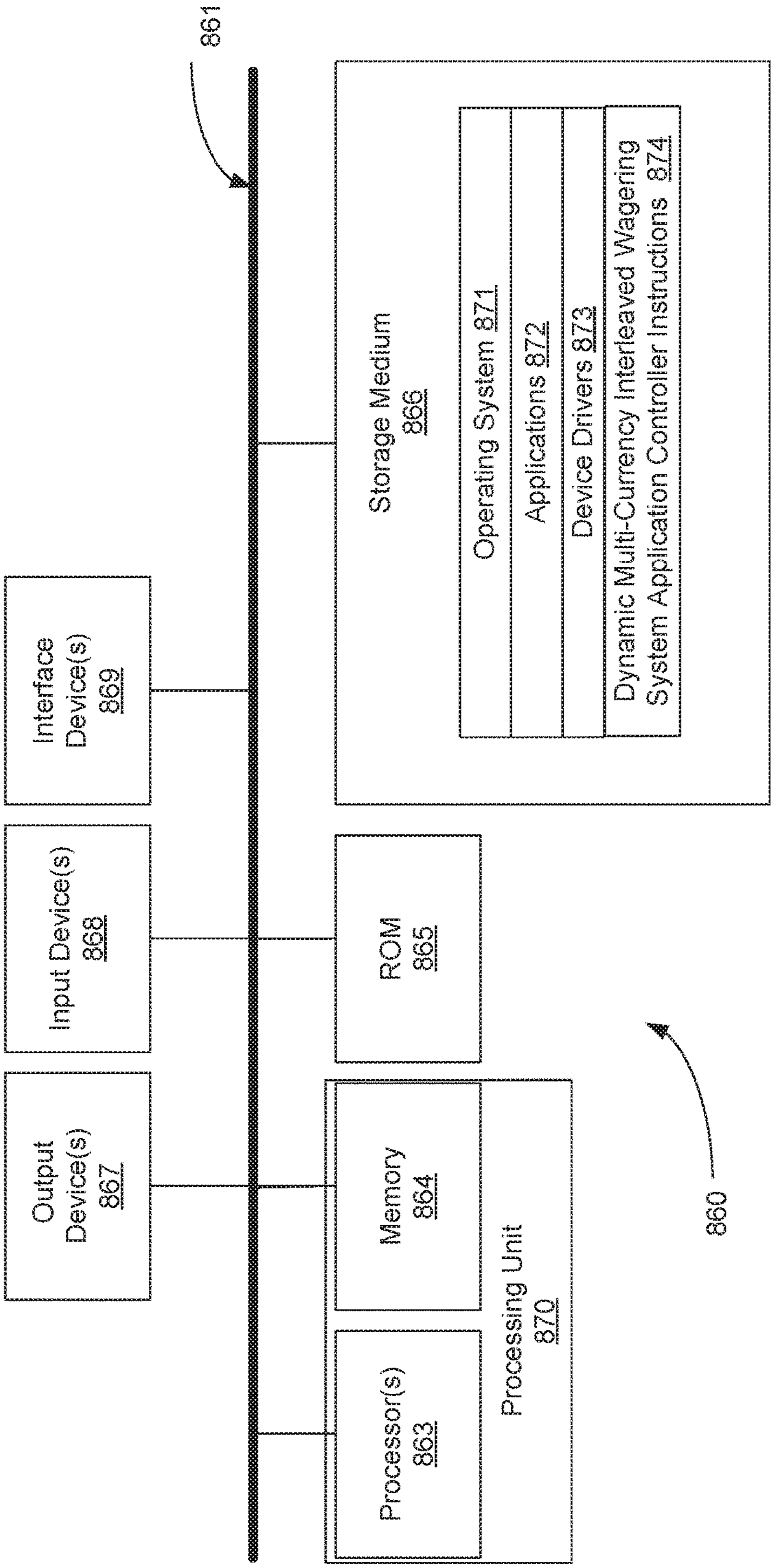

FIGS. 6A and 6B are diagrams of a structure of an application controller of a dynamic multi-currency interleaved wagering system in accordance with various embodiments of the invention. An application controller may be constructed from or configured using one or more processing devices configured to perform the operations of the application controller. In many embodiments, an application controller can be constructed from or configured using various types of processing devices including, but not limited to, a mobile device such as a smartphone, a personal digital assistant, a wireless device such as a tablet computer or the like, an electronic gaming machine, a personal computer, a gaming console, a set-top box, a computing device, a controller, or the like.

Referring now to FIG. 6A, in many embodiments, an application controller 860, suitable for use as application controller 112 of FIG. 1, manages operation of a dynamic multi-currency interleaved wagering system, with a wager controller and an interactive controller being support units to the application controller 860. The application controller 860 provides an interface between the interactive application, provided by an interactive controller, and a wagering proposition, provided by a wager controller.

In some embodiments, the application controller 860 includes an interactive controller interface 800 to an interactive controller. The interactive controller interface 800 provides for communication of data between an interactive controller and the application controller 860, including but not limited to wager telemetry data 802, application instructions and resources 804, application telemetry data 806, and sensor telemetry data 810.

In various embodiments, the application controller 860 includes a wager controller interface 812 to a wager controller. The wager controller interface 812 provides for communication of data between the application controller 860 and a wager controller, including but not limited to wager outcomes 814 and wager data 816.

In some embodiments, the application controller 860 includes a user management and session controller interface 818 to a user management and session controller. The user management and session controller interface 818 provides for communication of data between the application controller 860 and a user management and session controller, including but not limited to user session control data 820 and user session telemetry data 822.

The application controller 860 includes a business rule decision engine 824 that receives telemetry data, such as application telemetry data and sensor telemetry data, from an interactive controller. The business rule decision engine 824 uses the telemetry data, along with trigger logic 826 to generate wager data used to trigger a wager in a wager controller.

In some embodiments, the application telemetry data includes, but is not limited to, application environment variables that indicate the state of an interactive application being used by a user, interactive controller data indicating a state of an interactive controller, and user actions and interactions between a user and an interactive application provided by an interactive controller. The wagering and/or wager data may include, but is not limited to, an amount and type of the wager, a trigger of the wager, and a selection of a paytable to be used when executing the wager.

In some embodiments, the business rule decision engine 824 also receives wager outcome data from a wager controller. The decision engine 824 uses the wager outcome data, in conjunction with telemetry data and application logic 828 to generate application decisions 830 communicated to an application resource generator 832. The application resource generator 832 receives the application decisions and uses the application decisions to generate application instructions and application resources to be communicated to an interactive application.

In many embodiments, the application controller 860 includes a pseudo random or random result generator used to generate random results that are communicated to the application resource generator 832. The application resource generator uses the random results to generate application instructions and application resources to be communicated to an interactive controller for use by an interactive application.

In various embodiments, the business rule decision engine 824 also determines an amount of AC to award to a user based at least in part on the user's use of an interactive application of the dynamic multi-currency interleaved wagering system as determined from application telemetry data. In some embodiments, wager outcome data may also be used to determine the amount of AC that should be awarded to the user.

In numerous embodiments, an interactive application is a skill-based interactive game and the AC is awarded to the user for the user's skillful play of the skill-based interactive game.

In some embodiments, the application decisions and wager outcome data are communicated to a wagering user interface generator 834. The wagering user interface generator 834 receives the application decisions and wager outcome data and generates wager telemetry data describing the state of wagering and credit accumulation and loss for the dynamic multi-currency interleaved wagering system. In some embodiments, the wager telemetry data 146 may include, but is not limited to, amounts of AC and elements earned, lost or accumulated by the user through use of the interactive application as determined from the application decisions, and Cr amounts won, lost or accumulated as determined from the wager outcome data and the one or more credit meters.

In some embodiments, the wager outcome data 814 also includes data about one or more game states of a gambling game executed in accordance with a wagering proposition by a wager controller. In various such embodiments, the wagering user interface generator 834 generates a gambling game process display and/or gambling game state display using the one or more game states of the gambling game. The gambling game process display and/or gambling game state display is included in wager telemetry data that is communicated to an interactive controller. The gambling game process display and/or a gambling game state display is displayed by a wagering user interface of the interactive controller to a user. In other such embodiments, the one or more game states of the gambling game are communicated to an interactive controller and a wagering user interface of the interactive controller generates a gambling game process display and/or gambling game state display using the one or more game states of the gambling game for display to a user.

The application controller 860 can further operatively connect to a wager controller to determine an amount of credit or elements available and other wagering metrics of a wagering proposition. Thus, the application controller 860 may potentially affect an amount of Cr in play for participation in the wagering events of a wagering game provided by the wager controller. The application controller 860 may additionally include various audit logs and activity meters. In some embodiments, the application controller 860 can also couple to a centralized server for exchanging various data related to the user and the activities of the user during game play of a dynamic multi-currency interleaved wagering system.

In some embodiments, the operation of the application controller 860 does not affect the provision of a wagering proposition by a wager controller except for user choice parameters that are allowable in accordance with the wagering proposition. Examples of user choice parameters include, but are not limited to: wager terms such as but not limited to a wager amount; speed of game play (for example, by pressing a button or pulling a handle of a slot machine); and/or agreement to wager into a bonus round.

In a number of embodiments, communication of wager data between a wager controller and the application controller 860 can further be used to communicate various wagering control factors that the wager controller uses as input. Examples of wagering control factors include, but are not limited to, an amount of Cr, AC, elements, or objects consumed per wagering event, and/or the user's election to enter a jackpot round.

In some embodiments, the application controller 860 utilizes a wagering user interface to communicate certain interactive application data to the user, including but not limited to, club points, user status, control of the selection of user choices, and messages which a user can find useful in order to adjust the interactive application experience or understand the wagering status of the user in accordance with the wagering proposition in the wager controller.

In some embodiments, the application controller 860 utilizes a wagering user interface to communicate aspects of a wagering proposition to the user including, but not limited to, odds of certain wager outcomes, amount of Cr, AC, elements, or objects in play, and amounts of Cr, AC, elements, or objects available.

In a number of embodiments, a wager controller can accept wager proposition factors including, but not limited to, modifications in the amount of Cr, AC, elements, or objects wagered on each individual wagering event, a number of wagering events per minute the wager controller can resolve, entrance into a bonus round, and other factors. In several embodiments, the application controller 860 can communicate a number of factors back and forth to the wager controller, such that an increase/decrease in a wagered amount can be related to the change in user profile of the user in the interactive application. In this manner, a user can control a wager amount per wagering event in accordance with the wagering proposition with the change mapping to a parameter or component that is applicable to the interactive application experience.

Referring now to FIG. 6B, application controller 860 includes a bus 861 providing an interface for one or more processors 863, random access memory (RAM) 864, read only memory (ROM) 865, machine-readable storage medium 866, one or more user output devices 867, one or more user input devices 868, and one or more communication interface and/or network interface devices 869.

The one or more processors 863 may take many forms, such as, but not limited to: a central processing unit (CPU); a multi-processor unit (MPU); an ARM processor; a programmable logic device; or the like.

Examples of output devices 867 include, include, but are not limited to: display screens; light panels; and/or lighted displays. In accordance with particular embodiments, the one or more processors 863 are operatively connected to audio output devices such as, but not limited to: speakers; and/or sound amplifiers. In accordance with many of these embodiments, the one or more processors 863 are operatively connected to tactile output devices like vibrators, and/or manipulators.

In the example embodiment, the one or more processors 863 and the random access memory (RAM) 864 form an application controller processing unit 870. In some embodiments, the application controller processing unit includes one or more processors operatively connected to one or more of a RAM, ROM, and machine-readable storage medium; the one or more processors of the application controller processing unit receive instructions stored by the one or more of a RAM, ROM, and machine-readable storage medium via a bus; and the one or more processors execute the received instructions. In some embodiments, the application controller processing unit is an ASIC (Application-Specific Integrated Circuit). In some embodiments, the application controller processing unit is a SoC (System-on-Chip).

Examples of user input devices 868 include, but are not limited to: tactile devices including but not limited to, keyboards, keypads, foot pads, touch screens, and/or trackballs; non-contact devices such as audio input devices; motion sensors and motion capture devices that the application controller can use to receive inputs from a user when the user interacts with the application controller 860.

The one or more communication interface and/or network interface devices 869 provide one or more wired or wireless interfaces for exchanging data and commands between the application controller 860 and other devices that may be included in a dynamic multi-currency interleaved wagering system. Such wired and wireless interfaces include, but are not limited to: a Universal Serial Bus (USB) interface; a Bluetooth interface; a Wi-Fi interface; an Ethernet interface; a Near Field Communication (NFC) interface; a plain old telephone system (POTS), cellular, or satellite telephone network interface; and the like.

The machine-readable storage medium 866 stores machine-executable instructions for various components of the application controller 860 such as, but not limited to: an operating system 871; one or more applications 872; one or more device drivers 873; and dynamic multi-currency interleaved wagering system application controller instructions 874 for use by the one or more processors 863 to provide the features of an application controller as described herein.

In various embodiments, the machine-readable storage medium 870 is one of a (or a combination of two or more of) a hard drive, a flash drive, a DVD, a CD, a flash storage, a solid state drive, a ROM, an EEPROM, and the like.

In operation, the machine-executable instructions are loaded into memory 864 from the machine-readable storage medium 866, the ROM 865 or any other storage location. The respective machine-executable instructions are accessed by the one or more processors 863 via the bus 861, and then executed by the one or more processors 863. Data used by the one or more processors 863 are also stored in memory 864, and the one or more processors 863 access such data during execution of the machine-executable instructions. Execution of the machine-executable instructions causes the one or more processors 863 to control the application controller 860 to provide the features of a dynamic multi-currency interleaved wagering system application controller as described herein.

Although the application controller 860 is described herein as being constructed from or configured using one or more processors and instructions stored and executed by hardware components, the application controller can be composed of only hardware components in accordance with other embodiments. In addition, although the storage medium 866 is described as being operatively connected to the one or more processors through a bus, those skilled in the art of application controllers will understand that the storage medium can include removable media such as, but not limited to, a USB memory device, an optical CD ROM, magnetic media such as tape and disks. Also, in some embodiments, the storage medium 866 may be accessed by processor 863 through one of the interfaces or over a network. Furthermore, any of the user input devices or user output devices may be operatively connected to the one or more processors 863 via one of the interfaces or over a network.

In various embodiments, the application controller 860 may be used to construct other components of a dynamic multi-currency interleaved wagering system as described herein.

In some embodiments, components of a wager controller and an application controller of an wagering interleaved system may be constructed from or configured using a single device using processes that communicate using an interprocess communication protocol. In other such embodiments, the components of a wager controller and an application controller of an wagering interleaved system may communicate by passing messages, parameters or the like.

In some embodiments, components of an interactive controller and an application controller of an wagering interleaved system may be constructed from or configured using a single device using processes that communicate using an interprocess communication protocol. In other such embodiments, the components of an interactive controller and an application controller of an wagering interleaved system may communicate by passing messages, parameters or the like.

In numerous embodiments, any of a wager controller, an application controller, or an interactive controller as described herein can be constructed from or configured using multiple processing devices, whether dedicated, shared, or distributed in any combination thereof, or can be constructed from or configured using a single processing device. In addition, while certain aspects and features of dynamic multi-currency interleaved wagering system processes described herein have been attributed to a wager controller, an application controller, or an interactive controller, these aspects and features can be provided in a distributed form where any of the features or aspects can be provided by any of a wager controller, an application controller, and/or an interactive controller within a dynamic multi-currency interleaved wagering system without deviating from the spirit of the invention.

Figure 7A:
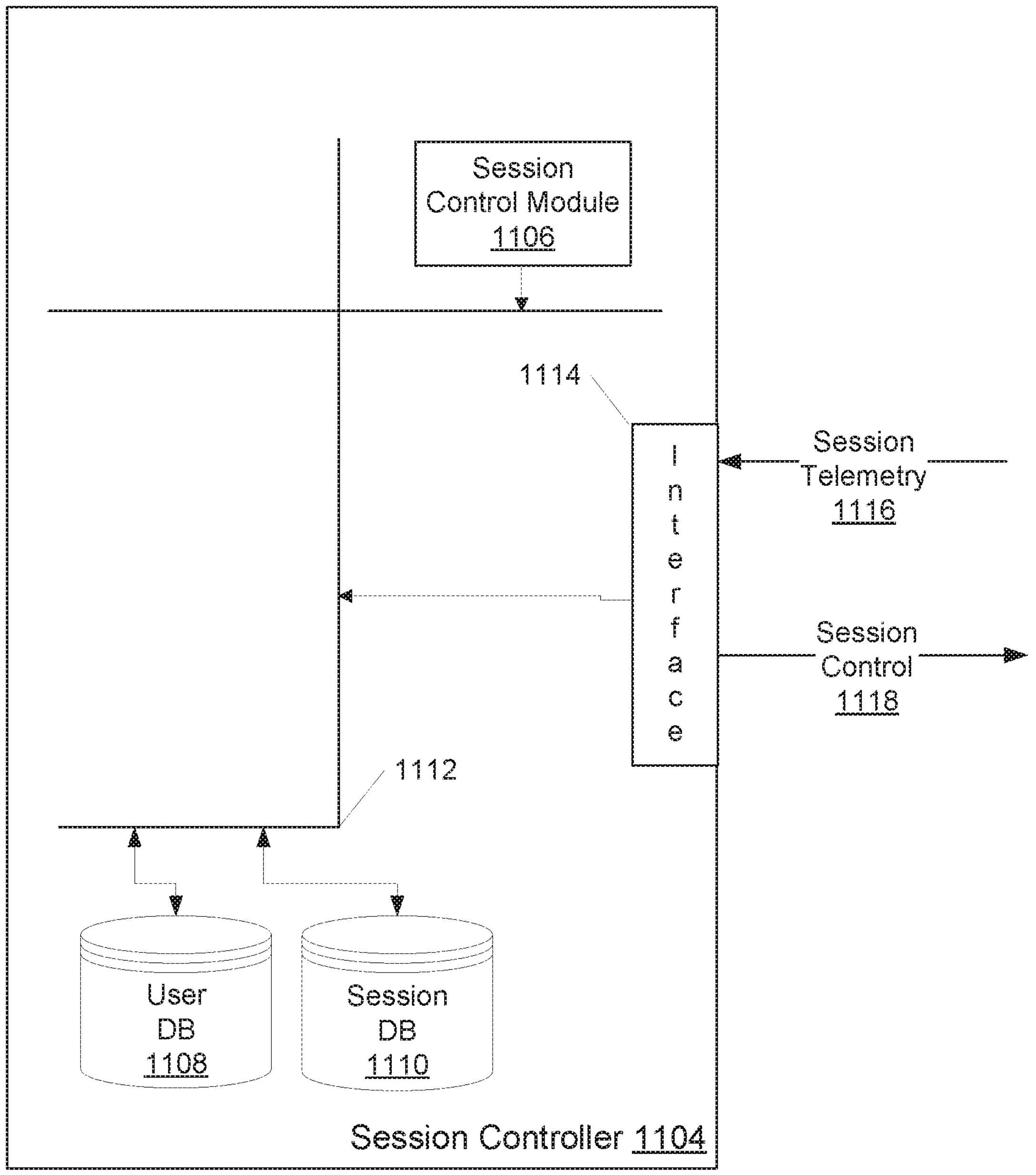
FIGS. 7A and 7B are diagrams of a structure of a user management and session controller of a dynamic multi-currency interleaved wagering system in accordance with various embodiments of the invention.
Figure 7B:
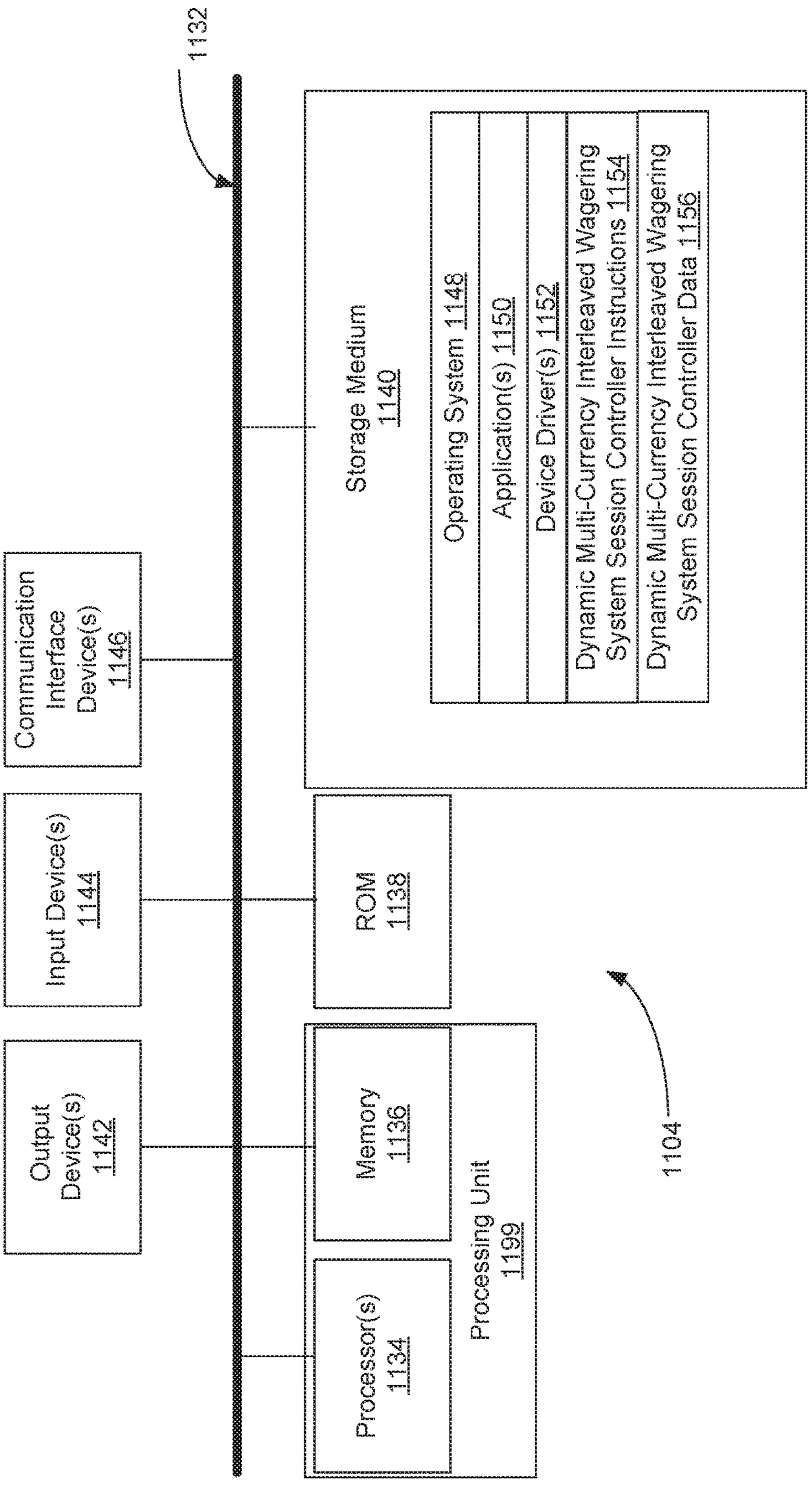

FIGS. 7A and 7B are diagrams of a structure of a user management and session controller of a dynamic multi-currency interleaved wagering system in accordance with various embodiments of the invention. A user management and session controller may be constructed from or configured using one or more processing devices configured to perform the operations of the user management and session controller. In many embodiments, a wager user session can be constructed from or configured using various types of processing devices including, but not limited to, a mobile device such as a smartphone or the like, a personal digital assistant, a wireless device such as a tablet computer or the like, an electronic gaming machine, a personal computer, a gaming console, a set-top box, a computing device, a controller, a server, or the like.

Referring now to FIG. 7A, in various embodiments, a user management and session controller 1104, suitable for use as user management and session controller 150 of FIG. 1, includes a user management and session control module 1106 whose processes may include, but are not limited to, registering users of an wagering interleaved system, validating users of an wagering interleaved system using user registration data, managing various types of user sessions for users of the wagering interleaved system, and the like.

The user management and session controller 1104 may further include a datastore 1108 storing user data used to manage user registration and validation. The user management and session controller 1104 may further include a datastore 1110 storing user session data used to manage one or more user sessions.

The various user management and session controller components can interface with each other via an internal bus 1112 and/or other appropriate communication mechanism.

An interface 1114 allows the user management and session controller 1104 to operatively connect to one or more external devices, such as one or more application controllers, wager controllers and/or interactive controllers as described herein. The interface provides for receiving session telemetry data 1116 from the one more external devices. The user session telemetry data includes, but is not limited to, amounts of AC earned by one or more users, requests for entering into an user session as described herein, and telemetry data regarding the progress of one or more users during an user session. The interface 1114 may also provide for communicating secession control data 1118 used to manage a user session.

In numerous embodiments, the interface between the user management and session controller and other systems/devices may be a wide area network (WAN) such as the Internet. However, other methods of communication may be used including, but not limited to, a local area network (LAN), a universal serial bus (USB) interface, and/or some other method by which two electronic devices could communicate with each other.

During operation of the user management and session controller, the external system communicates user session telemetry data to the user management and session controller. The user management and session controller receives the user session telemetry data and uses the user session telemetry data to generate user session control data as described herein. The user management and session controller communicates the user session control data to the external system.

Referring now to FIG. 7B, user management and session controller 1104 includes a bus 1132 that provides an interface for one or more processors 1134, random access memory (RAM) 1136, read only memory (ROM) 1138, machine-readable storage medium 1140, one or more user output devices 1142, one or more user input devices 1144, and one or more communication interface and/or network interface devices 1146.

The one or more processors 1134 may take many forms, such as, but not limited to, a central processing unit (CPU), a multi-processor unit (MPU), an ARM processor, a controller, a programmable logic device, or the like.

In the example embodiment, the one or more processors 1134 and the random access memory (RAM) 1136 form a user management and session controller processing unit 1199. In some embodiments, the user management and session controller processing unit includes one or more processors operatively connected to one or more of a RAM, ROM, and machine-readable storage medium; the one or more processors of the user management and session controller processing unit receive instructions stored by the one or more of a RAM, ROM, and machine-readable storage medium via a bus; and the one or more processors execute the received instructions. In some embodiments, the user management and session controller processing unit is an ASIC (Application-Specific Integrated Circuit). In some embodiments, the user management and session controller processing unit is a SoC (System-on-Chip).

Examples of output devices 1142 include, but are not limited to, display screens, light panels, and/or lighted displays. In accordance with particular embodiments, the one or more processors 1134 are operatively connected to audio output devices such as, but not limited to speakers, and/or sound amplifiers. In accordance with many of these embodiments, the one or more processors 1134 are operatively connected to tactile output devices like vibrators, and/or manipulators.

Examples of user input devices 1144 include, but are not limited to, tactile devices including but not limited to, keyboards, keypads, touch screens, and/or trackballs; non-contact devices such as audio input devices; motion sensors and motion capture devices that the user management and session controller can use to receive inputs from a user when the user interacts with the user management and session controller 1104.

The one or more communication interface and/or network interface devices 1146 provide one or more wired or wireless interfaces for exchanging data and commands between the user management and session controller 1104 and other devices that may be included in a dynamic multi-currency interleaved wagering system. Such wired and wireless interfaces include, but are not limited to: a Universal Serial Bus (USB) interface; a Bluetooth interface; a Wi-Fi interface; an Ethernet interface; a Near Field Communication (NFC)

interface; a plain old telephone system (POTS) interface; a cellular or satellite telephone network interface; and the like.

The machine-readable storage medium 1140 stores machine-executable instructions for various components of a user management and session controller, such as but not limited to: an operating system 1148; one or more application programs 1150; one or more device drivers 1152; dynamic multi-currency interleaved wagering system user management and session controller instructions 1154; and dynamic multi-currency interleaved wagering system user management and session controller 1156 for use by the one or more processors 1134 to provide the features of a dynamic multi-currency interleaved wagering system user management and session controller as described herein.

In various embodiments, the machine-readable storage medium 1140 is one of a (or a combination of two or more of) a hard drive, a flash drive, a DVD, a CD, a flash storage, a solid state drive, a ROM, an EEPROM, and the like.

In operation, the machine-executable instructions are loaded into memory 736 from the machine-readable storage medium 1140, the ROM 1138 or any other storage location. The respective machine-executable instructions are accessed by the one or more processors 1134 via the bus 1132, and then executed by the one or more processors 1134. Data used by the one or more processors 1134 are also stored in memory 1136, and the one or more processors 1134 access such data during execution of the machine-executable instructions. Execution of the machine-executable instructions causes the one or more processors 1134 to control the user management and session controller 1104 to provide the features of a dynamic multi-currency interleaved wagering system user management and session controller as described herein Although the user management and session controller 1104 is described herein as being constructed from or configured using one or more processors and machine-executable instructions stored and executed by hardware components, the user management and session controller can be composed of only hardware components in accordance with other embodiments. In addition, although the storage medium 1140 is described as being operatively connected to the one or more processors through a bus, those skilled in the art of processing devices will understand that the storage medium can include removable media such as, but not limited to, a USB memory device, an optical CD ROM, magnetic media such as tape and disks. In some embodiments, the storage medium 1140 can be accessed by the one or more processors 1134 through one of the interfaces or over a network. Furthermore, any of the user input devices or user output devices can be operatively connected to the one or more processors 1134 via one of the interfaces or over a network.

In various embodiments, the user management and session controller 1104 may be used to construct other components of a dynamic multi-currency interleaved wagering system as described herein.

In some embodiments, components of a user management and session controller and an application controller of an wagering interleaved system may be constructed from or configured using a single device using processes that communicate using an interprocess communication protocol. In other such embodiments, the components of a user management and session controller and an application controller of an wagering interleaved system may communicate by passing messages, parameters or the like.

In some embodiments, components of a user management and session controller and a wager controller of an wagering interleaved system may be constructed from or configured using a single device using processes that communicate using an interprocess communication protocol. In other such embodiments, the components of a user management and session controller and an application controller of an wagering interleaved system may communicate by passing messages, parameters or the like.

It should be understood that there may be many embodiments of a user management and session controller 1104 which could be possible, including forms where many modules and components of the user management and session controller are located in various servers and locations, so the foregoing is not meant to be exhaustive or all inclusive, but rather provide data on various embodiments of a user management and session controller 1104.

In numerous embodiments, any of a wager controller, an application controller, an interactive controller, or a user management and session controller as described herein can be constructed from or configured using multiple processing devices, whether dedicated, shared, or distributed in any combination thereof, or can be constructed from or configured using a single processing device. In addition, while certain aspects and features of dynamic multi-currency interleaved wagering system processes described herein have been attributed to a wager controller, an application controller, an interactive controller, or a user management and session controller, these aspects and features can be provided in a distributed form where any of the features or aspects can be provided by any of a user management and session controller, a wager controller, an application controller, and/or an interactive controller within a dynamic multi-currency interleaved wagering system without deviating from the spirit of the invention.

Although various components of dynamic multi-currency interleaved wagering systems are discussed herein, dynamic multi-currency interleaved wagering systems can be configured with any component as appropriate to the specification of a specific application in accordance with embodiments of the invention. In certain embodiments, components of a dynamic multi-currency interleaved wagering system, such as user management and session controller, an application controller, a wager controller, and/or an interactive controller, can be configured in different ways for a specific dynamic multi-currency interleaved wagering system.

Operation of Wagering Interleaved Systems

Figure 8:
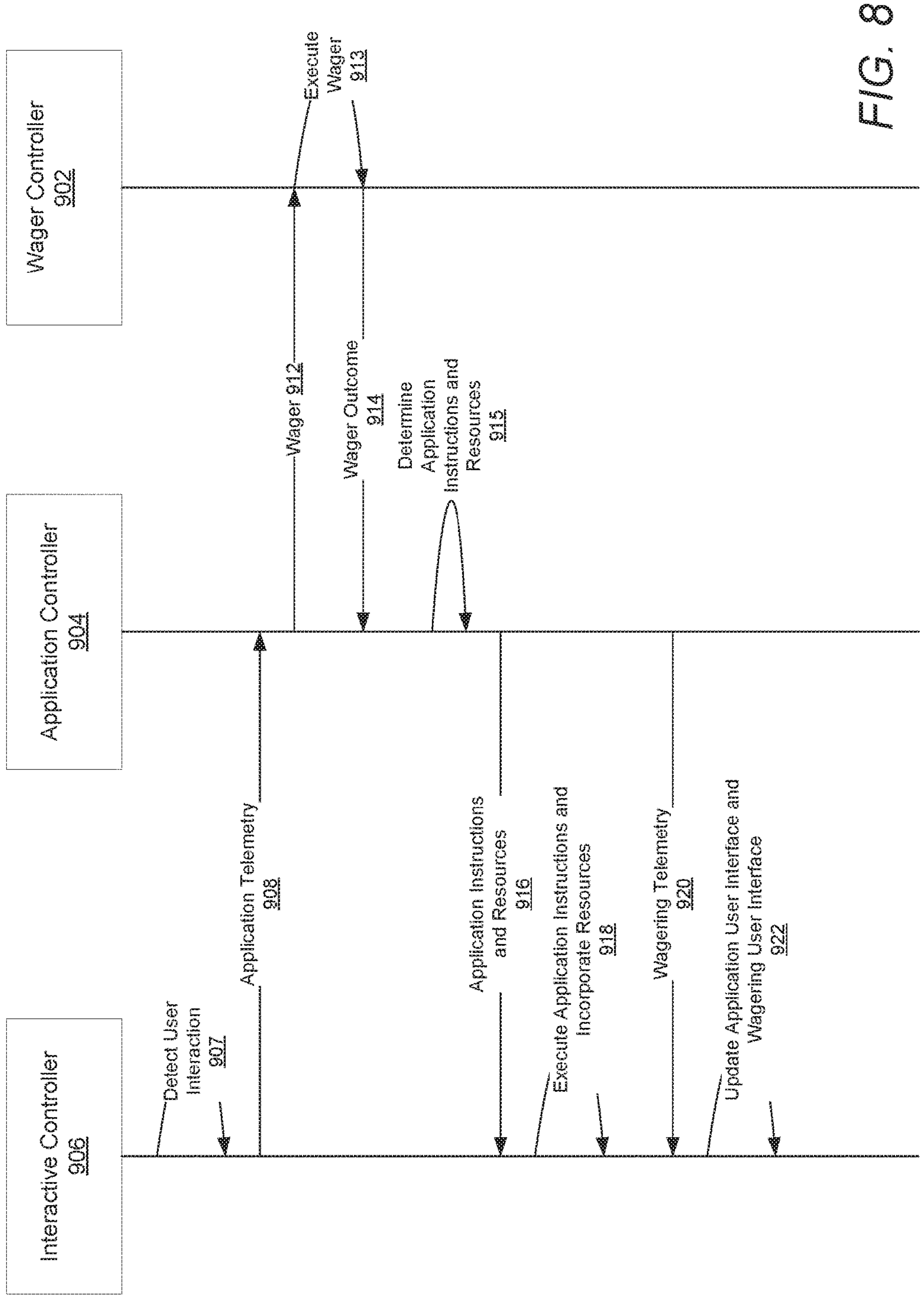
FIG. 8 is a sequence diagram of interactions between components of a dynamic multi-currency interleaved wagering system in accordance with various embodiments of the invention.

FIG. 8 is a sequence diagram of interactions between components of a dynamic multi-currency interleaved wagering system in accordance with various embodiments of the invention. The components of the dynamic multi-currency interleaved wagering system include a wager controller 902, such as wager controller 102 of FIG. 1, an application controller 904, such as application controller 112 of FIG. 1, and an interactive controller 906, such as interactive controller 120 of FIG. 1. The process begins with the interactive controller 906 detecting a user performing a user interaction in a user interface of an interactive application provided by the interactive controller 906. The interactive controller 906 communicates application telemetry data 908 to the application controller 904. The application telemetry data includes, but is not limited to, the user interaction detected by the interactive controller 906.

The application controller 904 receives the application telemetry data 908. Upon determination by the application controller 904 that the user interaction indicates a wagering event, the application controller 904 communicates wager data 912 including a wager request to the wager controller 902. The request for a wager event may include wager terms associated with a wagering proposition.

The wager controller receives the wager data and uses the wager data to execute (913) a wager in accordance with a wagering proposition. The wager controller 902 communicates a wager outcome 914 of the executed wager to the application controller 904.

The application controller 904 receives the wager outcome and determines (915) interactive application instructions and resources 916 for the interactive application. The application controller 904 communicates the interactive application instructions and resources 916 to the interactive controller 906. The application controller also communicates wagering telemetry data 920 including the wager outcome to the interactive controller 906.

The interactive controller 906 receives the interactive application instructions and resources 916 and wagering telemetry data 918. The interactive controller 906 incorporates the received interactive application resources and executes the received interactive application instructions (918). The interactive controller updates (922) an application user interface of the interactive application provided by the interactive controller using the interactive application instructions and the resources, and updates (922) a wagering user interface using the wagering telemetry data.

In several embodiments, a user can interact with a dynamic multi-currency interleaved wagering system by using Cr for wagering in accordance with a wagering proposition along with AC and elements in interactions with an interactive application. Wagering can be executed by a wager controller while an interactive application can be executed by an interactive controller and managed with an application controller.

Figure 9:
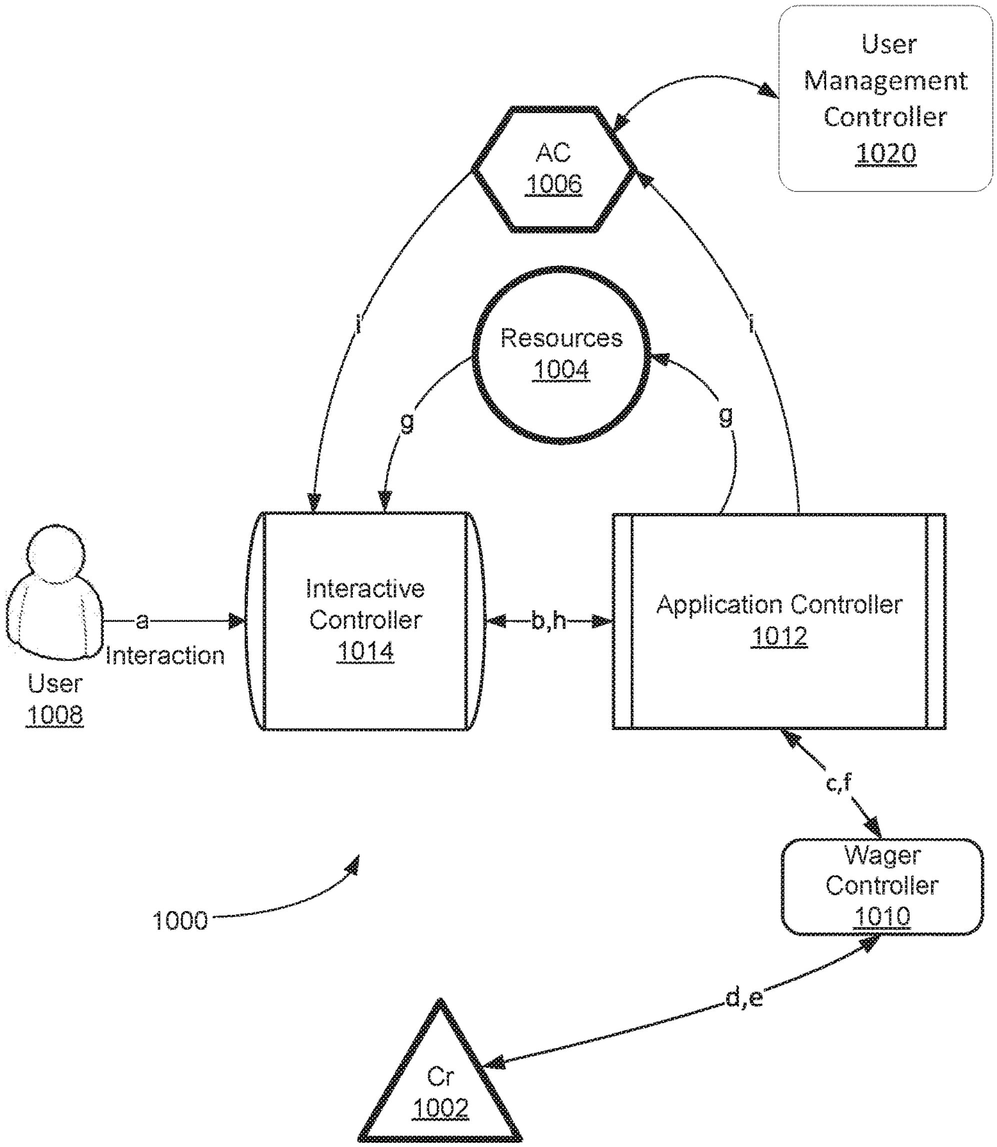
FIG. 9 is a collaboration diagram for components of a dynamic multi-currency interleaved wagering system in accordance with various embodiments of the invention.

FIG. 9 is a collaboration diagram that illustrates how resources such as AC, Cr, elements, and objects are utilized in a dynamic multi-currency interleaved wagering system in accordance with various embodiments of the invention. The collaboration diagram 1000 illustrates that Cr 1002, interactive application resources including elements and objects 1004 and AC 1006 can be utilized by a user 1008 in interactions with a wager controller 1010, such as wager controller 102 of FIG. 1, an application controller 1012, such as wager controller 112 of FIG. 1, and an interactive controller 1014, such as interactive controller 120 of FIG. 1, of a dynamic multi-currency interleaved wagering system. The contribution of elements and objects such as included in resources 1004, can be linked to a user's access to credits, such as Cr 1002 and/or AC 1006. Electronic receipt of these credits can come via a smart card, voucher or other portable media, or as received over a network from a server. In some embodiments, these credits can be drawn on demand from a user profile located in a database locally on a dynamic multi-currency interleaved wagering system or in a remote server.

A user's actions and/or decisions can affect an interactive application of interactive controller 1014 that consume and/or accumulate AC 1004 and/or resources 1004 in an interactive application executed by an interactive controller 1014, a wager controller 101 and an application controller 1012. The application controller 1012 can monitor the activities taking place within an interactive application executed by an interactive controller 1014 for wagering event occurrences. The application controller 1012 can also communicate the wagering event occurrences to the wager controller 1010 that triggers a wager of Cr 1002 in accordance with a wagering proposition executed by the wager controller 1010.

In several embodiments, the user commences interaction with the dynamic multi-currency interleaved wagering system by contributing credit to a dynamic multi-currency interleaved wagering system such as, but not limited to, Cr 1002 that may be credit in a real currency or may be credit in a virtual currency that is not fungible with a real currency, AC 1006 that may be application environment credits, and specified types of interactive application elements and/or objects 1004. One or more of these contributions may be provided directly as currency and/or transferred in electronically. Electronic transfer may come via a smart card, voucher or other portable media, or as transferred in over a network from a user data server or dynamic multi-currency interleaved wagering system user management and session controller. In many embodiments, contributions may be drawn on demand from user accounts located in servers residing on the network or in the cloud on a real time basis as the credits, elements and/or object are committed or consumed by the dynamic multi-currency interleaved wagering system. Generally, Cr is utilized and accounted for by the wager controller 1010; and the resources 1004 and AC 1006 are utilized and accounted for by the application controller 1012 and/or the interactive controller 1014. The user interacts (a) with an interactive application provided by the interactive controller 1014 with the interaction representing an action by the user within the context of the interactive application. The interactive controller 1014 receives the user interaction and communicates (b) the interaction to the application controller 1012. The application controller 1012 receives the interaction and determines from the interaction whether or not a wager should be triggered. If a wager should be triggered, the application controller 1012 communicates (c) wager data about a wager in accordance with a wagering proposition associated with the interaction and thereby triggers a wager. The wager controller receives the wager data and executes the wager in accordance with the wagering proposition, and consumes (d) an appropriate amount of Cr 1002 for the wager. The wager controller 1010 adjusts (e) the Cr 1002 based upon a wager outcome of the wager and communicates (f) the wager outcome to the application controller 1012 as to the outcome of the wager triggered by the application controller 1012. The application controller 1012 receives the wager outcome. The application controller determines what resources 1004 should be provided to the interactive controller and communicates (g) the resources 1004 to the interactive controller. The interactive controller receives the resources from the application control and integrates them into the execution of the interactive application provided by the interactive controller 1014.

In some embodiments, the application controller 1012 communicates (h) data about the wager outcome to the interactive controller. The interactive controller receives the wager outcome and displays the wager outcome to the user 1008.

In some embodiments, the application controller 1012 determines what resources and instructions to provide to the interactive controller 1014 for use by the interactive application provided by the interactive controller 1014 partially on the basis of the wager outcome. In some such embodiments, resources are provided in a case that the wager was a winning wager for the user. In other such embodiments, fewer or no resources are provided in a case of a losing wager.

In some embodiments, the application controller 1012 determines what resources to provide based on internal logic of the application controller 1012. In some such embodiments, the application controller 1012 employs a random result generator, such as a P/RNG, to generate a random result and the random result is used to determine what resources are provided to the interactive controller 1014.

In several embodiments, the application controller 1012 determines an increment or a decrement of an amount of AC 1006 using the interactions received from the interactive controller. The increment or decremented amount is communicated (i) to the interactive controller for display to the user.

In some embodiments, the application controller 1012 executes a wager of Cr as a virtual currency, AC, elements or objects. In some such embodiments, the application controller 1012 employs a random result generator, such as a P/RNG, to generate a random result and the random result is used to determine a wager outcome in Cr as a virtual currency, AC, elements or objects.

The following is description of an embodiment of the described collaboration where an interactive application provided by an interactive controller of a dynamic multi-currency interleaved wagering system is a first person shooter game. The process begins by a user selecting a machine gun to use in the game and then fires a burst of bullets at an opponent. The interactive controller can communicate to the application controller of the user's choice of weapon, that a burst of bullets was fired, and/or the outcome of the burst. The application controller communicates to the wager controller that 3 credits (Cr) are to be wagered on the outcome of a wagering event to match the three bullets consumed. The wager controller then performs the wagering event and determines the result of the wager and may determine the winnings from a paytable. The wager controller consumes 3 credits of Cr for the wager and executes the specified wager. By way of example, the wager controller may determine that the user hit a jackpot of 6 credits and returns the 6 credits to the Cr and communicates to the application controller that 3 net credits were won by the user.

The application controller communicates to the interactive controller to add 3 bullets to an ammunition clip. The interactive controller adds 3 bullets back to the ammo clip. The ammunition may be added by directly adding the ammunition to the clip or by allowing the user to find extra ammunition during use. The application controller logs the new user score (AC) in the game (as a function of the successful hit on the opponent) based on the interactive controller communication, and adds 2 extra points to the user score since a jackpot has been won. The application controller then adds 10 points to the user score (AC) given the success of the hit which in this example is worth 8 points, plus the 2 extra point. Note that this example is only intended to provide an illustration of how credits flow in a dynamic multi-currency interleaved wagering system, but is not intended to be exhaustive and only lists only one of numerous possibilities of how a dynamic multi-currency interleaved wagering system may be configured to manage its fundamental credits.

In many embodiments, user management and session controller 1020, such as user account controller 150 of FIG. 1, of a dynamic multi-currency interleaved wagering system is used to store AC for use of the user. In such an embodiment, AC is generated by the application controller based on the user's use of the dynamic multi-currency interleaved wagering system and an amount of the AC is communicated to the user management and session controller 1020. The user management and session controller stores the amount of AC between user sessions. In some embodiments, the user management and session controller communicates an amount of AC to the application controller at the start of a user session for use by the user during a user session.

Dynamic Multi-Currency Interleaved Wagering System

As described herein, a user of a dynamic multi-currency interleaved wagering system may use credits (Cr) purchased and redeemed using a real world currency (RC) or virtual currency (VC) during wagering. The dynamic multi-currency interleaved wagering system includes an interactive application. In some embodiments, the interactive application is an interactive game. In some embodiments, the interactive game is a skill-based game. In some embodiments, the interactive game is a chance-based game. The Cr, whether in the form of VC and/or RC, committed by the user may be managed by the wager controller and wagers using either RC or VC may be triggered based on the actions of the user. The user may switch between RC and VC, using RC for wagering in one interactive application session and using VC for wagering in another interactive application session.

In some embodiments, the user may be able to switch between VC and RC within a single interactive application session, and may do so multiple times. In an example embodiment, a user may begin using the interactive application using VC for wagers, and as the user becomes familiar with the interactive application, the user may switch to RC for wagers. In another example embodiment, the user, upon reaching a self-imposed, operator-imposed, or regulator-imposed limit on RC wagered, may automatically be switched to VC from RC. The user may continue using the interactive application using VC, and may be prohibited from using RC until a predetermined event occurs. Once the event occurs, the user may be able to wager using RC. In some embodiments, the predetermined event is a passage of a predetermined amount of time, such as a "cool down period." In some embodiments, the predetermined event is completion of an objective or achievement of a goal within the interactive application. In some embodiments, a switch from RC to VC may be mandated as a function of wagering limits set by the user, casino, regulator or other relevant party. In such a case, a VC "cool down" period may preclude the player's ability to switch back to RC for a given period of time, or may be driven by other in-application metrics (e.g., a user may have to complete a level with VC before RC can be re-enabled).

In some embodiments, the user may commence a game session using VC, and then as the user becomes familiar with the interactive application, such as an interactive game, switch over to using RC for wagering, and then when RC is depleted, continue wagering with VC.

In some embodiments, the dynamic multi-currency interleaved wagering system is constructed to support flows of RC and VC in the same interactive application. In some embodiments, all elements of the architecture that are in place in a RC-only or VC-only embodiment are present herein. In addition, the wager controller may be capable of maintaining registers that track multiple currencies (e.g., can keep track of RC and VC), and may switch the operand from RC to VC and vice versa.

Figure 10:
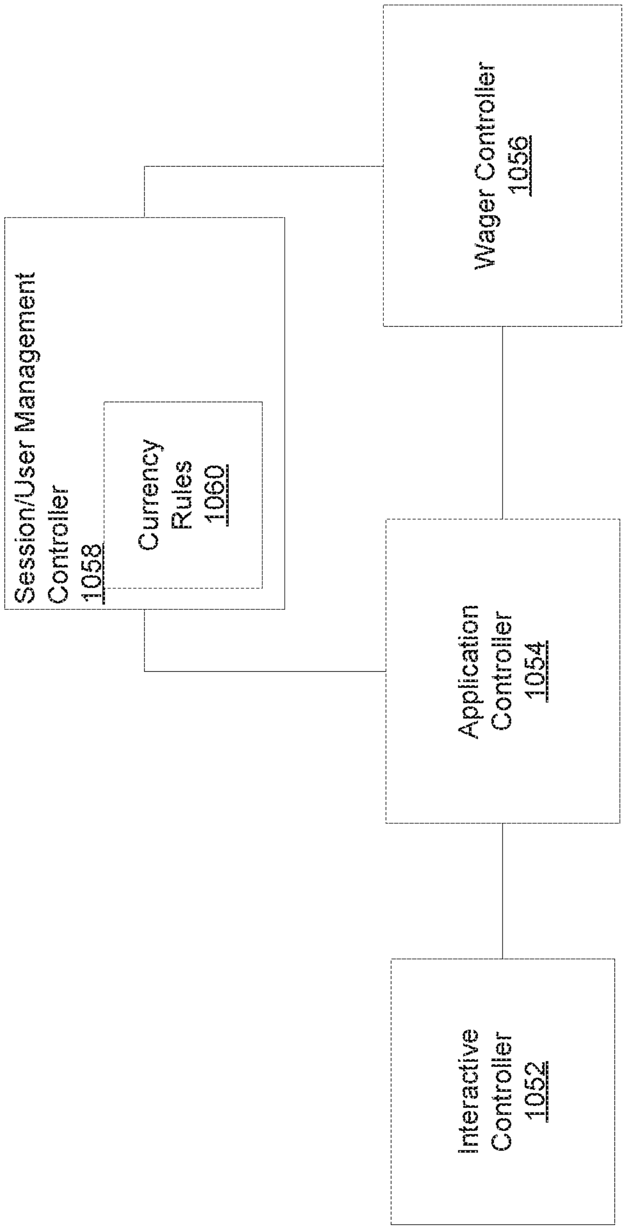
FIG. 10 is a diagram of a structure of a dynamic multi-currency interleaved wagering system in accordance with various embodiments of the invention.

FIG. 10 is a diagram of a structure of a dynamic multi-currency interleaved wagering system in accordance with various embodiments of the invention. The dynamic multi-currency interleaved wagering system includes an interactive controller 1052, an application controller 1054, and a wager controller 1056, each as described herein. The interactive controller 1052 may provide an interactive application. In some embodiments, the interactive application is an interactive game. In some embodiments, the interactive game is a skill-based game. In some embodiments, the interactive game is a chance-based game.

In some embodiments, one or more characteristics of the interactive application, wager controller, application controller, interactive controller, or other aspects of the dynamic multi-currency interleaved wagering system can be varied as a function of the currency (e.g., RC or VC) in play. In an example embodiment, a different pay table may be in force for VC than for RC. In another example embodiment, the rate at which AC is accumulated for a given in-application action or achievement may vary based upon whether VC or RC is the active currency.

The dynamic multi-currency interleaved wagering system also includes a session/user management controller 1058. The session/user management controller 1058 may be operatively connected to the application controller 1054 and/or the wager controller 1056. In some embodiments, the connection is via a network. The session/user management controller 1058 is responsible for determining what types of currency are valid. A valid currency is a currency that is available for wagering by the user. In some embodiments, a currency is available if there are no restrictions on wagering using the currency. In some embodiments, there may be one or more user-imposed, operator-imposed, or regulator-imposed restrictions on wagering. In various embodiments, there may be one or more valid currency types including one or more real world currency (RC) types, one or more virtual currency (VC) types, or any combination thereof.

The determination of which currencies are valid may be made upon receiving an indication from the application controller that a new interactive application session has been started. In an example embodiment, the interactive controller 1052, upon receiving an indication from a user to begin a new interactive application session, communicates, to the application controller 1054, an indication that a new session has been started. The application controller 1054 receives the indication from the interactive controller 1052 that the new session has been started. The application controller 1054 communicates to the session/user management controller 1058 a request for identification of valid currency types. The session/user management controller 1058 receives the request for identification of valid currency types from the application controller 1054. The session/user management controller 1058 determines valid currency types and communicates the identification of valid currency types to the application controller 1054.

Upon receiving the identification of valid currency types from the session/user management controller 1058, the application controller 1054 communicates the identification of valid currency types to the interactive controller 1052. The interactive controller 1052 receives the identification of valid currency types from the application controller 1054. The interactive controller 1052 presents the user with the valid currency types, along with an interface for the user to indicate which of the valid currency types the user would like to use for wagering.

In some embodiments, the user interface for indication of currency type is an interface on a display provided by the interactive controller 1052. In some embodiments, the user interface display for indication of currency type is a portion of the display provided for the interactive application and may be activated via a touch screen. In some embodiments, the user interface display for indication of currency type is a separate display from the display provided for the interactive application. In some embodiments, all of the currencies are displayed, but the currencies that are not available for wagering are grayed out and unable to be selected. In some embodiments, the user interface for indication of a currency type is a physical switch.

In some embodiments, purchasing or selling an in-application object associated with a currency type within the interactive application determines currency selection. In some embodiments, selling an object adds credits to a meter of an associated currency type and purchasing an object deducts credits from the associated meter.

In some embodiments, there is an on-screen display of both VC and RC, and the user may select the currency to be used in a wager prior to the wagering event via in-application choices that enable either VC or RC wagering. In an example embodiment, in an interactive application that is an interactive driving game, the user driving the car may choose to drive down the left fork of a road for VC wagering or down the right fork of the road for RC wagering, and may subsequently be exposed to other junctions where this choice can be revisited.

In some embodiments, the user may make selection of VC or RC using voice-activated selection.

In some embodiments, use of an in-application element, object or feature which is associated with a currency type of RC or VC wagering/use cost may trigger use of the associated currency type for a wager.

In some embodiments, the presentation of the currency options is under control of the application controller 1054, which communicates the currency options to the interactive controller 1052. In another embodiment, the interactive controller 1052 determines the presentation of the currency options. In some embodiments, logic in the application controller 1054 determines whether RC or VC will be used for the wager, and communications to the wager controller 1056 which meter to draw from for the wagering process.

In one embodiment, logic in the application controller 1054 determines the visual format of the presentation of the win/loss proposition of the wager depending on whether the wager was with RC or VC.

In some embodiments, switching from one currency to another, such as VC to RC or vice-versa, may require a confirmation by the user and pauses the interactive application until confirmation is received. In some embodiments, the confirmation is necessary bi-directionally (e.g., VC to RC and RC to VC) or unidirectionally (e.g., VC to RC only).

In some embodiments, the ability for the user to switch from VC to RC or vice-versa may not be universally available during interaction with the interactive application. For example, during the instantiation of the wagering portion of the dynamic multi-currency interleaved wagering system, the switch may be greyed out if it is a touchscreen activated button. Or, in another embodiment, meant to be illustrative and not limiting, the first time a user uses a particular interactive application (which may be known as a function of KYP credentials) the user may be required to play it for a fixed interval of time with VC before the ability to switch to RC is enabled. In another embodiment, if the interactive application is an interactive game, a user that has played a level in a 1st person shooter game with VC may not be able to switch to RC when facing the "boss"; the ability to switch back to RC being enabled at the commencement of the next level of the interactive game.

The determination of which types of currencies are valid may also be made upon the wager controller 1056 determining a wager outcome. In an example embodiment, the interactive controller 1052 communicates, to the application controller 1054, application telemetry and an identification of currency to be used. The application telemetry may include information associated with the user's score or time elapsed. The application controller 1054 receives the application telemetry and the identification of currency to be used (or chosen currency) from the interactive controller 1052.

The application controller 1054 determines whether a wager is triggered based on the received application telemetry. When a wager is triggered, the application controller 1054 communicates a wager request and the identification of the currency to be used to the wager controller 1056. The wager controller 1056 receives the wager request and the identification of the currency to be used from the application controller 1054. The wager controller 1056 determines a wager outcome, adjusts the appropriate currency meter based on the identification of the currency to be used, and communicates the wager outcome to the application controller 1054. The application controller 1054 receives the wager outcome from the wager controller 1056.

The application controller 1054 communicates application resources to the interactive controller 1052 based on the received wager outcome. The interactive controller 1052 receives the application resources from the application controller 1054. The application controller 1054 also communicates a request to the session/user management controller 1058 for identification of valid currency, upon receiving the wager outcome from the wager controller 1056. The session/user management controller 1058 receives the request for identification of valid currency from the application controller 1054. The session/user management controller 1058 determines valid currency types and communicates the identification of valid currency types to the application controller 1054.

Upon receiving the identification of valid currency types from the session/user management controller 1058, the application controller 1054 communicates the identification of valid currency types to the interactive controller 1052. The interactive controller 1052 receives the identification of valid currency types from the application controller 1054. The interactive controller 1052 presents the user with the valid currency types, along with an interface for the user to indicate which of the valid currency types the user would like to use for wagering.

The rules used to determine which currency is valid may be stored in the currency rules 1060 of the session/user management controller 1058. The rules stored in the currency rules 1060 may be received from the application controller 1054, or may be received from a third party.

In an example embodiment, a rule in the currency rules 1060 includes switching from VC to RC once the user has achieved a predetermined milestone, such as a score or a time elapsed. The session/user management controller 1058, in determining valid currency types, communicates a request for information to the application controller 1054. The application controller 1054 receives the request for information from the session/user management controller 1058. The request for information may include information associated with the user's score or time elapsed. The application controller 1054 communicates the information to the session/user management controller 1058. The session/user management controller 1058 receives the information from the application controller 1054. The session/user management controller, based on the received information and the currency rules 1060, determines which currency types are valid.

In an example embodiment, if the information includes a user score of 481,516 and a time elapsed of 23:42, and the currency rules 1060 include a rule of prohibiting use of VC wagering when the user score is greater than or equal to 480,000 or the time elapsed is greater than or equal to 60:00, then the session/user management controller 1058 may determine that VC wagering is prohibited. Accordingly, the session/user management controller 1058 communicates an identification of RC as valid currency types to the application controller 1054.

In the example embodiment, another rule in the currency rules 1060 may include switching from RC to VC once the user has wagered a predetermined amount of RC. In this way, the rule may assist a user in wagering responsibly.

The session/user management controller 1058, in determining valid currency types, communicates a request for information to the application controller 1054. The application controller 1054 receives the request for information from the session/user management controller 1058. The request for information may include information associated with the amount wagered during the interactive application session. The application controller 1054 communicates the information to the session/user management controller 1058. The session/user management controller 1058 receives the information from the application controller 1054. The session/user management controller, based on the received information and the currency rules 1060, determines which currency types are valid.

In addition, the session/user management controller 1058, in determining valid currency types, may communicate a request for information to the wager controller 1056. The wager controller 1056 receives the request for information from the session/user management controller 1058. The request for information may include information associated with the amount remaining on the RC meter, or may include information associated with the amount initially loaded to the RC meter. The wager controller 1056 communicates the information to the session/user management controller 1058. The session/user management controller 1058 receives the information from the wager controller 1056. The session/user management controller, based on the received information and the currency rules 1060, determines which currency types are valid.

In an example embodiment, if the information received by the session/user management controller 1058 from the application controller 1054 and/or the wager controller 1056 includes a user having wagered $4,815.16, and the currency rules 1060 include a rule of prohibiting use of RC wagering when the user has wagered an amount greater than or equal to $2,342.00, then the session/user management controller 1058 may determine that RC wagering is prohibited. Accordingly, the session/user management controller 1058 communicates an identification of VC as valid currency types to the application controller 1054.

In the example embodiment, a rule in the currency rules 1060 includes allowing wagering in VC or RC as long as sufficient VC or RC funds are present in their respective meters.

The session/user management controller 1058, in determining valid currency types, communicates a request for information to the wager controller 1056. The wager controller 1056 receives the request for information from the session/user management controller 1058. The request for information may include information associated with the amount remaining on the RC meter and the VC meter. The wager controller 1056 communicates the information to the session/user management controller 1058. The session/user management controller 1058 receives the information from the wager controller 1056. The session/user management controller, based on the received information and the currency rules 1060, determines which currency types are valid.

In an example embodiment, if the information includes $48.15 remaining on the RC meter and 162,342 credits remaining on the VC meter, and the currency rules 1060 include a rule of allowing use of RC wagering and/or VC wagering as long as there is RC and/or VC remaining on the respective meter, then the session/user management controller 1058 may determine that RC wagering and VC wagering is allowed. Accordingly, the session/user management controller 1058 communicates an identification of RC and VC as valid currency types to the application controller 1054.

In some embodiments, the currency rules 1060 also include rules for resolving conflicts between the rules. In some embodiments, the most restrictive rule present is the one used. In some embodiments, the least restrictive rule is the one used.

Rules may be added to the currency rules 1060 by the user or a third party, such as an operator or a regulator. In some embodiments, the user or a third party may activate and deactivate rules in the currency rules 1060. This may be accomplished by communicating with the session/user management controller 1058.

Valid currency type determination may be an active process. That is, the session/user management controller 1058 may make currency validity determinations in time intervals, such as every tenth of a second, every second, or every minute, for example.

Valid currency type determination may be a passive process. That is, the session/user management controller 1058 may make currency validity determinations in response to requests received from the application controller 1054. In an example embodiment, the session/user management controller 1058 may make a determination of valid currency types in response to receiving an indication from the application controller 1054 that an interactive application session has been started. In another example embodiment, the session/user management controller 1058 may make a determination of valid currency type in response to receiving an indication from the application controller 1054 that the interactive application has entered a different mode. If the interactive application has a practice mode, and the practice mode is chosen by the user, the interactive controller 1052 may communicate an indication to the application controller 1054 that the practice mode was entered. The application controller 1054 may communicate to the session/user management controller 1058 that the practice mode was entered and the session/user management controller 1058 may determine that only VC should be used in wagering. The session/user management controller 1058 communicates to the application controller 1054 identification of virtual currency being the only currency available. The application controller 1054 receives the identification from the session/user management controller 1058, and communicates the identification to the interactive controller 1052. The interactive controller 1052 receives the identification and the user is only permitted to select VC for wagering.

In some embodiments, the session/user management controller 1058 may make currency validity determinations both passively and actively. In an example embodiment, the session/user management controller 1058 makes currency validity determinations both at certain time intervals and upon receiving requests for determination of valid currency types.

The wager controller 1056 may dynamically determine which currency meter to use based on receiving an identification of currency from the application controller 1054, as described herein. A session/user management controller and a user registration device may also be used, also as described herein.

At least one eWallet may be associated with each user of the dynamic multi-currency interleaved wagering system. In an example embodiment, user profile data of a user is associated with at least one eWallet for the user.

The example embodiment involves use of at least three wallets for each user: a virtual credit (VC) eWallet, a real credit (RC) eWallet, and an application environment credit (AC) eWallet. In the example embodiment, the session/user management controller 1402 manages each eWallet.

In the example embodiment, the use of both a virtual credit eWallet for VC and a real credit Wallet for RC allows both VC and RC to be used in a wagering session of the dynamic multi-currency interleaved wagering system. That is, a single wagering session of the dynamic multi-currency interleaved wagering system can involve game play in virtual credit mode, and game play in real credit mode, subject to compliance with established currency rules.

Figure 11:
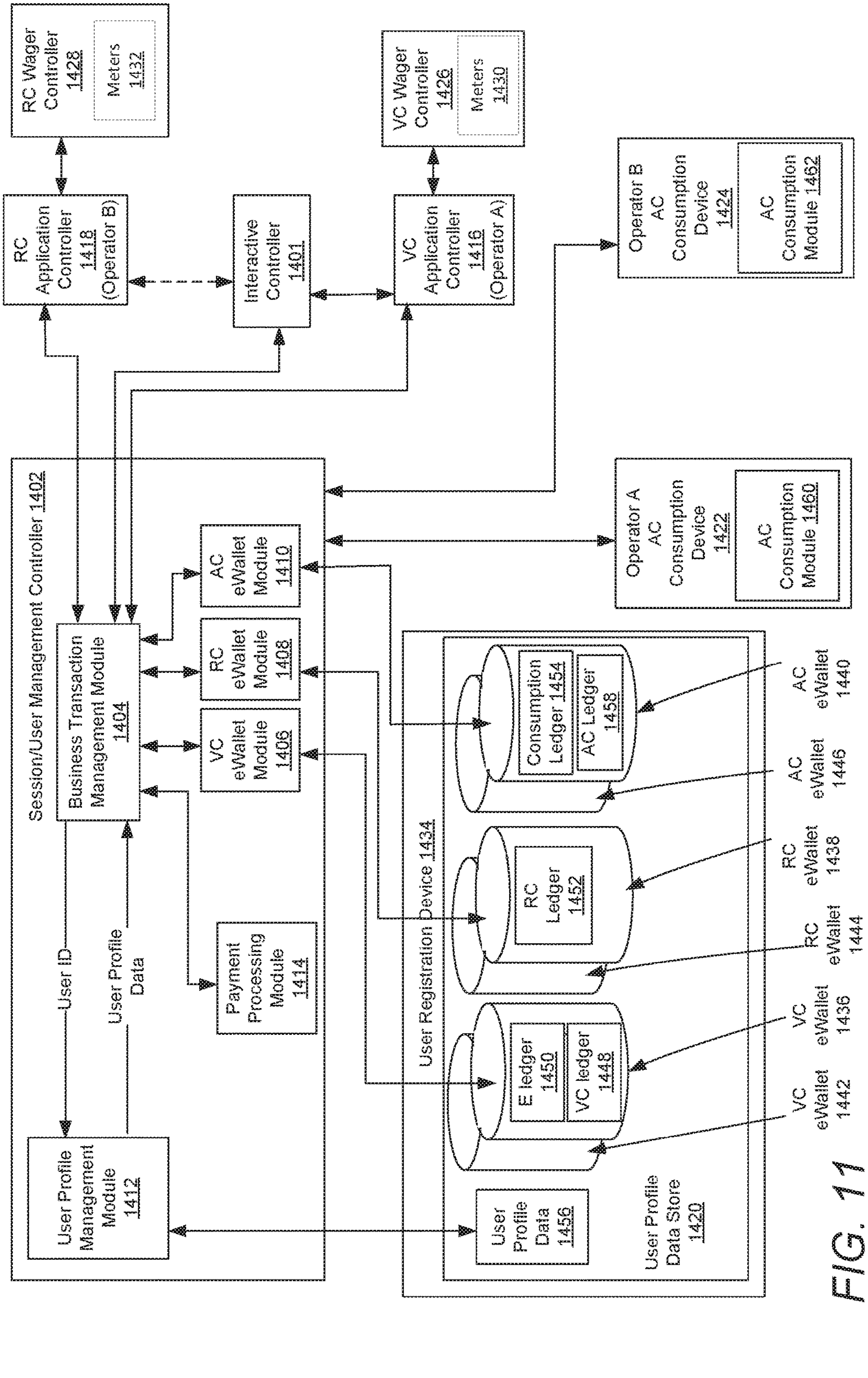
FIG. 11 illustrates management of user eWallets in accordance with various embodiments of the invention.

FIG. 11 illustrates management of user eWallets by the session/user management controller 1402, according to the example implementation. As shown in FIG. 11, the session/user management controller 1402 includes a business transaction management module 1404, a virtual credit (VC) eWallet module 1406, a real credit (RC) eWallet module 1408, an AC eWallet module 1410, a user profile management module 1412, and a payment processing module 1414.

The session/user management controller 1402 is communicatively coupled to the user's device 1401, a VC wagering application controller 1416 (of Operator A), an RC wagering application controller 1418 (of Operator B), the user profile data store 1420, an AC Consumption Device 1422 (of Operator A), and an AC Consumption Device 1424 (of Operator B). AC Consumption Device (of Operator A) 1422 includes an AC Consumption Module 1460 which facilitates the execution of operations of the AC Consumption Device (of Operator A) 1422. AC Consumption Device (of Operator B) 1424 includes an AC Consumption Module 1462 which facilitates the execution of operations of the AC Consumption Device (of Operator B) 1424.

In the example implementation, the user's device 1401 is a processing device suitable for hosting an implementation of an interactive controller, and having an architecture similar to that of the processing device 400 of FIGS. 4A and 4B. In the example implementation, VC application controller 1416 and the RC application controller 1418 are each processing devices suitable for hosting an implementation of an application controller, and having an architecture similar to that of the processing device 860 of FIGS. 6A and 6B. In the example implementation, the VC wager controller 1426 and the RC wager controller 1428 are each processing devices suitable for hosting an implementation of a wager controller, and having an architecture similar to that of the processing device 604 of FIGS. 5A and 5B.

In some implementations, the VC application controller 1416, the RC application controller 1418, the VC wager controller 1426, and the RC wager controller 1428 are modules hosted by one or more processing devices.

The VC wagering application controller 1416 (of Operator A) is communicatively coupled to a VC wagering wager controller 1426 having one or more credit meters 1430. As shown in FIG. 11, the user's device 1401 is operating the dynamic multi-currency interleaved wagering system in an Operator A Domain, and thus the user's device 1401 is communicatively coupled to the VC wagering application controller 1416 of Operator A. This may reflect receiving an identification of VC as the only valid currency in wagering.

The RC wagering application controller 1418 (of Operator B) is communicatively coupled to an RC wagering wager controller 1428 having one or more credit meters 1432. As shown in FIG. 11, since the user's device 1401 is operating the dynamic multi-currency interleaved wagering system in the Operator A Domain, the user's device 1401 is not communicatively coupled to the RC wagering application controller 1418 (of Operator B), as represented by the dashed line. In operation, in a case where the currency rules allow for RC wagering and the user has indicated use of RC for wagering, the user's device 1401 can communicatively couple with the RC wagering application controller 1418 to provide RC wagering.

In the example implementation of FIG. 11, when a user is registered by the user registration device 1434, a VC eWallet, an RC eWallet, and an AC eWallet are added to the user profile data store 1420 in association with the user profile data 1456 for the user. In some implementations, an RC eWallet for a user is not added to the user profile data store until the user registers for real money wagering.

In the example implementation of FIG. 11, a user's VC eWallet, RC eWallet, and AC eWallet are associated with the user by using a user ID.

As illustrated in FIG. 11, the user profile data store 1420 includes two VC eWallets, two RC eWallets, and two AC eWallets. VC eWallet 1436, RC eWallet 1438, and AC eWallet 1440 are for a first user having a first user ID, and VC eWallet 1442, RC eWallet 1444, and AC eWallet 1446 are for a second user having a second user ID. During operation, as additional users are registered by the user registration device 1434, additional VC eWallets, RC eWallets, and AC eWallets are added to the user profile data store 1420.

—Virtual Credit eWallet—

The virtual credit (VC) eWallet module 1406 manages each Virtual Credit eWallet (e.g., 1436 and 1442 of FIG. 11). The Virtual Credit eWallet for each user is stored in a processor-readable format, and each Virtual Credit eWallet includes a virtual credit ledger (e.g., VC ledger 1448 of FIG. 11). The virtual credit ledger (e.g., 1448) records at least virtual credit (VC) debit transactions, VC credit transactions, and a VC balance for a respective user. The VC eWallet module 1406 includes processor-executable instructions that when executed, control the session/user management controller 1402 to record VC debit transactions for a user in the VC ledger of the user, record VC credit transactions for the user in the VC ledger of the user, update the VC balance of the VC ledger for the user, and provide the VC balance of the VC ledger for the user.

The VC eWallet module 1406 records VC credit transactions for a user based on real value received from the user via the payment processing module 1414, VC received (e.g., cashed-out) from a credit meter 1430 of a virtual credit wagering wager controller 1426 used in a wagering session of the user, VC received from the user's sale or redemption of elements (E), and VC received based on a scanned code (e.g., a scanned ticket code (e.g., lottery ticket, concert ticket, movie ticket, and the like), a scanned receipt code, a scanned UPC code, a scanned proof of purchase code, and the like).

The VC eWallet module 1406 records VC debit transactions for a user based on VC added (e.g., cashed-in) to the credit meter 1430 of the wager controller 1426 used in a wagering session of the user, and VC used for a user's purchase of elements (E).

In the example embodiment, VC cannot be exchanged for real value (e.g., redeemed for real currency), and the VC eWallet module 1406 is prohibited from performing operations to exchange VC for real value.

In the example implementation, the VC eWallet module 1406 includes processor-executable instructions that when executed, control the session/user management controller 1402 to prohibit recordation of VC debit transactions based on real value received by the user. In more detail, responsive to a request to record a VC debit transaction, the VC eWallet module 1406 determines whether the VC debit transaction relates to VC added (e.g., cashed-in) to the credit meter 1430 of the wager controller 1426 used in a wagering session of the user or VC used for a user's purchase of E. In the example implementation, if the request to record the VC debit transaction does not specify that the VC debit transaction relates to VC added (e.g., cashed-in) to the credit meter 1430 of the wager controller 1426 used in a wagering session of the user or VC used for a user's purchase of E, then the VC eWallet module 1406 does not record the VC debit transaction. In the example implementation, in the case where the VC eWallet module 1406 does not record the VC debit transaction, the VC eWallet module 1406 sends an error message to the requestor of the VC debit transaction recordation request.

In the example implementation, each Virtual Credit eWallet (e.g., 1436, 1442) includes an element (E) ledger (e.g., 1450). The E ledger records at least one of E purchase transactions, E sale transactions, E exchange transactions, E consumption transactions, and an inventory of E (e.g., items owned, amount of a particular E owned) for a respective user. The VC eWallet module 1406 includes processor-executable instructions that when executed, control the session/user management controller 1402 to record E purchase transactions for a user, record E sale transactions for the user, record E exchange transactions for the user, record E consumption transactions for the user, update an inventory of the user's E (e.g., items owned, amount of a particular E owned), and provide the inventory of the user's E.

The VC eWallet module 1406 records E purchase transactions for a user based on real value received by the seller from the user via the payment processing module 1414, VC received by the seller from the user, and AC received by the seller from the user.

The VC eWallet module 1406 records E sale transactions in which E is sold for VC. In the example embodiment, E cannot be exchanged for real value (e.g., redeemed for real currency), and the VC eWallet module 1406 is prohibited from performing operations to exchange E for real value.

—Real Credit eWallet—

The real credit eWallet module 1408 manages each Real Credit (RC) eWallet (e.g., 1438 and 1444 of FIG. 11). The Real Credit eWallet for each user is stored in a processor-readable format, and each Real Credit eWallet includes a real credit ledger (e.g., 1452 of FIG. 11). The real credit ledger records at least real credit (RC) debit transactions, RC credit transactions, and a RC balance for a respective user. The RC eWallet module 1408 includes processor-executable instructions that when executed, control the session/user management controller 1402 to record RC debit transactions for a user in the RC ledger of the user, record RC credit transactions for the user in the RC ledger of the user, update the RC balance of the RC ledger for the user, and provide the RC balance of the RC ledger for the user.

The RC eWallet module 1408 records RC credit transactions for a user based on real value received (e.g., from the user, from a lottery, and the like) via the payment processing module 1414, and RC received (e.g., cashed-out) from a credit meter 1432 of a real credit wagering wager controller 1428 used in a wagering session of the user.

In the example embodiment, VC cannot be exchanged for real value (e.g., redeemed for real currency), and the RC eWallet module 1408 is prohibited from recording RC credit transactions based on VC debited from the user.

In the example implementation, the RC eWallet module 1408 includes processor-executable instructions that when executed, control the session/user management controller 1402 to prohibit recordation of RC credit transactions based on VC debited from the user. In more detail, responsive to a request to record an RC credit transaction, the RC eWallet module 1408 determines whether the RC credit transaction relates to real value received from the user via the payment processing module 1414, real value received from a lottery system via the payment processing module 1414, or RC received (e.g., cashed-out) from a credit meter of a real credit wagering wager controller. In the example implementation, if the request to record the RC credit transaction does not specify that the RC credit transaction relates to real value received from the user via the payment processing module 1414, real value received from a lottery system via the payment processing module 1414, or RC received (e.g., cashed-out) from a credit meter of a real credit wagering wager controller, then the RC eWallet module 1408 does not record the RC credit transaction. In the example implementation, in the case where the RC eWallet module 1408 does not record the RC credit transaction, the RC eWallet module 1408 sends an error message to the requestor of the RC credit transaction recordation request.

In the example implementation, the session/user management controller 1402 includes processor-executable instructions that, when executed, control the session/user management controller 1402 to prohibit reception of real value via the payment processing module 1414 in connection with an exchange of VC for real value, and to refund real value received via the payment processing module 1414 that is determined to have been received in connection with an exchange of VC for real value. In the example implementation, the session/user management controller 1402 determines whether real value received for a user via the payment processing module 1414 relates to an exchange of VC for real value based on information recorded in the VC ledger (e.g., the VC ledger 1448) and the RC ledger (e.g., the RC ledger 1452) of the user.

The RC eWallet module records RC debit transactions for a user based on RC added (e.g., cashed-in) to the credit meter 1432 of the wager controller 1428 used in a wagering session of the user, RC used for a user's purchase of E or VC, and RC exchanged for real value (e.g., redeemed for real currency). In the example implementation, the RC is exchanged for real value by using the payment processing module 1414.

In some implementations, the payment processing module 1414 used in connection with real value transactions related to E, VC and RC is one of an iTunes payment processing module, an Android payment processing module, a Pay-Pal payment processing module, a payment processing module provided by an operator of the dynamic multi-currency interleaved wagering system, and the like. In some implementations, the payment processing module 1414 receives payment from a user via at least one of a credit card, a bank account, a debit card, a real money wagering voucher, a mobile device virtual wallet (e.g., an iOS virtual wallet, an Android virtual wallet, and the like), and a real money wagering smart card.

—AC eWallet—

The AC eWallet module 1410 manages each AC eWallet (e.g., 1440 and 1446 of FIG. 11). The AC eWallet for each user is stored in a processor-readable format, and each AC eWallet includes an AC ledger (e.g., AC ledger 1458 of FIG. 11). The AC ledger (e.g., 1458) records at least AC debit transactions, AC credit transactions, and an AC balance for a respective user. The AC eWallet module 1410 includes processor-executable instructions that when executed, control the session/user management controller 1402 to record AC debit transactions for a user in the AC ledger of the user, record AC credit transactions for the user in the AC ledger of the user, update the AC balance of the AC ledger for the user, and provide the AC balance of the AC ledger for the user.

The AC eWallet module 1410 records AC credit transactions for a user based on skillful gameplay of the entertainment game as determined by the user's application telemetry (e.g., application telemetry 124 of FIG. 1). In the example embodiment, the AC eWallet module 1410 also records AC credit transactions for a user based AC received based on a scanned code (e.g., a scanned ticket code (e.g., lottery ticket, concert ticket, movie ticket, and the like), a scanned receipt code, a scanned UPC code, a scanned proof of purchase code, and the like).

In the example embodiment, VC cannot be used to purchase AC, and the AC eWallet module 1410 is prohibited from performing operations to exchange VC for AC.

In the example embodiment, the AC eWallet module 1410 includes processor-executable instructions that when executed, control the session/user management controller 1402 to prohibit recordation of AC credit transactions in connection with consumption of VC.

In more detail, responsive to a request to record an AC credit transaction, the AC eWallet module 1410 determines whether the AC credit transaction represents an award of AC to a user based on skillful execution of the interactive application (based on application telemetry) or based on a scanned code.

In the example implementation, if the request to record the AC credit transaction specifies application telemetry used to award the AC to the user or specifies a scanned code, then the AC eWallet module 1410 determines that the AC credit transaction represents an award of AC to a user based on skillful execution of the interactive application (based on application telemetry) or based on a scanned code.

In a case where the AC eWallet module 1410 determines that the AC credit transaction does not represent an award of AC to a user based on one of skillful execution of the interactive application (based on application telemetry) and a scanned code, then the AC eWallet module 1410 does not record the AC credit transaction. In the example implementation, in the case where the AC eWallet module 1410 does not record the AC credit transaction, the AC eWallet module 1410 sends an error message to the requestor of AC recordation request.

In a case where the AC eWallet module 1410 determines that the AC credit transaction represents an award of AC to a user based on skillful execution of the interactive application (based on application telemetry) or based on a scanned code, then the AC eWallet module 1410 records the AC credit transaction.

The AC eWallet module 1410 records AC debit transactions for a user based on exchange for virtual items, exchange for entrance into tournaments, redemption for unlocking of new games or unlocking of levels of games, exchange of AC for VC, and consumption of AC for real-world prizes Consumption of AC for real-world prizes is performed by the session/user management controller 1402 in conjunction with an AC consumption device (e.g., one of the AC consumption devices 1422 and 1424).

In the example implementation, each AC eWallet (e.g., 1440, 1446) includes an AC consumption ledger (e.g., 1454). The AC consumption ledger records at least AC consumption transactions, and an inventory of economic value items (e.g., real-world prizes) acquired in connection with AC consumption transactions (e.g., economic value items owned, amount of a particular economic value item owned) for a respective user. The AC eWallet module 1410 includes processor-executable instructions that when executed, control the session/user management controller 1402 to record AC consumption transactions for a user, and update an inventory of the user's economic value items (e.g., economic value items owned, amount of a particular economic value item owned), and provide the inventory of the user's economic value items.

The AC eWallet module 1410 records AC consumption transactions for a user based on one or more economic value items transferred to the user and an amount of AC consumed to transfer the one or more economic value items to the user.

—Business Transaction Management Module—

In the example implementation, the business transaction management module 1404 manages business transactions. A business transaction is a transaction involving one or more of VC, RC, AC and E that is performed in response to a user instruction provided by the user's device (e.g., 1401) or a wager decision provided by an application controller (e.g., 1416, 1418). Business transactions include, for example, VC or RC cash-in to a gambling game provided by a wager controller (e.g., 1426, 1428), VC or RC cash-out from a gambling game provided by an wager controller (e.g., 1426, 1428), purchase of E using VC or RC, sale of E for VC, purchase of VC using RC, exchange of RC for real value, and exchange or consumption of AC. Business transactions can include sub-transactions that involve one or more of the VC eWallet, the RC eWallet and the AC eWallet of the user. For example, a business transaction for a user can include a first sub-transaction that involves the VC eWallet (e.g., 1436, 1442) of the user and a second sub-transaction that involves the RC eWallet (e.g., 1438, 1444) of the user. Some business transactions for a user involve only one of the VC eWallet and the RC eWallet of the user.

The business transaction management module 1404 uses one or more of the RC eWallet module 1408, the VC eWallet module 1406 and the AC eWallet module 1410 to perform a business transaction for a user.

In some embodiments, contribution of elements, such as E, can be linked to a user's access to credits, such as RC or AC. Electronic receipt of these credits can come via a smart card, voucher or other portable media, or as received over a network from a server. In some embodiments, these credits can be drawn on demand from a user profile located in a database locally on a dynamic multi-currency interleaved system or in a remote server.

Figure 12:
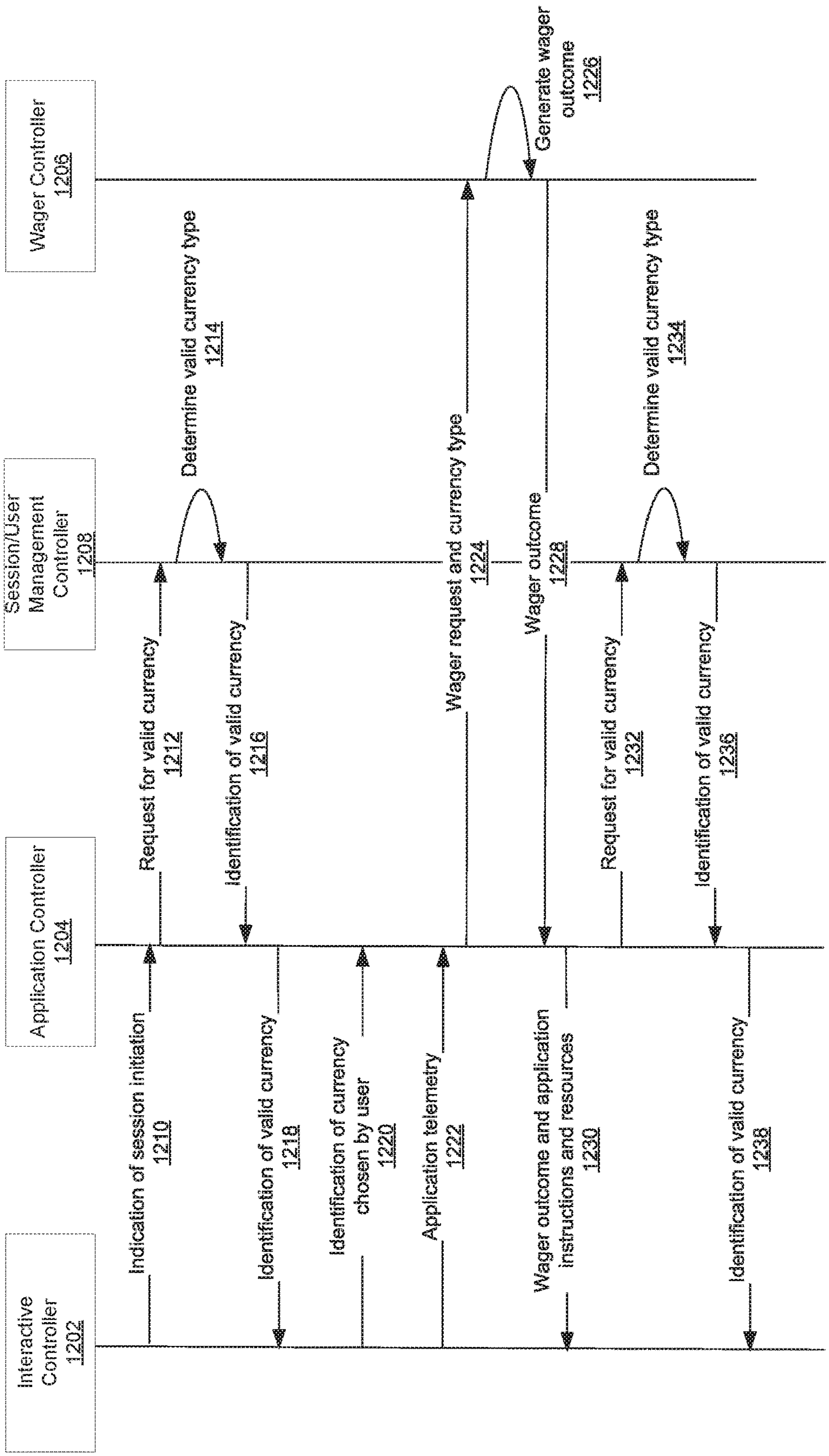
FIG. 12 is a sequence diagram of interactions between components of a dynamic multi-currency interleaved wagering system in accordance with various embodiments of the invention.

FIG. 12 is a sequence diagram of interactions between components of a dynamic multi-currency interleaved wagering system in accordance with various embodiments of the invention. The system includes an interactive controller 1202, an application controller, 1204, a wager controller 1206, and a session/user management controller 1208, each as described herein.

The interactive controller 1202, upon receiving an indication from a user to begin a new interactive application session, communicates to the application controller 1204 an indication that a new session has been started (1210). The application controller 1204 receives the indication from the interactive controller 1202 that the new session has been started (1210). The application controller 1204 communicates to the session/user management controller 1208 a request for identification of valid currency types (1212). The session/user management controller 1208 receives the request for identification of valid currency types from the application controller 1204 (1212). The session/user management controller 1208 determines one or more valid currency types (1214) and communicates the identification of one or more valid currency types to the application controller 1204 (1216). The determined one or more valid currency types may include one or more real world currency (RC) types, one or more virtual currency (VC) types, or any combination thereof as described herein.

In some embodiments, the indication of session initiation 1210 includes physical location data for the interactive controller 1202. The physical location data may include, but is not limited to, sensor telemetry (such as sensor telemetry 139 of FIG. 1) and/or network path and device data that can be used to identify a physical location of the interactive controller 1202, and thus identify a gaming jurisdiction in which the interactive controller may be located. The location data is used by either the application controller 1204 or the session/user management controller 1208 to determine a physical location of the interactive controller 1202, and thus determine a gaming jurisdiction of the interactive controller 1202. The gaming jurisdiction may be used to determine valid currency types available to a user of the interactive device. In an example embodiment, if the interactive controller 1202 is located in a gaming jurisdiction that allows real money gaming, it may be determined that a user of the interactive controller 1202 can use virtual currency types and real currency types as the gaming jurisdiction allows both real money gaming and virtual currency gaming. However, if it is determined that the interactive controller 1202 is located in a gaming jurisdiction that does not allow real money gaming, then the user of the interactive controller 1202 may only use types of virtual currency.

In another embodiment, a physical location of the interactive controller 1202 is determined from location data included in the indication of session initiation 1210. The physical location is used to identify a market region in which the interactive controller may be located. The location data is used by either the application controller 1204 or the session/user management controller 1208 to determine a physical location of the interactive controller 1202, and thus determine a market region of the interactive controller 1202. Market regions may be used to distinguish between various operators who operate interactive applications in various market regions and use virtual currency to monetize the interactive applications or advertise the interactive applications. Accordingly, the various operators may offer their own proprietary virtual currency using the same dynamic multi-currency interleaved wagering system. Accordingly, the market region may be used to determine valid virtual currency types available to a user of the interactive device 1202. In an example embodiment, if interactive controller 1202 is located in a market region of an operator A and is not a market region of an operator B, then only virtual currency types associated with operator A may be offered to a user of the interactive controller 1202. However, if it is determined that the interactive controller 1202 is located in a market region of both operator A and operator B, then a user of the interactive controller 1202 may be offered virtual currency types from both operator A and operator B.

In some embodiments, the application controller 1204 and/or session/user management controller 1208 communicates the location data to a geolocation server that uses the location data to determine the physical location of the interactive controller.

Upon receiving the identification of valid currency types from the session/user management controller 1208 (1216), the application controller 1204 communicates the identification of valid currency types to the interactive controller 1202 (1218). The interactive controller 1202 receives the identification of valid currency types from the application controller 1204 (1218). The interactive controller 1202 presents the user with the valid currency types, along with an interface for the user to indicate which of the valid currency types the user would like to use for wagering. The interactive controller 1202 receives, from the user, an identification of currency chosen.

The interactive controller 1202 communicates, to the application controller 1204, application telemetry (1222) and an identification of currency to be used (1220). The application telemetry may include information associated with the user's score or time elapsed. The application controller 1204 receives the application telemetry (1222) and the identification of currency to be used (or chosen currency) from the interactive controller 1202 (1220).

In some embodiments, use of an in-application element, object and/or feature which is associated with a currency type of RC or VC wagering/use cost may trigger use of the associated currency type for a wager as described herein. In such embodiments, the identification of valid currency 1218 communicated by the application controller 1204 to the interactive controller may include data indicating associations between various in-application elements, objects and/or features and the determined valid currency types. The interactive controller 1202 receives the data indicating associations between various in-application elements, objects and/or features and the determined valid currency types and may use the data indicating associations between various in-application elements, objects and/or features and the determined valid currency types to generate an appropriate display distinguishing between the variously associated currency types and in-application elements, objects and/or features. In such embodiments, the application telemetry includes in-application element, object and/or feature data that is used to identify various in-application elements, objects and/or features utilized by the user of the interactive controller and associated with the various currency types.

The application controller 1204 determines whether a wager is triggered based on the received application telemetry. When a wager is triggered, the application controller 1204 communicates a wager request and a chosen currency type to the wager controller 1206 (1224). The wager controller 1206 receives the wager request and the chosen currency type from the application controller 1204 (1224). The wager controller 1206 determines a wager outcome (1226), adjusts the appropriate currency meter based on the chosen currency type, and communicates the wager outcome to the application controller 1204 (1228). The application controller 1204 receives the wager outcome from the wager controller 1206 (1228).

The application controller 1204 communicates application resources to the interactive controller 1202 based on the received wager outcome (1230). The interactive controller 1202 receives the application resources from the application controller 1204 (1230). The application controller 1204 also communicates a request to the session/user management controller 1208 for identification of valid currency, upon receiving the wager outcome from the wager controller 1206 (1232). The session/user management controller 1208 receives the request for identification of valid currency from the application controller 1204 (1232). The session/user management controller 1208 determines valid currency types (1234) and communicates the identification of valid currency types to the application controller 1204 (1236).

Upon receiving the identification of valid currency types from the session/user management controller 1208 (1236), the application controller 1204 communicates the identification of valid currency types to the interactive controller 1202 (1238). The interactive controller 1202 receives the identification of valid currency types from the application controller 1204 (1238). The interactive controller 1202 presents the user with the valid currency types, along with an interface for the user to indicate which of the valid currency types the user would like to use for wagering.

In some embodiments, the application controller 1204 performs all of the functions of the session/user management controller 1208 as described herein.

Figure 13:
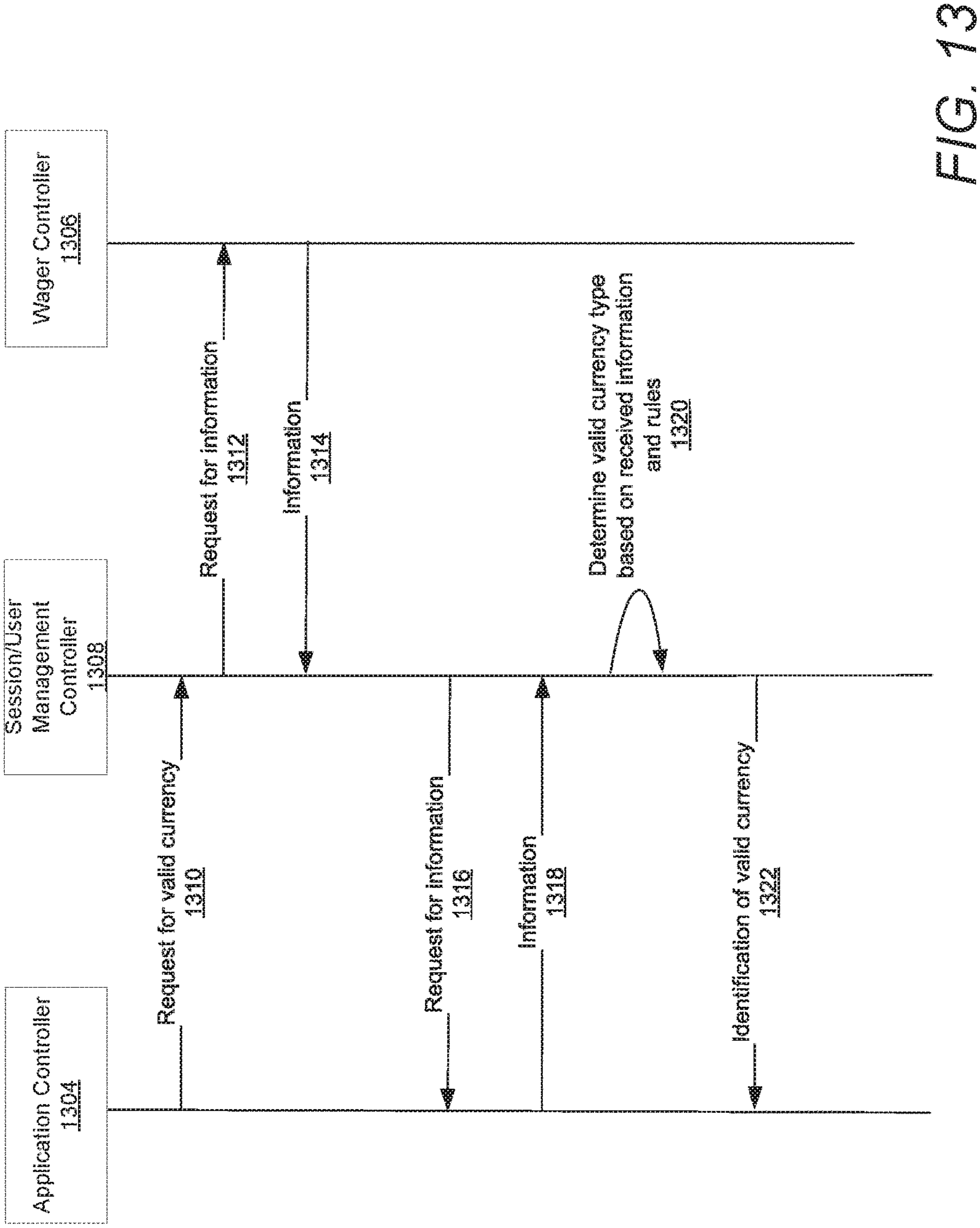
FIG. 13 is a sequence diagram of interactions between components of a dynamic multi-currency interleaved wagering system in accordance with various embodiments of the invention.

FIG. 13 is a sequence diagram of interactions between components of a dynamic multi-currency interleaved wagering system in accordance with various embodiments of the invention. FIG. 13 illustrates interactions between components of the system that occur when the session/user management controller 1308 determines valid currency types. The system includes an application controller 1304, a wager controller 1306, and a session/user management controller 1308, each as described herein.

The application controller 1304 communicates, to the session/user management controller 1308, a request for identification of valid currency (1310) (e.g., 1212 and 1232 of FIG. 12). The session/user management controller 1308 receives the request for identification of valid currency from the application controller 1304 (1310).

The session/user management controller 1308, in determining valid currency types, communicates a request for information to the wager controller 1306 (1312). The wager controller 1306 receives the request for information from the session/user management controller 1308 (1312). The request for information may include information associated with the amount remaining on the RC meter and the VC meter. The wager controller 1306 communicates the information to the session/user management controller 1308 (1314). The session/user management controller 1308 receives the information from the wager controller 1306 (1314).

The session/user management controller 1308, in determining valid currency types, may also communicate a request for information to the application controller 1304 (1316). The application controller 1304 receives the request for information from the session/user management controller 1308 (1316). The request for information may include information associated with the amount wagered during the interactive application session. The application controller 1304 communicates the information to the session/user management controller 1308 (1318). The session/user management controller 1308 receives the information from the application controller 1304 (1318).

The session/user management controller 1308, based on the received information and the currency rules, determines which currency types are valid (1320). The session/user management controller 1308 communicates, to the application controller 1304, identification of valid currency (1322)

(e.g., 1216 and 1236 of FIG. 12). The application controller 1304 receives, from the session/user management controller 1308, the identification of valid currency (1322).

In some embodiments, the application controller 1304 performs all of the functions of the session/user management controller 1308 as described herein.

While the above description may include many specific embodiments of the invention, these should not be construed as limitations on the scope of the invention, but rather as examples of embodiments thereof. It is therefore to be understood that the invention can be practiced otherwise than specifically described, without departing from the scope and spirit of the invention. Thus, embodiments of the invention described herein should be considered in all respects as illustrative and not restrictive.

What is claimed:

1. A dynamic multi-currency interleaved skill wagering gaming system, comprising:

an interactive controller operatively connected to an application controller, the interactive controller constructed to:

provide an interactive application stored on a non-transitory machine-readable storage medium to a user;

receive, from the application controller, identification of one or more valid currency types, wherein a valid currency type is a currency type available for wagering by the user of the interactive controller;

present the one or more valid currency types to the user;

receive from the user, an identification of a chosen currency type chosen by the user, the chosen currency type being one of the one or more valid currency types;

distribute to the application controller, the chosen currency type and application telemetry; and receive from the application controller, an application resource based on the application telemetry;

modify the interactive application by incorporating the received application resource;

a real credit controller operatively connected to the application controller, the real credit controller constructed to:

generate a wager outcome based on a wager request and the chosen currency type using a random number generator, the wager request and the chosen currency type being received from the application controller; and distribute, to the application controller, the wager outcome; and the application controller operatively connecting the real credit controller to the interactive controller by a network, the application controller constructed to:

determine the identification of the one or more valid currency types using one or more currency rules;

distribute to the interactive controller, the identification of the one or more valid currency types;

receive from the interactive controller, the chosen currency type and the application telemetry;

determine the wager request based on the application telemetry;

distribute to the real credit controller, the chosen currency type and the wager request;

receive from the real credit controller, the wager outcome;

determine the application resource based on the wager outcome; and distribute to the interactive controller, the application resource.

2. The dynamic multi-currency interleaved skill wagering gaming system of claim 1, wherein the real credit controller and the application controller are constructed from a same device, and the application controller is operatively connected to the interactive controller by the network.

3. The dynamic multi-currency interleaved skill wagering gaming system of claim 1, wherein the interactive controller and the application controller are constructed from a same device, and the application controller is operatively connected to the real credit controller by the network.

4. The dynamic multi-currency interleaved skill wagering gaming system of claim 1, wherein the application controller is operatively connected by the network to the real credit controller and the interactive controller.

5. The dynamic multi-currency interleaved skill wagering gaming system of claim 1, further comprising a session/user management controller operatively connected to the application controller, the session/user management controller constructed to:

receive from the application controller, a request for the identification of the one or more valid currency types; and determine the identification of the one or more valid currency types using the one or more currency rules; and distribute to the application controller, the identification of the one or more valid currency types, wherein the application controller is further constructed to:

distribute to the session/user management server, the request for the identification of the one or more valid currency types; and receive from the session/user management server, the identification of the one or more valid currency types.

6. The dynamic multi-currency interleaved skill wagering gaming system of claim 1, wherein the application controller is further constructed to receive the one or more currency rules from the user or a third party source.

7. The dynamic multi-currency interleaved skill wagering gaming system of claim 1, wherein the one or more currency rules comprise prohibiting virtual currency wagering when a score associated with the user or a time elapsed associated with the user exceeds a threshold value.

8. The dynamic multi-currency interleaved skill wagering gaming system of claim 1, wherein the one or more currency rules comprise prohibiting real world currency wagering when an amount of real world currency wagered by the user exceeds a threshold value.

9. The dynamic multi-currency interleaved skill wagering gaming system of claim 1, wherein the one or more currency rules comprise prohibiting real world currency wagering when an amount of real world currency wagered by the user exceeds a threshold value.

10. The dynamic multi-currency interleaved skill wagering gaming system of claim 1, wherein the interactive controller is further constructed to distribute location data to the application controller, and wherein the application controller is further constructed to:

receive from the interactive controller the location data; and determine the identification of the one or more valid currency types using the location data and the one or more currency rules.

11. The dynamic multi-currency interleaved skill wagering gaming system of claim 10, wherein the identification of the one or more valid currency types includes selecting between a plurality of currency types, and wherein the plurality of currency types includes at least one real world currency type and at least one virtual currency type.

12. A dynamic multi-currency interleaved skill wagering gaming system, comprising:

a real credit controller operatively connected to an application controller, the real credit controller constructed to:

generate a wager outcome based on a wager request and a chosen currency type using a random number generator, the wager request and the chosen currency type being received from the application controller; and distribute, to the application controller, the wager outcome; and the application controller operatively connecting the real credit controller to an interactive controller by a network, the application controller constructed to:

determine an identification of one or more valid currency types using one or more currency rules;

distribute to the interactive controller, the identification of the one or more valid currency types;

receive from the interactive controller, the chosen currency type and an application telemetry based on an interactive application stored on a non-transitory machine-readable storage medium;

determine the wager request based on the application telemetry;

distribute to the real credit controller, the chosen currency type and the wager request;

receive from the real credit controller, the wager outcome;

determine an application resource based on the wager outcome; and distribute to the interactive controller, the application resource such that the application resource modifies the interactive application.

13. The dynamic multi-currency interleaved skill wagering gaming system of claim 12, wherein the real credit controller and the application controller are constructed from a same device, and the application controller is operatively connected to the interactive controller by the network.

14. The dynamic multi-currency interleaved skill wagering gaming system of claim 12, wherein the interactive controller and the application controller are constructed from a same device, and the application controller is operatively connected to the real credit controller by the network.

15. The dynamic multi-currency interleaved skill wagering gaming system of claim 12, wherein the application controller is operatively connected by the network to the real credit controller and the interactive controller.

16. The dynamic multi-currency interleaved skill wagering gaming system of claim 12, further comprising a session/user management controller operatively connected to the application controller, the session/user management controller constructed to:

receive from the application controller, a request for the identification of the one or more valid currency types; and determine the identification of the one or more valid currency types using one or more currency rules; and distribute to the application controller, the identification of the one or more valid currency types, wherein the application controller is further constructed to:

distribute to the session/user management server, the request for the identification of the one or more valid currency types; and receive from the session/user management server, the identification of the one or more valid currency types.

17. The dynamic multi-currency interleaved skill wagering gaming system of claim 12, wherein the application controller is further constructed to receive one or more currency rules from user or a third party source.

18. The dynamic multi-currency interleaved skill wagering gaming system of claim 12, wherein one or more currency rules comprise prohibiting virtual currency wagering when a score associated with user or a time elapsed associated with the user exceeds a threshold value.

19. The dynamic multi-currency interleaved skill wagering gaming system of claim 12, wherein one or more currency rules comprise prohibiting real world currency wagering when an amount of real world currency wagered by a user exceeds a threshold value.

20. The dynamic multi-currency interleaved skill wagering gaming system of claim 12, wherein one or more currency rules comprise prohibiting real world currency wagering when an amount of real world currency wagered by a user exceeds a threshold value.

21. The dynamic multi-currency interleaved skill wagering gaming system of claim 12, wherein the interactive controller is further constructed to distribute location data to the application controller, and wherein the application controller is further constructed to:

receive from the interactive controller the location data; and determine the identification of the one or more valid currency types using the location data and one or more currency rules.

22. The dynamic multi-currency interleaved skill wagering gaming system of claim 21, wherein the identification of the one or more valid currency types includes selecting between a plurality of currency types, and wherein the plurality of currency types includes at least one real world currency type and at least one virtual currency type.

23. A dynamic multi-currency interleaved skill wagering gaming system, comprising:

an interactive controller operatively connected to an application controller, the interactive controller constructed to:

provide an interactive application stored on a non-transitory machine-readable storage medium to a user;

receive, from the application controller, identification of one or more valid currency types, wherein a valid currency type is a currency type available for wagering by the user of the interactive controller;

present the one or more valid currency types to the user;

receive from the user, an identification of a chosen currency type chosen by the user, the chosen currency type being one of the one or more valid currency types;

distribute to the application controller, the chosen currency type and application telemetry; and receive from the application controller, an application resource based on the application telemetry; and modify the interactive application by incorporating the received application resource:

the application controller operatively connecting a real credit controller to the interactive controller by a network, the application controller constructed to:

determine the identification of the one or more valid currency types using one or more currency rules;

distribute to the interactive controller, the identification of the one or more valid currency types;

receive from the interactive controller, the chosen currency type and the application telemetry;

determine a wager request based on the application telemetry;

distribute to the real credit controller, the chosen currency type and the wager request;

receive from the real credit controller, a wager outcome generated using a random number generator;

determine the application resource based on the wager outcome; and distribute to the interactive controller, the application resource.

24. The dynamic multi-currency interleaved skill wagering gaming system of claim 23, wherein the real credit controller and the application controller are constructed from a same device, and the application controller is operatively connected to the interactive controller by the network.

25. The dynamic multi-currency interleaved skill wagering gaming system of claim 23, wherein the interactive controller and the application controller are constructed from a same device, and the application controller is operatively connected to the real credit controller by the network.

26. The dynamic multi-currency interleaved skill wagering gaming system of claim 23, wherein the application controller is operatively connected by the network to the real credit controller and the interactive controller.

27. The dynamic multi-currency interleaved skill wagering gaming system of claim 23, further comprising a session/user management controller operatively connected to the application controller, the session/user management controller constructed to:

receive from the application controller, a request for the identification of the one or more valid currency types; and determine the identification of the one or more valid currency types using the one or more currency rules; and distribute to the application controller, the identification of the one or more valid currency types, wherein the application controller is further constructed to:

distribute to the session/user management server, the request for the identification of the one or more valid currency types; and receive from the session/user management server, the identification of the one or more valid currency types.

28. The dynamic multi-currency interleaved skill wagering gaming system of claim 23, wherein the application controller is further constructed to receive the one or more currency rules from the user or a third party source.

29. The dynamic multi-currency interleaved skill wagering gaming system of claim 23, wherein the one or more currency rules comprise prohibiting virtual currency wagering when a score associated with the user or a time elapsed associated with the user exceeds a threshold value.

30. The dynamic multi-currency interleaved skill wagering gaming system of claim 23, wherein the one or more currency rules comprise prohibiting real world currency wagering when an amount of real world currency wagered by the user exceeds a threshold value.

31. The dynamic multi-currency interleaved skill wagering gaming system of claim 23, wherein the one or more currency rules comprise prohibiting real world currency wagering when an amount of real world currency wagered by the user exceeds a threshold value.

32. The dynamic multi-currency interleaved skill wagering gaming system of claim 23, wherein the interactive controller is further constructed to distribute location data to the application controller, and wherein the application controller is further constructed to:

receive from the interactive controller the location data; and determine the identification of the one or more valid currency types using the location data and one or the more currency rules.

33. The dynamic multi-currency interleaved skill wagering gaming system of claim 32, wherein the identification of the one or more valid currency types includes selecting between a plurality of currency types, and wherein the plurality of currency types includes at least one real world currency type and at least one virtual currency type.

* * * * *